United States Patent [19]
Jensen

[11] Patent Number: 6,020,832
[45] Date of Patent: Feb. 1, 2000

[54] METHOD AND APPARATUS OF AUTOMATICALLY MONITORING AIRCRAFT ALTITUDE

[76] Inventor: David D. Jensen, P.O. Box 541126, Omaha, Nebr. 68154

[21] Appl. No.: 08/693,893

[22] Filed: Aug. 5, 1996

[51] Int. Cl.[7] .................................................. G08B 23/00
[52] U.S. Cl. .............................. 340/970; 340/977; 701/4; 701/9
[58] Field of Search .................................. 340/945, 963, 340/970, 977; 364/424.013, 424.017, 424.018, 424.06; 701/4, 5, 14, 35, 9

[56] References Cited

U.S. PATENT DOCUMENTS

| | | | |
|---|---|---|---|
| 3,680,046 | 7/1972 | Bergey et al. | 340/970 |
| 3,821,698 | 6/1974 | Tippetts | 340/970 |
| 4,006,472 | 2/1977 | Greene | 340/970 |
| 4,319,487 | 3/1982 | Haase et al. | 340/977 |
| 4,355,294 | 10/1982 | Ben-David et al. | 340/970 |
| 5,058,427 | 10/1991 | Brandt | 340/977 |
| 5,450,329 | 9/1995 | Tanner | 340/993 |

OTHER PUBLICATIONS

"Altitude Alerting Systems", Peter Holman–Smith, Proceedings of 18th Intl. ISA Aerospace Instrumentation Symposium, vol. 18, May 15–17, 1972.

Product Description/brochure—"S–TECs New LCD Altitude Selector/Alerter".

Product Description/brochure—"AirSport Altitude Alerter/Transponder Monitor".

Product Description/brochure—"Shadin AMS–2000" Altitude Management System.

Product Description/brochure—Icarus Instruments "AltaAlert 3070G".

Product Description/brochure—S–TEC System 40/50 Autopilots.

*Primary Examiner*—Brent A. Swarthout

[57] ABSTRACT

An apparatus and method for automatically and independently determining aircraft altitude and alerting the pilot to deviations from a target altitude exceeding a specified tolerance. The alerter comprises an altitude sensing means for sensing the present altitude of the aircraft. The invention discloses three sources for altitude information namely, a self-contained sensor such as a pressure transducer, a Global Positioning System receive, or an altitude encoder. A target entry means is used for entering the target altitude. An indicating means signals an altitude alerting condition upon the detection of a condition wherein the absolute difference is larger than the tolerance value. The altitude alerting apparatus may also comprise a display means for display of the present aircraft altitude information.

4 Claims, 41 Drawing Sheets

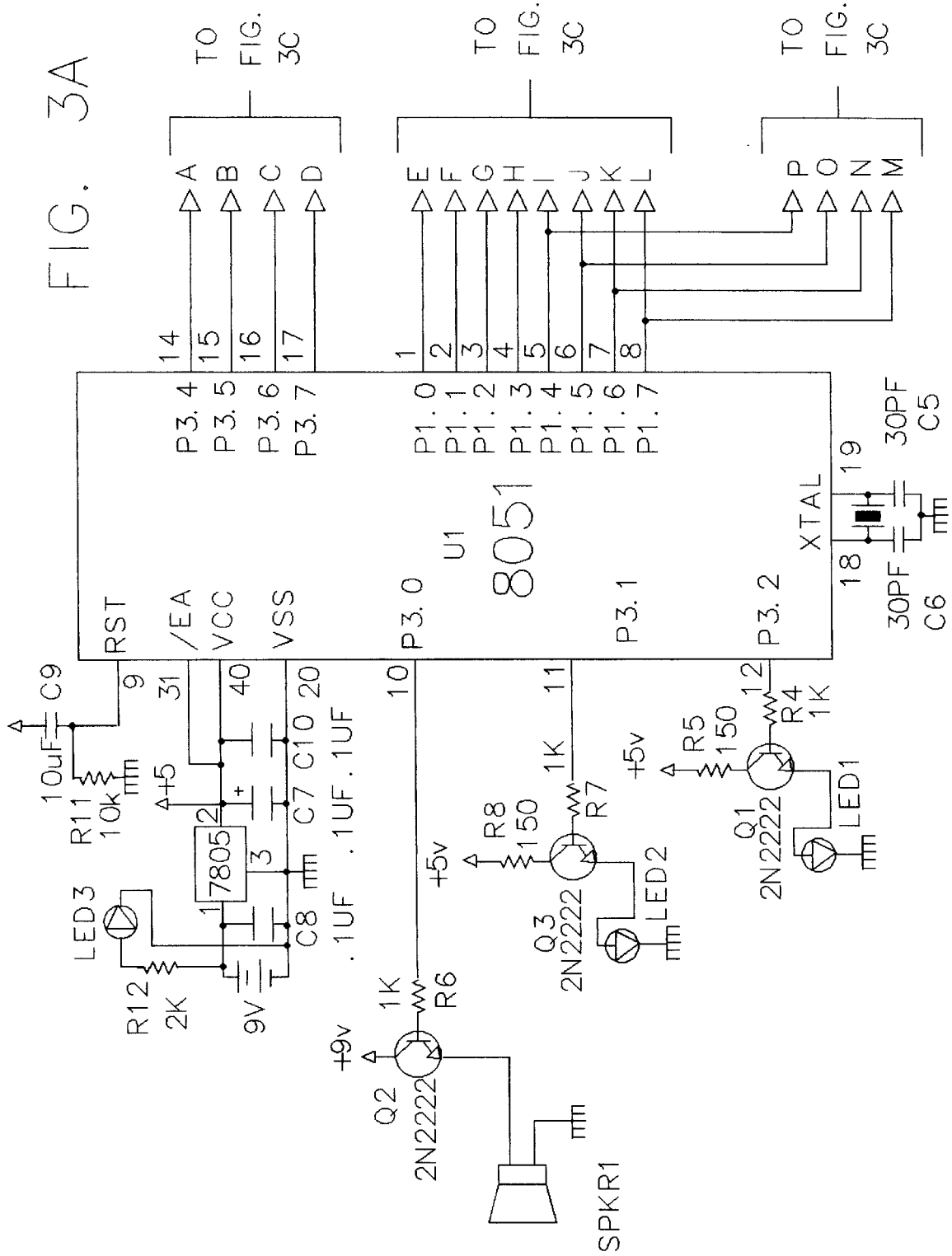

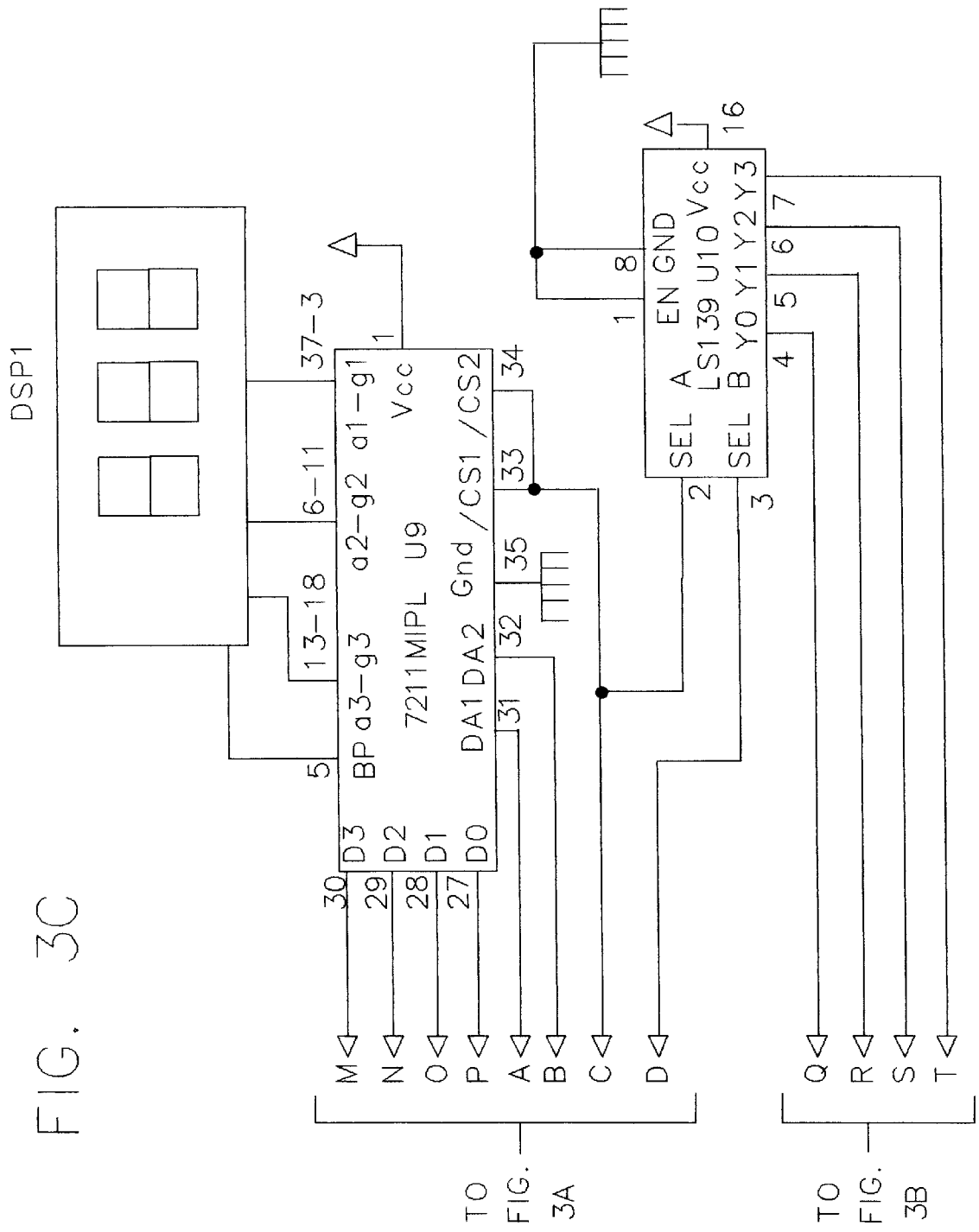

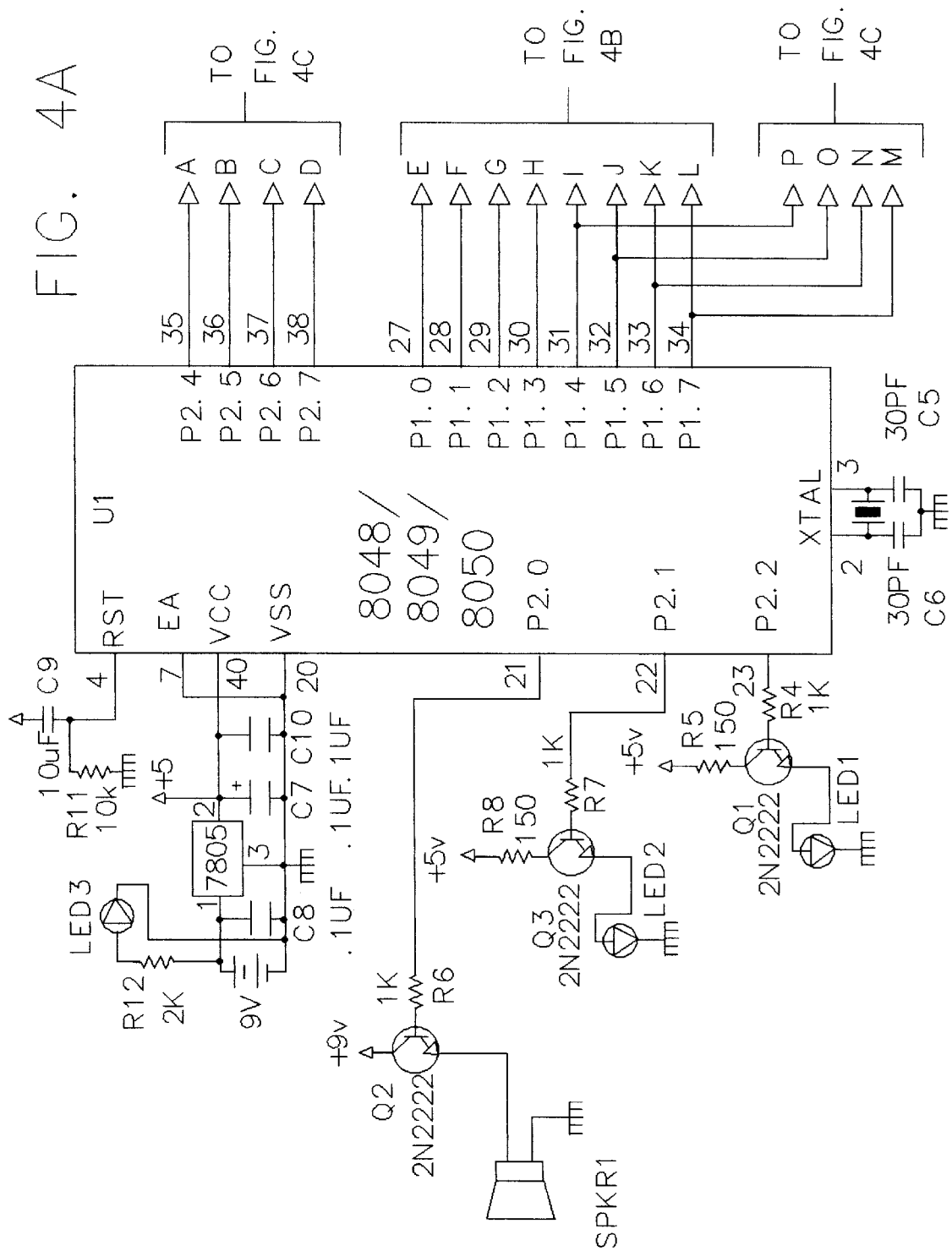

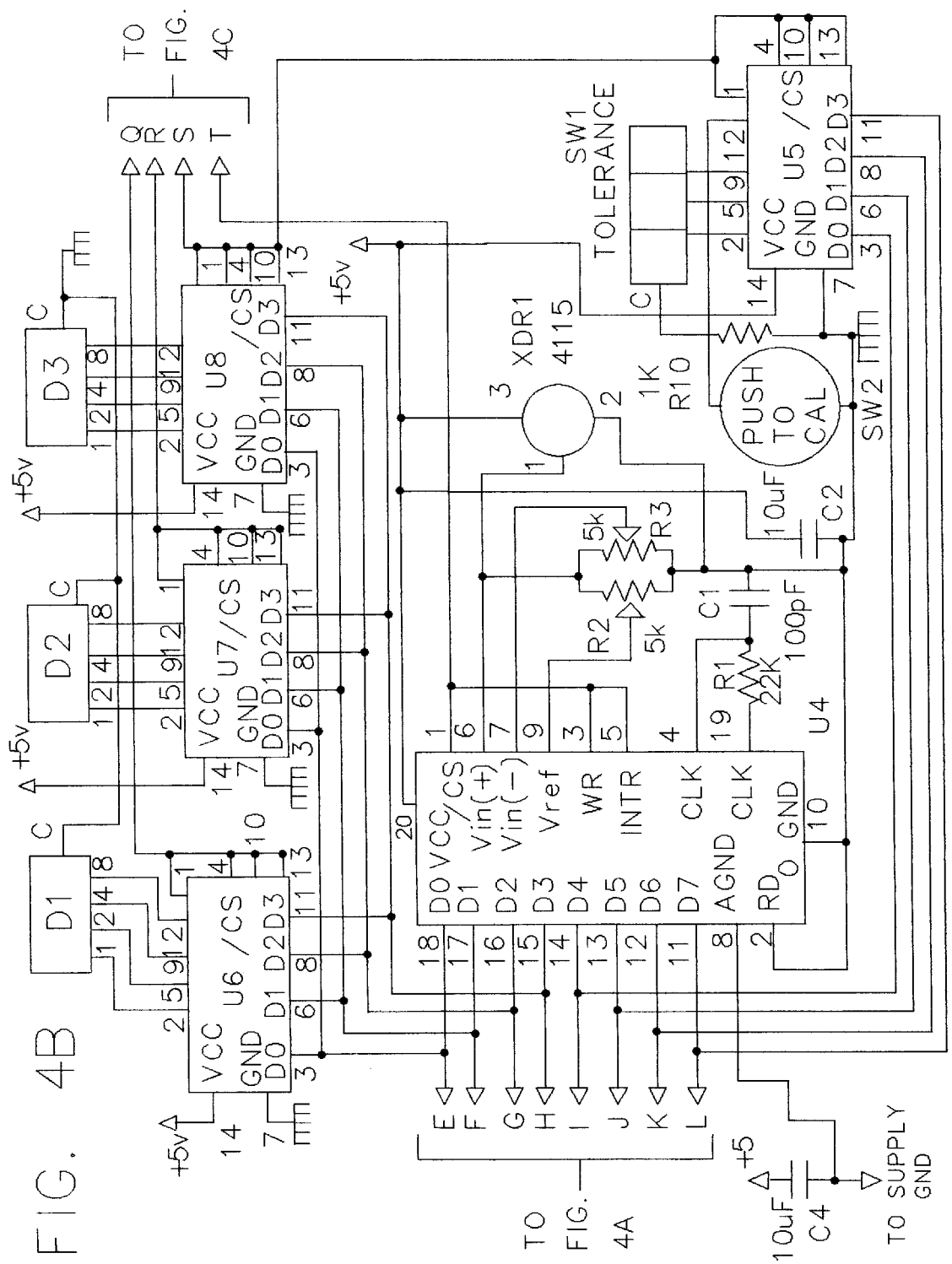

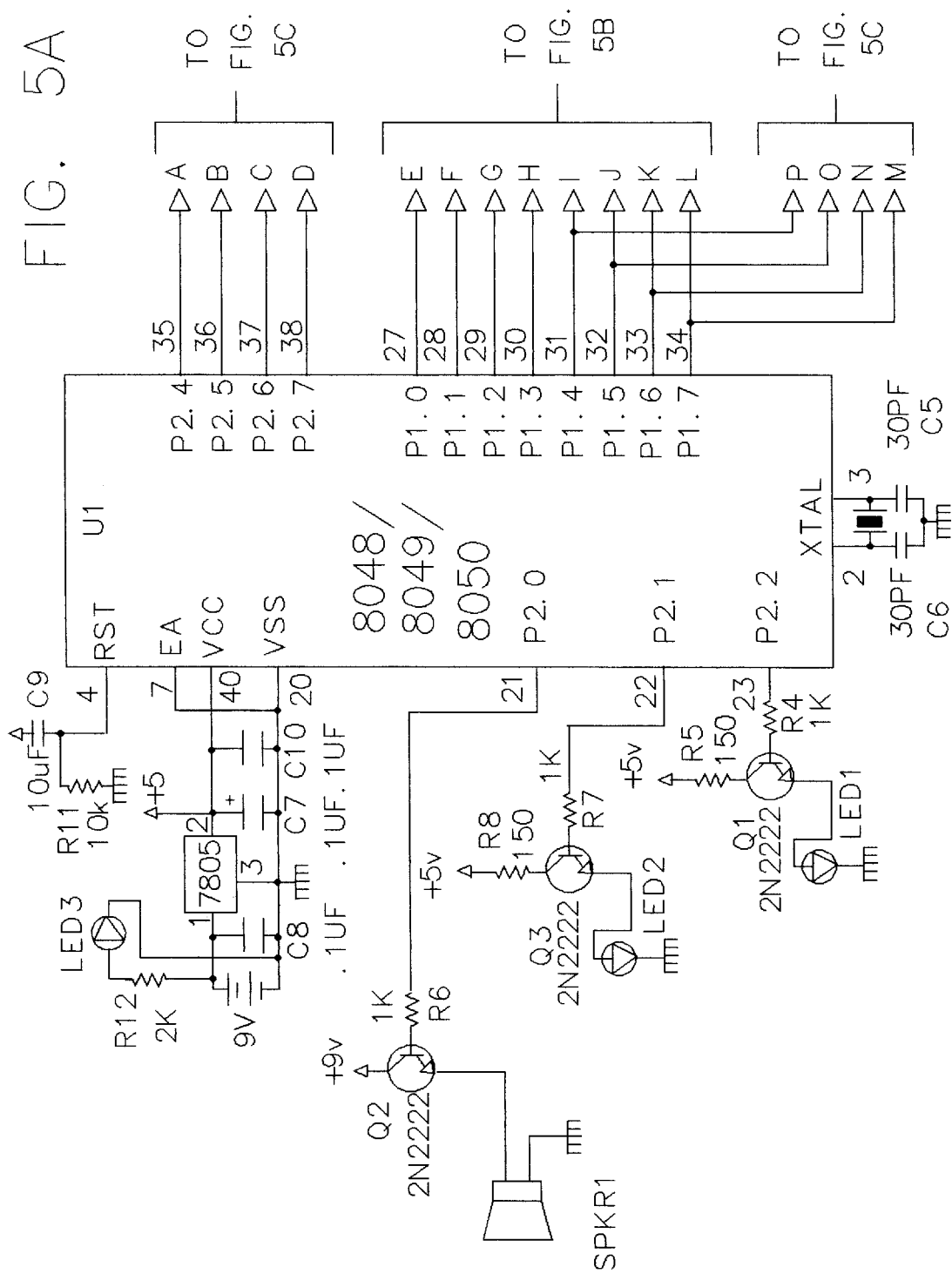

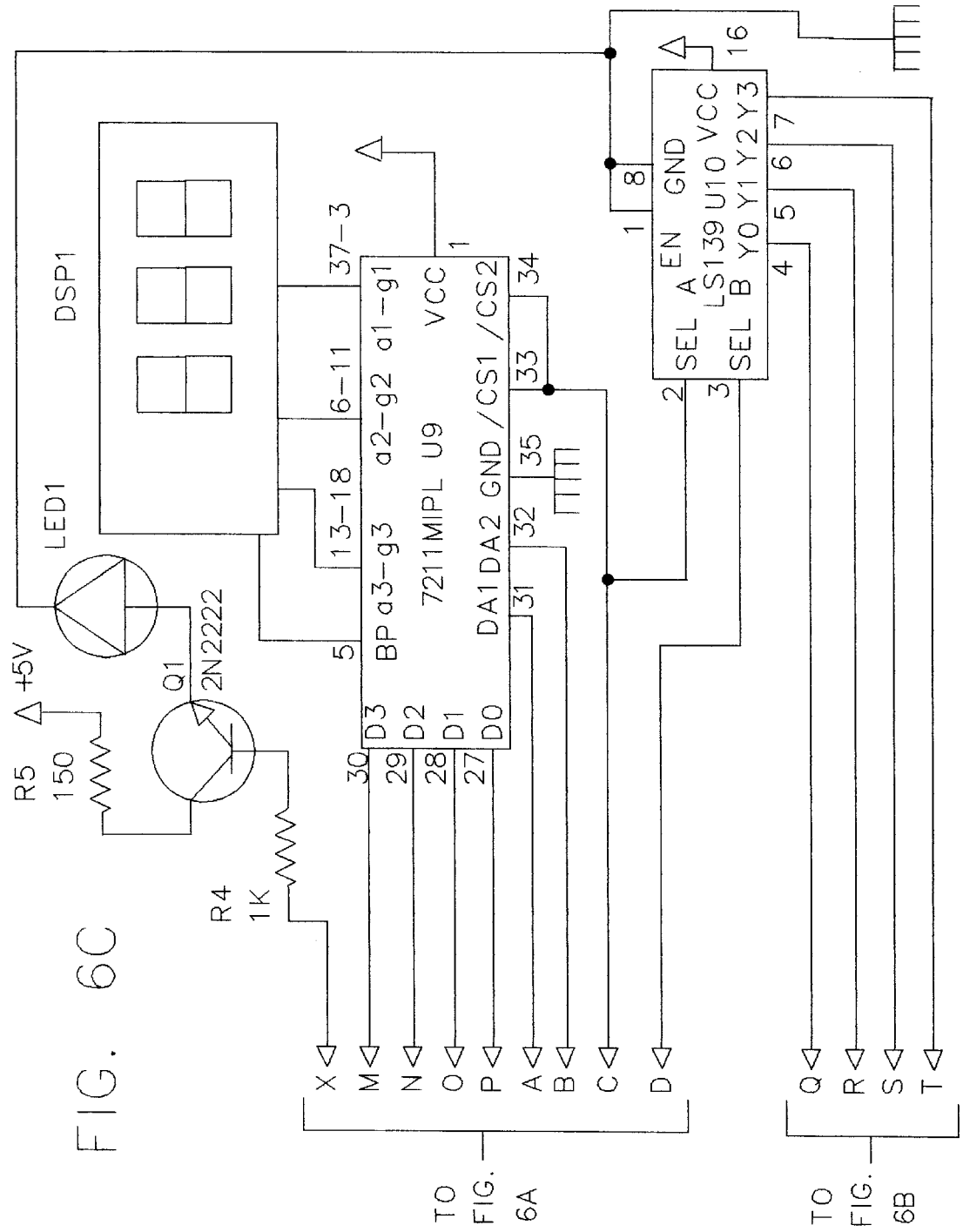

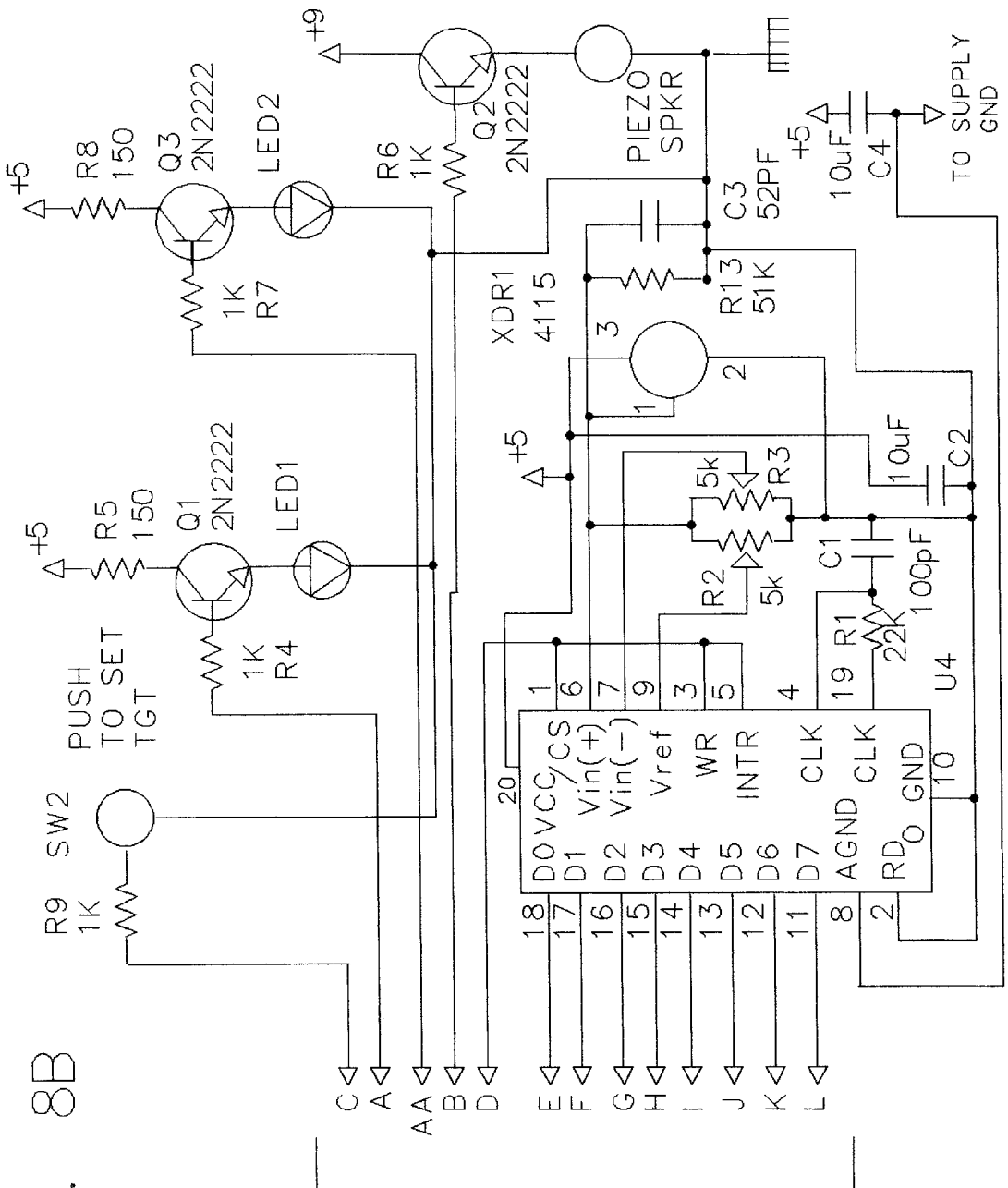

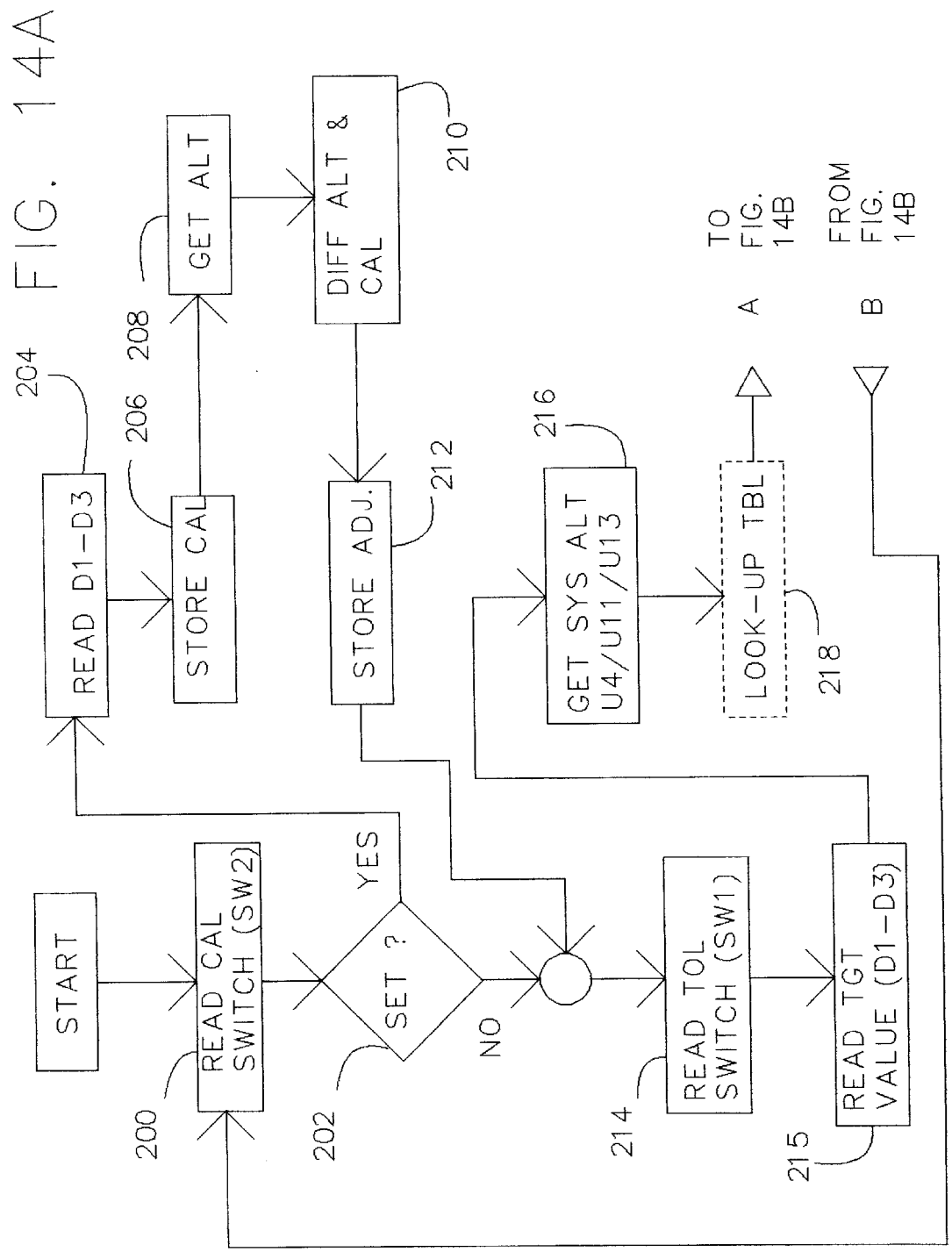

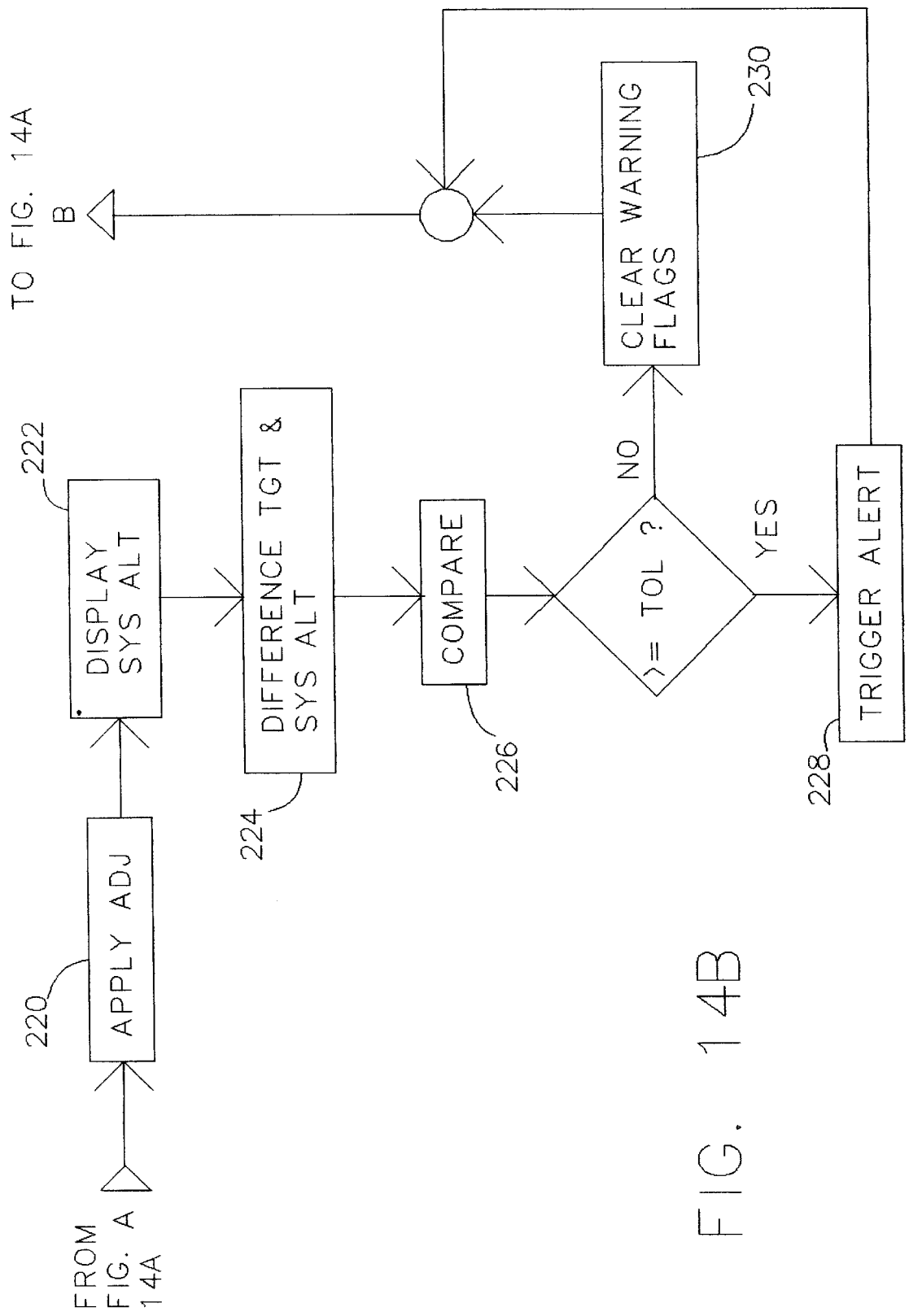

|  | PRESSURE |  | Slope | Transducer | A/D |
| --- | --- | --- | --- | --- | --- |
| Altitude | inHg. | Kpa | Kpa/ft | V(out)* | Count** |
| (1,000) | 31.0185 | 105.0410484 |  | 4.336884122 | 256 |
|  |  |  | -3.766E-03 |  |  |
| (900) | 30.9073 | 104.6644807 |  | 4.319599665 | 254 |
|  |  |  | -3.710E-03 |  |  |
| 0 | 29.9213 | 101.3254903 |  | 4.166340006 | 233 |
|  |  |  | -3.635E-03 |  |  |
| 500 | 29.3846 | 99.50800944 |  | 4.082917633 | 222 |
|  |  |  | -3.582E-03 |  |  |
| 1,000 | 28.8557 | 97.71694248 |  | 4.00070766 | 211 |
|  |  |  | -3.530E-03 |  |  |
| 1,500 | 28.3345 | 95.9519508 |  | 3.919694542 | 200 |
|  |  |  | -3.478E-03 |  |  |
| 2,000 | 27.821 | 94.2130344 |  | 3.839878279 | 190 |
|  |  |  | -3.401E-03 |  |  |
| 3,000 | 26.8167 | 90.81207288 |  | 3.683774145 | 169 |
|  |  |  | -3.301E-03 |  |  |
| 4,000 | 25.8418 | 87.51067152 |  | 3.532239823 | 149 |
|  |  |  | -3.155E-03 |  |  |
| 6,000 | 23.9782 | 81.19977648 |  | 3.24256974 | 110 |
|  |  |  | -2.969E-03 |  |  |
| 8,000 | 22.225 | 75.26274 |  | 2.970059766 | 74 |
|  |  |  | -2.790E-03 |  |  |
| 10,000 | 20.577 | 69.6819528 |  | 2.713901634 | 40 |
|  |  |  | -2.620E-03 |  |  |
| 12,000 | 19.0294 | 64.44116016 |  | 2.473349251 | 8 |
|  |  |  | -2.459E-03 |  |  |
| 12,500 | 18.6664 | 63.21189696 |  | 2.41692607 | 0 |
|  |  |  | -2.459E-03 |  |  |
| 14,000 | 17.5774 | 59.52410736 |  | 2.247656528 |  |
|  |  |  | -2.304E-03 |  |  |
| 16,000 | 16.2164 | 54.91521696 |  | 2.036108458 |  |
|  |  |  | -2.158E-03 |  |  |
| 18,000 | 14.9421 | 50.59992744 |  | 1.838036669 |  |
|  |  |  | -2.018E-03 |  |  |
| 20,000 | 13.7501 | 46.56333864 |  | 1.652757244 |  |
|  |  |  | -1.886E-03 |  |  |
| 22,000 | 12.6363 | 42.79156632 |  | 1.479632894 |  |
|  |  |  | -1.730E-03 |  |  |

FIG. 18A

| | | | | |
|---|---|---|---|---|
| 25,000 | 11.1035 | 37.6008924 | | 1.241380961 |
| | | | -1.502E-03 | |
| 30,000 | 8.88544 | 30.08965402 | | 0.896615119 |
| | | | -1.249E-03 | |
| 35,000 | 7.04062 | 23.84235557 | | 0.609864121 |
| | | | -1.018E-03 | |
| 40,000 | 5.53802 | 18.75395093 | | 0.376306348 |
| | | | -8.013E-04 | |
| 45,000 | 4.35488 | 14.74736563 | | 0.192404083 |
| | | | -6.315E-04 | |
| 49,900 | 3.44112 | 11.65300877 | | 0.050373102 |
| | | | -5.574E-04 | |
| 50,000 | 3.42466 | 11.59726862 | | 0.04781463 |

\* assuming transducer error is zero and Vs = 5.1V
\*\* range and offset adjusted for pressure  63 < Kpa < 105

FIG. 18B

METHOD AND APPARATUS OF AUTOMATICALLY MONITORING AIRCRAFT ALTITUDE

BACKGROUND OF THE INVENTION

1. Technical Field

The apparatus and method of the present invention relate generally to aircraft altitude monitoring for small, general aviation aircraft. More specifically, they relate to an apparatus and method of providing automatic monitoring of the aircraft's present altitude, and issuance of alert warnings, upon detection of deviations from a target altitude, to the pilot.

Pilots are frequently given instructions from Air Traffic Controllers (ATC) in rapid fire sequence. Consequently, pilots have developed several techniques to remind them of these instructions. For example, it is common to use the autopilot heading bug on the heading indicator as a reminder of an assigned heading. The present invention described herein provides a reminder of altitude assignments, and an alerting mechanism to warn of excursions from an assigned altitude.

Most large and medium sized aircraft have on-board altitude alerting systems. In fact, The FAA mandates altitude alerting systems for jet aircraft. However, most smaller aircraft do not have this type of equipment. The main reason for this is cost, both of the equipment itself and also its installation. While altitude alerting systems are not routinely found in smaller aircraft, they are equally useful there. The present invention is designed to address these limitations and make alerters more widely available to small general aviation aircraft.

The present invention is adapted primarily to visually and/or aurally warn the pilot of altitude deviations from an assigned or desired altitude. The invention, in one design of the preferred embodiments, is designed to be self-contained so as to negate or minimize any installation work. Alternative designs of the preferred embodiments provide for acquisition of altitude information from external sources either as the primary altitude information source or as an alternate source. One example of such an external source is the GPS receivers, especially the hand held units which many pilots carry with them. The various designs may also be capable of alerting to the existence of other conditions such as abnormal vertical speeds and the like.

Two preferred embodiments are disclosed. The first preferred embodiment is a more sophisticated system providing a means wherein the target altitude may be preselected and will utilize a means for displaying information such as sensed system altitude. Further, the first preferred embodiment provides a means for calibrating the system altitude. The second preferred embodiment is a simpler system not utilizing a display or altitude preselect. Rather, this embodiment utilizes a simple push-button to designate the target altitude once the pilot has reached this altitude, thereafter, monitoring for any deviations therefrom.

The preferred embodiments comprise a plurality of designs utilizing a variety of sources of altitude information. In one design a self-contained altitude sensing means is used, eliminating the need to connect the alerter to the aircraft altimeter or encoder. In an alternative design, the altitude data from a Global Positioning System receiver may be used. In yet another design, the output of an altitude encoder may be used. Finally, various combinations of these sources may be utilized, cross-checking and verifying the altitude information between them.

In the designs utilizing a self-contained altitude sensing means, the alerter is able to utilize cabin pressure for altitude measurements since the pressure in an unpressurized aircraft cabin is approximately equal to that outside the aircraft. In fact this is the system utilized for alternate static source in most small aircraft. Any differences between the interior and exterior pressure are accommodated in the first preferred embodiment using the system calibration feature, and in the second preferred embodiment by use of relative pressure differences between the target and actual altitudes to determine alerts.

It is anticipated that the information displayed in the first preferred embodiment would utilize a multi-digit LCD to display the system altitude. The display may also be capable of displaying altitude deviations and other alpha/numeric data depending on the specific display means being used. Additionally, in both embodiments, an indicator light may be used to visually indicate excessive altitude deviations, vertical speeds, etc. Finally, aural warnings may be given either in the form of horns/beeps/synthesized voice which would coincide with the alert warning.

Throughout the specification, the following terms and their definitions will be used. "Present", "sensed", or "system" altitude will all be used to refer to the aircraft's altitude as read or computed by the altitude alerter. "Target" altitude will describe the desired altitude, i.e. the altitude the aircraft has been assigned, or the altitude that the pilot is otherwise wanting to maintain. The tolerance window is a number of feet, within which the aircraft altitude is allowed to deviate before triggering an alert. "Excessive deviation" will be used to refer to the situation where the absolute difference between the system altitude and the target altitude is greater than a tolerance window. Detection of an excessive deviation will result in an "altitude alert" condition.

It is envisioned that the present invention will be primarily designed for the enroute phase of the flight. Limitations in accuracy of the present invention does not permit its use in instrument approaches, or other phases of flight where great precision is required.

2. Description of the Prior Art

The concept of altitude alerting is not new. As mentioned above, turbine aircraft have been required to carry such equipment for some time. Additionally, there are several types of altitude alerting products currently on the market for smaller general aviation aircraft. However, these devices all suffer from drawbacks of one type or another which the present invention is designed to address.

By far the simplest and cheapest of the prior art alerters are the suction cup "bugs" adapted for placement on the altimeter window. These consist generally of some type of a rotatable arm which is placed at the desired setting. The theory being that the pilot will note when the altimeter hand is not co-located with the alert indicator, signalling an altitude deviation. The problem with such indicators is that there is also no automatic notification of an altitude alert. Thus, the pilot must be looking at the altimeter to see the warning. Consequently, there is no automatic safety alert of altitude deviation if a pilot is temporarily distracted from monitoring that specific instrument.

Other more complex prior art systems exist for monitoring altitude. These systems can be broken into two groups, differentiated primarily on the source of the altitude information.

The first group comprises alerters utilizing an altitude encoder, sometimes referred to as a "blind" encoder. As is well understood by those in the art, the FAA requires aircraft flying in certain airspace to have a "Mode C" altitude reporting transponder. The transponder usually receives its altitude information from this blind encoder. The blind encoder puts out a signal commonly referred to as a "grey code" representing the aircraft altitude which the transponder reads and transmits. The altitude alerters in this group also read this grey code and utilize that information for alerting purposes. There are several examples of such alerters on the market. Two examples of this type of prior art system are the Shaidan AMS 2000 and the Iccarus Instruments "AltAlert".

A second group of prior art systems use the aircraft's own Mode C transponder signal to display altitude information. This second group of altitude alerting systems receives the aircraft transponder's 1090 MHz RF transmission and displays the altitude information in the cockpit. Of course, the reliability of this type of system hinges not only on the encoder feeding the altitude information to the transponder, but also on the transponder itself. Unfortunately, the failure of the encoder or transponder is the time you most need an altitude altering system since ATC will no longer be able to provide the pilot with altitude deviation warnings. One example of this type of system is the Airsport Company's "Airsport PRO".

Finally, several manufacturers' products have an altitude alerter as a subsystem in another component. For example, the Bendix/King and S-TEC companies have such units. The S-Tec "Altitude Selector/Alerter" unit being part of an altitude preselect for its autopilot. This unit is also dependant on the aircraft encoder for the altitude information.

Finally, at least one autopilot utilizes a pressure transducer as part of its "altitude hold" function. However, there is no attempt to determine the actual altitude. Rather, the pressure sensor is simply used to keep the aircraft at the same pressure (altitude)without regard for what the altitude actually is. Additionally, there is no alerting capability.

As mentioned, one design of the altitude alerter of the present invention is adapted to be as self-contained as possible, eliminating any necessity for connection or reliance on an aircraft altitude encoding system, allowing it to be completely transportable.

To achieve this objective, the alerter of this design has been developed utilizing a self-contained source for altitude information. One example of such a self contained source is a pressure transducer. There are many examples of sensors which have acceptable pressure and voltage output ranges.

Consequently, it is a primary objective of the present invention to provide an altitude alerting apparatus and method using self-contained source of altitude information.

Another primary objective is to provide an alerter capable of reading altitude data from a pressure transducer.

An alternative objective is to build an alerter capable of reading altitude information from an altitude encoder.

Another objective is to provide an alerter apparatus capable of reading the altitude information from a Global Positioning System receiver, such as from an RS232 port.

It is a further objective of the present invention to provide an altitude alerting apparatus and method having an altitude range corresponding approximately to the most commonly used general aviation altitudes.

It is a further objective to provide a first preferred embodiment of an altitude alerting apparatus and method having a display means for displaying altitude information.

It is a further objective to provide a first preferred embodiment of an altitude alerting apparatus and method having a means for entering pre-selected target altitude information.

It is a further objective to provide a first preferred embodiment of an altitude alerting apparatus and method having a means for calibrating the system altitude.

It is a further objective to provide an altitude alerting apparatus and method having a means for visually signalling an altitude alert condition.

It is a further objective to provide an altitude alerting apparatus and method having a means for aurally signalling an altitude alert condition.

It is a further objective to provide an altitude alerting apparatus and method having a means for selecting an altitude deviation tolerance window, within which the aircraft altitude may vary without triggering an altitude alert warning.

It is a further objective to provide an altitude alerting apparatus and method having a means for indicating the present altitude as the target altitude.

It is a further objective to provide a first preferred embodiment of an altitude alerting apparatus and method having a means for providing a continuous visual display of the target altitude.

A final objective is to provide a simplified, second preferred embodiment having the minimum of components necessary to effect an altitude deviation detection and warning.

SUMMARY OF THE INVENTION

An apparatus and method for automatically and independently determining aircraft altitude and alerting the pilot to deviations from a target altitude exceeding a specified tolerance. The alerter comprising an altitude sensing means for sensing the present altitude of the aircraft. The invention discloses three sources for altitude information namely, a self-contained sensor such as a pressure transducer, a Global Positioning System receive, or an altitude encoder. A target entry means is used for entering the target altitude to which the present aircraft altitude is compared. A computation means receives and processes the present aircraft altitude information from the altitude sensing means and the target altitude from the target entry means. The computation means is operative to compare the present altitude to the target altitude and to compute the difference therebetween. The computation means is also operative to compute the absolute value of the difference between the target and present altitudes to the tolerance value. An indicating means signals an altitude alerting condition upon the detection of a condition wherein the absolute difference is larger than the tolerance value. The altitude alerting apparatus may also comprise a display means for display of the present aircraft altitude information.

The target entry means may comprise a push-button electrically connected to the computation means such that upon depressing of the push-button, the target altitude is equated to the present aircraft altitude. Alternatively, the target entry means may comprise at least one multi-position switch electrically connected to the computation means such that upon selection of one of the multi-positions, a number representing the target altitude is entered into the computation means.

The altitude alerting apparatus may also comprise a means for inputting a variable tolerance window within which the absolute difference between the target altitude and the present altitude may vary without triggering an altitude alert condition.

Finally, the altitude alerting apparatus may comprise a means for effecting a system calibration whereupon entry of a reference altitude on the target entry and activation of the system calibration means, the computation means is operative to compare the reference altitude to the sensed aircraft altitude and to compute the difference therebetween, the difference defining an altitude adjustment value which may be applied to later sensed aircraft altitudes.

BRIEF DESCRIPTION OF THE DRAWINGS

FIGS. 3A–3C are schematic diagrams of an alternative design for the first preferred embodiment of the present invention utilizing internal program memory and an 8051 microcontroller.

FIGS. 4A–4C are schematic diagrams of an alternative design for the first preferred embodiment of the present invention utilizing an INTEL 8048/49/50 microcontroller.

FIGS. 5A–5C are schematic diagrams of another alternative design for the first preferred embodiment utilizing an 8051 controller and adapted to read the "grey code" from an altitude encoder.

FIGS. 6A–6C are schematic diagrams of another alternative design for the first preferred embodiment utilizing an 8051 controller having a self contained altitude sensing means and adapted to read the "grey code" from an altitude encoder as a back-up.

FIGS. 8A–8C are schematic diagrams of a second preferred embodiment of the present invention utilizing an 8031 controller.

FIGS. 14A–14 B are flow chart showing the major functions performed in software in the first preferred embodiment.

FIGS. 18A–18B are table showing the relationship between some specific 'standard day' pressures and altitudes and the voltage output of a typical transducer and Analog-to-digital (A/D) convertor count in response thereto.

DESCRIPTION OF THE PREFERRED EMBODIMENT

1. Theory of Operation

Figure 1:
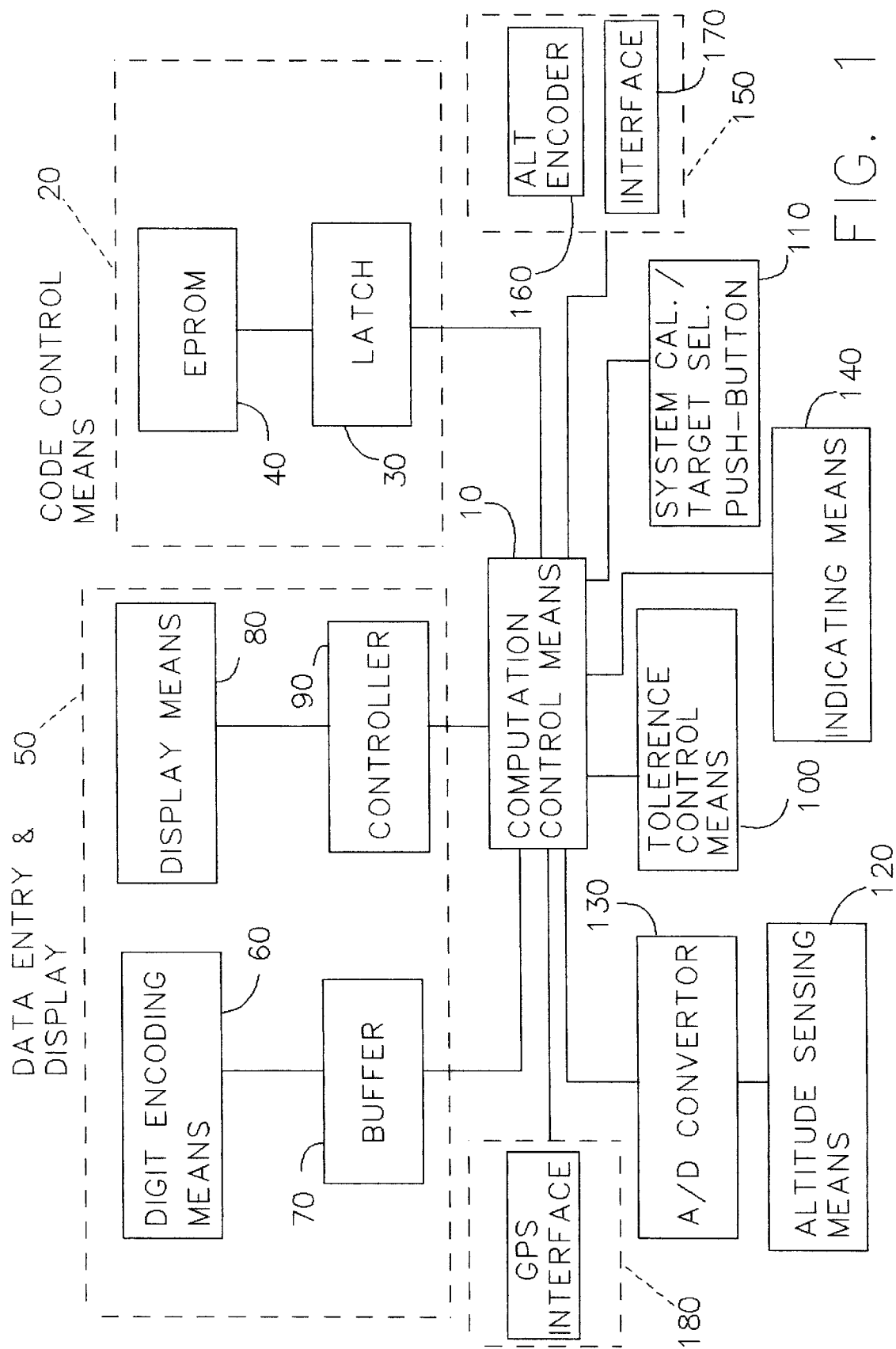
FIG. 1 is a functional block diagram of the apparatus.

The purpose of the present invention is to provide the pilot with an automatic indication of excessive deviations from a "target altitude." In this specification, "target altitude" will be used to refer to an altitude entered into the system and to which the actual (sensed) present aircraft altitude is compared. Such a target altitude may be any altitude entered by the pilot and may correspond to an altitude assigned by Air Traffic Control (ATC), or the like. It is envisioned that entry of the target altitude will be accomplished using a target entry means in one of two ways. In the more sophisticated, first preferred embodiment (FIGS. 2A–7C), target entry means may comprise a multi-position switch which would allow the pilot to pre-select the altitude and also provide a means for entering system calibrations as described below. In the simpler, second preferred embodiment (FIGS. 8A—13B), the target entry means may comprise a push-button which would be depressed upon reaching the target altitude to identify the (then) present altitude as the target altitude.

a. Data Entry

As mentioned, a multi-position switch may be utilized as a data entry means in the first preferred embodiment for entry of target and calibration information. One preferred example of such a data entry means comprises three, 10-position, thumb-wheel switches. Each displays a number 0–9 and outputs a BCD number indicative thereof. It is contemplated that altitude information would be entered in 100's of feet. Therefore, use of three digits permits a range of 0–99,900 feet—more than sufficient for general aviation aircraft. Additionally, assigned and cruising altitudes are almost always given in one-hundred foot increments. This data may correspond to the target altitude or may be used to calibrate the system altitude by entering the aircraft's present altitude from the altimeter. When used for entry of the target altitude, the 3-digit thumb-wheel provides a continuously visible reminder to the pilot of the target altitude.

As mentioned, a momentary push-button switch could be used to trigger a system altitude calibration. As explained in more detail below, the current aircraft altitude or ramp elevation if setting on the ground, would be entered using the thumb-wheel switches, after which the momentary, calibration trigger switch is depressed. This causes the system to read the thumb-wheel switches and compute a correction or adjustment factor. This system calibration could be effected at any time during the flight, whenever the pilot recognizes a difference between the displayed system altitude and his altimeter. One common situation in which correction would likely be required is when traversing different pressure zones. Additionally, when the system is utilizing internal cabin pressure for measurement, large changes in airspeed may also necessitate a re-calibration. Still further, non-standard day conditions may require a calibration even before beginning the flight. Note that the calibration may be effected on the ground or in the air.

b. Display/Warnings

The altitude alerter of the first preferred embodiment will comprise a means for visually displaying information to the pilot. Most basically, this information would consist of the present system altitude. Depending on the sophistication of the display, it may also display other information such as the computed deviation, etc.

In the first preferred embodiments of the present invention, this display will consist of a three digit LCD display, capable of displaying altitudes 0–99,900 using the 100s feet notation. This is more than sufficient to accommodate the range of the system. Additionally, the LCD may display a "+/−" upon the sensing of deviation from the target altitude, and the value of the computed deviation.

LCD displays are well known and widely used in the art. One reason for their popularity is their lower power consumption as compared with LEDs. Thus, the LCD display provides a method of displaying data to the pilot with the minimum cost and power. One example of an acceptable LCD display is manufactured by Seiko Instruments. As mentioned below, many other alternatives are available.

It is presently anticipated that the software would be coded to display the sensed aircraft altitude during normal operation. This display is no substitute for the aircraft altimeter but serves merely to let the pilot know what altitude the alerter is using for comparison with the target altitude. As discussed, the aircraft's altimeter would likely be used for calibration of the alerter system if a discrepancy is noted therebetween.

While the preferred display would be a 3 digit LCD, other displays are acceptable. For example, more exotic displays could be used for displaying additional information such as text, or the like. One example is HED092 1×16 dot matrix LCD manufactured by Falcon/Trumeter of Manchester, England which permits display of 16 text characters.

Finally, the main function of the alerter is to alert the pilot to "excessive" altitude excursions outside the tolerance window. This tolerance may be pre-programmed or may be selected by the pilot. If it is to be selected, another multi-position switch may be used to select the desired altitude tolerance window, e.g. +/− 150, 200, 250, etc. with each position correspond to a predetermined value specified in the software.

If an altitude deviation is detected outside the tolerance window, an alert is generated. These alerts may take either visual or aural form.

With respect to the aural warnings, in the preferred embodiment a piezoelectric buzzer is used although other means such as synthesized voice messages, or the like may be used. Depending on the aircraft noise level and the output level of the selected sound generating means, it may be desirable to input the aural signal into the aircraft's intercom system to ensure that it is heard. With respect to the visual warnings, the preferred embodiment utilizes an LED to get the pilot's attention.

c. Source of altitude data

The present invention contemplates several sources of altitude information. As mentioned above, all aircraft are now required to carry "Mode C" transponders to enter certain airspace. These aircraft generally have some type of altitude encoding apparatus on board either in the form of an encoding altimeter or more likely what is referred to as a "blind encoder." These "blind encoders" output altitude information in a standard parallel format referred to a the 'SSR transmission code' and known in the art as the "grey code." As is well understood in the art, the use of 9 parallel data bits covers an altitude range of −1,000 to 30,000 feet.

Thus, it is contemplated that one alternative embodiment of the present altitude alerter would be adapted to "read" and decode this grey code for alert processing. As mentioned, this technique is old in the art. However, for back-up purposes, it may be desirable to include this as an optional feature on the preferred embodiments of the present invention.

Another method of acquiring the needed altitude information is from the increasingly popular Global Positioning System (GPS) receivers. Many of these receivers contain an external data port which allows communication using an RS232 port. These GPS receivers output position and other data, including altitude, using an NMEA format. Thus, alternate designs of the first and second embodiments disclose alerters wherein altitude information may be acquired using by reading the data from the GPS external data port. As described in more detail below, the INTEL MCS 51 family controllers have internal circuitry which allows direct connection to serial data and thus are ideally suited to this task.

These alternative designs require interfacing the alerter to another piece of equipment, either the encoder or the GPS receiver, to access the altitude information. In the case of the encoder, or panel mounted GPS, this would likely require the services of a licensed mechanic. While the cost of these services may not be great, they may comprise a good percentage of the unit's cost. Additionally, for renter pilots, these wiring modifications are not possible. Therefore, in the interests of making the present invention as portable as possible, the primary designs of the first and second preferred embodiments utilize a self-contained means of altitude determination.

One example of such a self-contained means is a pressure transducer. Such transducers are manufactured by Motorola and SenSym among others. A specific example of such a transducer is the Motorola model MPX 4115 which operates over a pressure range of 15–115 Kpa. This corresponds to a 'standard day' altitude range of approximately −1,500 to 45,000 feet, referenced to mean sea level (MSL). This transducer outputs a 0.5–4.5 volt dc signal over this pressure range and may be directly interfaced to an Analog-to-Digital (A/D) converter as described below. The A/D can then scale and level-shift the output as described below, to accommodate an altitude range more applicable to small general aviation aircraft.

There are many other examples of sensors which have acceptable pressure and output voltage ranges. The key is to select a sensor which covers the pressure range of interest and then to scale and/or level shift the transducer output to maximize A/D resolution over this range as discussed below.

Figure 16:
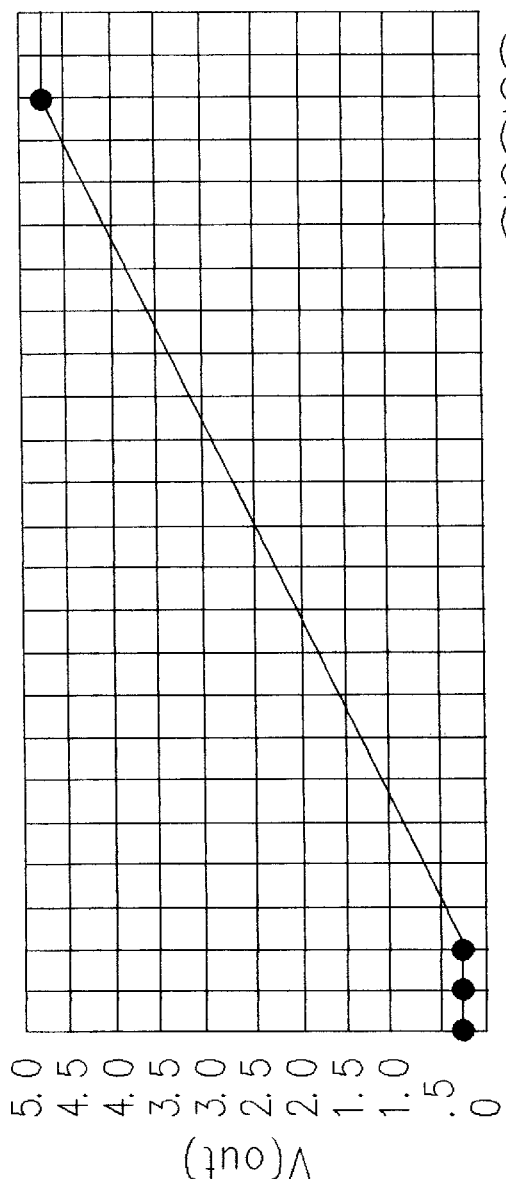
FIG. 16 is a graph showing the relationship between pressure and output voltage of a typical pressure transducer.

FIG. 16 illustrates the relationship between the pressure sensed by the transducer and its voltage output at a given supply voltage. Motorola indicates that the general transfer function for the 4115 model transducer is given by:

$$V_{out}=[V_{ss}*(0.009*P-0.095)]+/-EF \qquad \text{Eq. 1}$$

where: $V_{out}$ is the dc voltage output of the transducer;
$V_{ss}$ is the dc supply voltage to the transducer;
P is the atmospheric pressure in KPa units; and
EF is the error factor for that specific transducer.

Of course in use, the voltage output ($V_{out}$)of the transducer is the measured parameter, and the pressure (P), and altitude, are deduced therefrom. Rearranging terms, the transfer function would look like:

$$P=[\{[(V_{out}-/+EF)]/V_{ss}\}+0.095]/0.009 \qquad \text{Eq. 2}$$

Thus, the pressure acting on the transducer may be deduced from the dc voltage output of the transducer, at a given supply voltage and known error factor. Of course the quantity ultimately to be determined is the altitude.

If there were a simple linear relationship between pressure and altitude, all that would remain for an altitude determination, would be to plug the derived pressure value from eq. 2 into the linear equation and calculate the value of the altitude. Unfortunately, the relationship is not linear.

Figure 17:
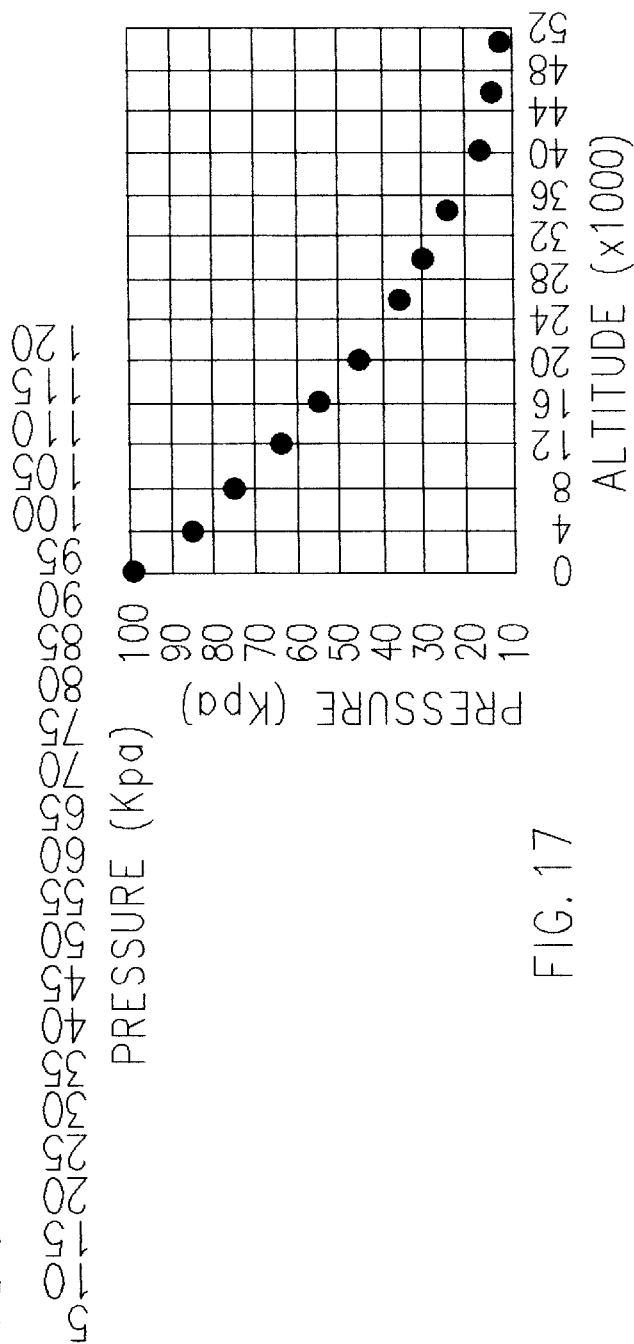
FIG. 17 is a graph showing the qualitative, non-linear relationship between pressure and altitude above mean sea level (MSL).
Figure 19:
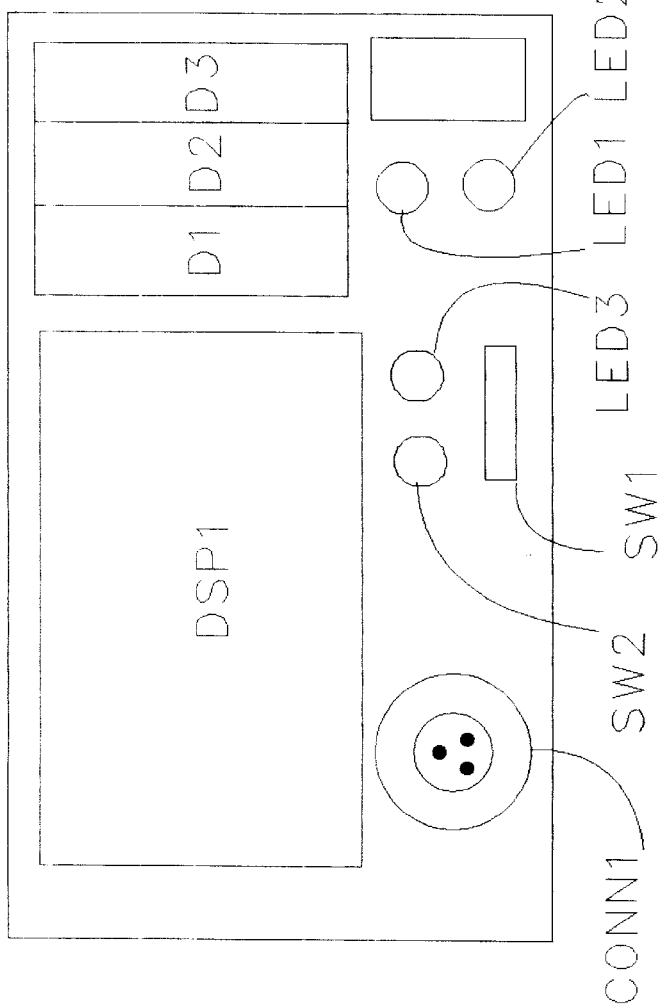
FIG. 19 is a front view of an exlemplary faceplate, including external controls and indicators, of the first preferred embodiments.
Figure 20:
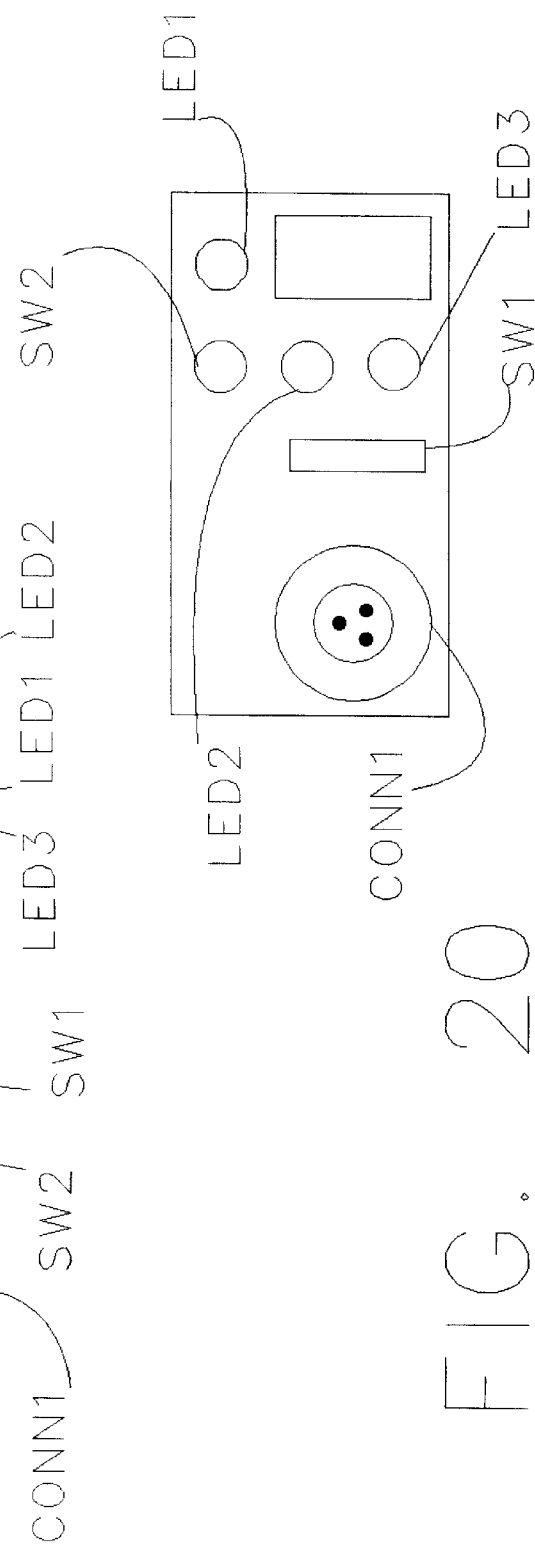
FIG. 20 is a front view of an exlemplary faceplate, including external controls and indicators, of the second preferred embodiments.

FIG. 17 is an illustration of the relationship between the pressure and altitude above mean sea level (MSL). Additionally, FIGS. 18A–18B illustrates the pressure gradient (dP/dA) between various altitudes. As can be seen, the relationship may be generally characterized as a decaying exponential. Therefore, one method of deriving an altitude from the pressure value, would be to ascertain the general form equation describing this curve. The derived pressure value could then be inserted into the equation and the altitude computed. While such computations are easily accomplished in a microprocessor, they are somewhat memory and time intensive. Additionally, depending on the complexity of the general form solution, they may involve a significant amount of code. In the case of an 8-bit A/D, there are only 256 combinations. Therefore, in a preferred embodiment of the present invention, the correlation between pressure, A/D count and altitude, is addressed using a look-up table.

If, as in some of the designs, the aircraft altitude is acquired from an external source such as a blind encoder or GPS receiver, the data may already be in feet above sea level (MSL), and no look-up table is required.

As has already been discussed, the measured quantity from a pressure transducer is the dc voltage output. This voltage varies proportionally (albeit non-linearly) with the pressure sensed by the transducer. However, as is well understood in the art, this dc voltage is not directly measurable by a microprocessor but must be converted into an acceptable digital format. The easiest way to accomplish this is using an analog-to-digital (A/D) converter. As is well understood in the art, many A/D converters are available with a variety of operating characteristics. One of the most fundamental characteristics for system design is the resolution of the converter, i.e. the number of segments into which the sample voltage range is broken. This follows directly from the bit size of the convertor, i.e. 8 bits=256 steps. The corollary to this is the step size, i.e. the voltage difference ($\Delta V$) between each step, i.e. $\Delta V/256$. In the present invention, this voltage step size ($\Delta V$) correlates to an incremental pressure ($\Delta P$). This $\Delta P$ in turn translates into a differential altitude $\Delta A$. An example of this relationship is illustrated in FIGS. 18A–18B.

To determine the required resolution for the A/D, one need define the system's operating altitude range and divide by the altitude resolution required. For the reasons given above, the altitude operating range 0–12,500 feet (MSL) likely provides sufficient range for the alerter of the present invention. Additionally, for the purposes of the present invention, it is felt that a resolution of approximately 50 feet provides sufficient capability.

Performing the computation results in a requirement for a resolution of approximately 250 steps (12,500/50). A/D converters are readily available using an 8 bit format which provides 256 ($2^8$) resolution steps or counts, each of which represent a different voltage. Additionally, since there are many small microcontrollers available in 8-bit formats, these 8-bit A/Ds are easy to interface. Many 8 bit A/Ds are available. One suitable example, utilized in the preferred embodiments, is the Harris ADC0804. If additional range or resolution is desired, 12 bit A/Ds may be used. The output of such A/Ds may be multiplexed or may be connected to more than one port, in order to read the data.

It should be understood that while an operating range of 0–12,500 feet has been discussed, other ranges may easily be supported. For example, using the 8 bit A/D, a greater range (e.g. 0–25,000) may be accommodated if a degradation in resolution (e.g.100 feet) is acceptable. Alternatively, as mentioned, the resolution may be maintained and the range increased if a larger A/D bit format is used, e.g. 12 bits.

Additionally, it should be noted that what the transducer is actually measuring is pressure, not altitude. Altitude is simply inferred from the pressure, based on the known relationship between altitude and 'standard day' atmospheric pressure. As is well known to those in the art, 'standard day' refers to a certain specific set of conditions, e.g. a temperature of 59° F. and a pressure of 29.92 in. Hg., at sea level. Thus, an altitude range of 0–12,500 feet equates to 'standard day' pressure range of 101 to 63 Kpa (FIGS. 17 and 18A–18B). However, every day is not a 'standard day'. Thus, it is desirable to extend the operating pressure range of the system slightly on either side of the normal range, e.g. 105–60 Kpa, to accommodate natural fluctuations in atmospheric pressure. These normal fluctuations are also accommodated using the system calibration feature of the first preferred embodiment. This is not so much a concern in the second preferred embodiment which is more concerned with the relative difference in pressures between the target and the present aircraft pressure readings. However, in both embodiments, traversing a large pressure gradient may necessitate adjustment. In the case of the first preferred embodiment, this would be a system calibration. In the case of the second preferred embodiment, this would be a resetting of the target altitude.

Using the above recited transfer function (eq. 2), one is able to ascertain a pressure reading from the dc voltage output (Vout) of the transducer. Additionally, as illustrated in the graph of FIG. 17 or tabular data of FIGS. 18A–18B, an altitude may be derived from a given pressure. Therefore, a correlation can be established between the dc voltage measured from the transducer and the present altitude of the sensor. However, as mentioned, it is not a voltage which is read by the microprocessor, rather it is a count (0–255) from the A/D convertor. Thus, an additional layer of correlation must be made, namely between voltage and A/D count. This is quite straightforward however since the A/D converter simply divides the specified voltage range into a number of evenly spaced steps. For example, with the 0804 A/D converter, the number of steps is 256 ($2^8$). In most converters, the input voltage range defaults to 0–5 volts, making each step equivalent to 5/256=19.5 mV. However, the 0804 A/D has inputs which allow the zero offset and gain (i.e. maximum voltage) to be adjusted thereby adjusting the range over which the 256 steps are taken. This feature is utilized in the preferred embodiments of the present invention as follows, in order to maximize the resolution.

FIGS. 18A–18B illustrates the A/D count correlation for several points between pressures of between 105–63 Kpa. FIG. 16 illustrates the pressure/voltage relationship for the Motorola MPX 4115 transducer, it is seen that the operational voltage range of 0.25v to 4.5v corresponds to pressure range of 15 Kpa to 115 Kpa respectively. As seen from FIG. 17 or FIGS. 18A–18B, these pressures correspond to 'standard day' altitudes of approximately –1,500 feet to 45,000 feet above mean sea level. Since these ranges are outside the contemplated operating range of the present invention, resolution of the A/D converter can be improved by level shifting the zero offset and maximum voltage value. For example, as mentioned, one example of a preferred operating range of the present invention might be approximately 0–12,500 feet (MSL). It will be observed from FIGS. 17 and 18A–18B that this corresponds to a pressure range of approximately 101 Kpa to 63 Kpa which in turn, with a Vss of 5.05 V, corresponds to a Vout range of approximately 2.38v to 4.11 v respectively (see Eq. 1). However, as mentioned, in order to account for non-standard day situations, it is desirable to use a pressure range of 105 to 60 which would accommodate the pressure ranges observed in the altitude range 0–2,500 feet (MSL). As observed from the figures and the transfer function (eq. 1), these pressures correspond to a Vout from the transducer of approximately 4.29v and 2.25v respectively. This corresponds to pressures of approximately 60 Kpa and 105 Kpa respectively, which in turn translate to 'standard day' altitudes of approximately 13,500 and –1000 respectively. Therefore, it is desirable to modify the "offset" and "Vref" values of the A/D to correspond to these values in order to maximize the resolution. These techniques are well known to those in the art.

d. Vertical Speed

The present invention may also be programmed to generate a vertical speed warning to the pilot. This warning would be instituted upon the sensing of a vertical speed outside some preset limit. This limit may either be preprogrammed into the system, or entered using the data entry switches, such as those used to enter the pre-selected target altitude in the first preferred embodiment.

The vertical speed will be computed in the normal fashion by taking the time difference of two altitude measurements with appropriate filtering to remove transients from turbulence, etc.

2. Implementation

FIG. 1 is a block diagram illustrating the major functional components of the present invention. As seen in the figure, computation control means 10 is the center of the system and is the block to which all other components are interfaced or connected. It is anticipated that the computational control means 10 would be a microcontroller or microprocessor such as the INTEL MCS 51/MCS 48 series, ZILOG Z8/Z80 series, MOTOROLA's 6800, etc. In the preferred embodiments, INTEL MCS 48 or MCS 51 family of controllers are used.

An external code control means 20 may be used, if required, to store and control program memory for the microcontroller. Code control means 20 has been indicated with a doted line to identify its optional nature. If an external code control 20 is utilized, it would likely include latch 30 and EPROM 40. As is well understood in the art, latch 30 would serve to de-multiplex the address and data as required on the MCS 51 controllers for external control of program memory. The EPROM 40 is used for storage of the program code. However, depending on the microcontroller configuration chosen, such an external code control means might not be necessary. For example, as mentioned, in the preferred embodiments, an INTEL 8051 or 8048/49/50 are used as the computation means 10. As those well skilled in the art will recognize, these microcontrollers comprise up to 4K of internal ROM. If this is sufficient capacity for the software code, as in the present invention, the external code control 20 may eliminated, and the program code stored, 'on-chip'. Elimination of the code control means is preferable since this effects a saving in both parts count and in power consumption.

Also illustrated in FIG. 1 is the data entry and display block 50. This block has also been indicated with a dotted line to indicate its optional nature. As discussed above, the second preferred embodiment of the present invention contemplates a simple model in which no data entry or altitude display block 50 is used.

If, as in the first preferred embodiment, data entry and display block 50 is utilized, it would likely include a digit encoding means 60 and associated buffers 70. As described in more detail below, this digit encoding means 60 may comprise a plurality of multi-position, thumb-wheel/push-button switches, or the like. Buffers 70 would likely be TRI-STATEed®. The data entry and display block 50 would also likely comprise a display means 80. Depending on the type of display means 80 selected, an associated controller 90 may also be required. As described below, display means 80 would preferably be capable of displaying 3 digits of data, corresponding to the altitude format contemplated by the present invention (i.e. 100s of feet). One preferred display means is an LCD display, favored in part due to its low supply current requirements and widespread available. The requirement for, and selection of, controller 90 would be determined by the choice of display means 80.

Another functional block illustrated in the figure is tolerance control means 100. It is anticipated that tolerance control means 100 may comprise circuitry to select the desired altitude deviation tolerance window within which altitude variations from the target altitude are permitted without triggering an alert. Such circuitry may comprise a multi-positioned switch, each position representing a different tolerance window (e.g. +/–100, 150, 200 feet). Alternatively, the software may be coded to utilize a default tolerance value, eliminating the need for a tolerance entry switch.

Computation control means 10 may comprise circuitry which would interface a system calibration means or a target altitude select switch 110, depending on which embodiment is being utilized. For example, in the second preferred embodiment, wherein the target altitude is identified upon reaching the altitude, this target select switch 110 could be a push-button. Alternatively, in the more sophisticated first preferred embodiment, system calibration means 110 may also comprise a push-button, the depression of which may signal initiation of a system altitude calibration.

In the first preferred embodiments, system calibration is also accomplished using the digit encoding means 60. The system calibration is effected by entering a calibration altitude (e.g. from the altimeter) using the digit encoding means 60. The system calibration means 110 is then activated, causing the software to read the data on digit encoding means 60 as a calibration altitude. The software then reads the 'sensed' aircraft altitude from the altitude sensing means 120 and A/D 130, and computes the difference between this value and the calibration altitude. This difference is then saved as a correction or adjustment factor to be applied to future system altitude computations to derive the 'adjusted system altitude'.

A system calibration may be accomplished as often as necessary. Presumably, such a calibration would be effected when a divergence between the system altitude displayed on display means 80, and the aircraft altitude displayed on the altimeter is noticed.

As mentioned, altitude sensing means 120 is used to sense the system altitude and provide the computation means 10 with the altitude value. As discussed above, the preferred altitude sensing means 120 is a pressure transducer such as the Motorola MPX 4115. As discussed, these pressure transducers output an analog voltage proportional to the sensed pressure. This analog voltage is converted into a digital format by A/D converter 130 for reading by the computation means 10. Details regarding the selection of the A/D and the pressure transducer are discussed above. Alternatively, as discussed, the altitude information may be acquired from either the blind encoder 150 or a GPS receiver 180 as described below.

Block 140 identifies the indicating means which may be connected to the computation means 10 to alert the pilot to any altitude deviations outside the tolerance window. There are many acceptable indicating means 140 such as LEDs, speakers and the like. As previously mentioned, in some situations it might be desirable to connect the audio output of the alerter to the aircraft's intercom system so as to overcome the aircraft's cockpit noise.

FIG. 1 further illustrates an optional block 150 which corresponds to a means for accessing altitude information from the aircraft blind encoder. This means 150 would likely comprise an interface 170 having multiplexing and buffering components to read the data from encoder 160.

Finally, FIG. 1 includes block 180 identified as a GPS interface. As has been mentioned, this may be used as an alternate source of acquiring altitude information. As is well known to those in the art, many GPS receivers have external data ports through which position information, including altitude, may be acquired. This information is available in NEMA format using an RS232 communication standard.

Nearly all of the functional block illustrated in FIG. 1, with the exception of code control means 20, are interfaced with computation means 10 using the 'data ports' provided by the microcontrollers. As is well recognized in the art, use of TRI-STATE® buffers allows multiple components to share the same buss without interference.

2A. First Preferred Embodiment

FIGS. 2A–7C are schematic diagrams of a first preferred embodiment of the present invention. The distinguishing characteristics of the first preferred embodiment are the use of a display, system calibration, and a target preselect feature. The overall management of the system is accomplished using microcontroller U1.

As mentioned, microcontroller U1 is preferably selected from either the INTEL MCS 48 (e.g. 8048/49/50) or MCS 51 (e.g. 8031/51) families. Additionally, it is suggested that the CMOS version of the controllers be used in order to conserve power. FIGS. 2A–2D illustrates the configuration with external program memory. Use of the ROMless 8031 as illustrated, necessitates an external EPROM U2 for program storage, and latch U3 for de-multiplexing the address and data signals on Port 2. One skilled in the art will recognize that many other suitable microprocessors and microcontrollers are available. Some, such as the Z80, do not have "on-chip" ROM or RAM & require further external circuitry well within the capability of one skilled in the art.

Figure 3B:
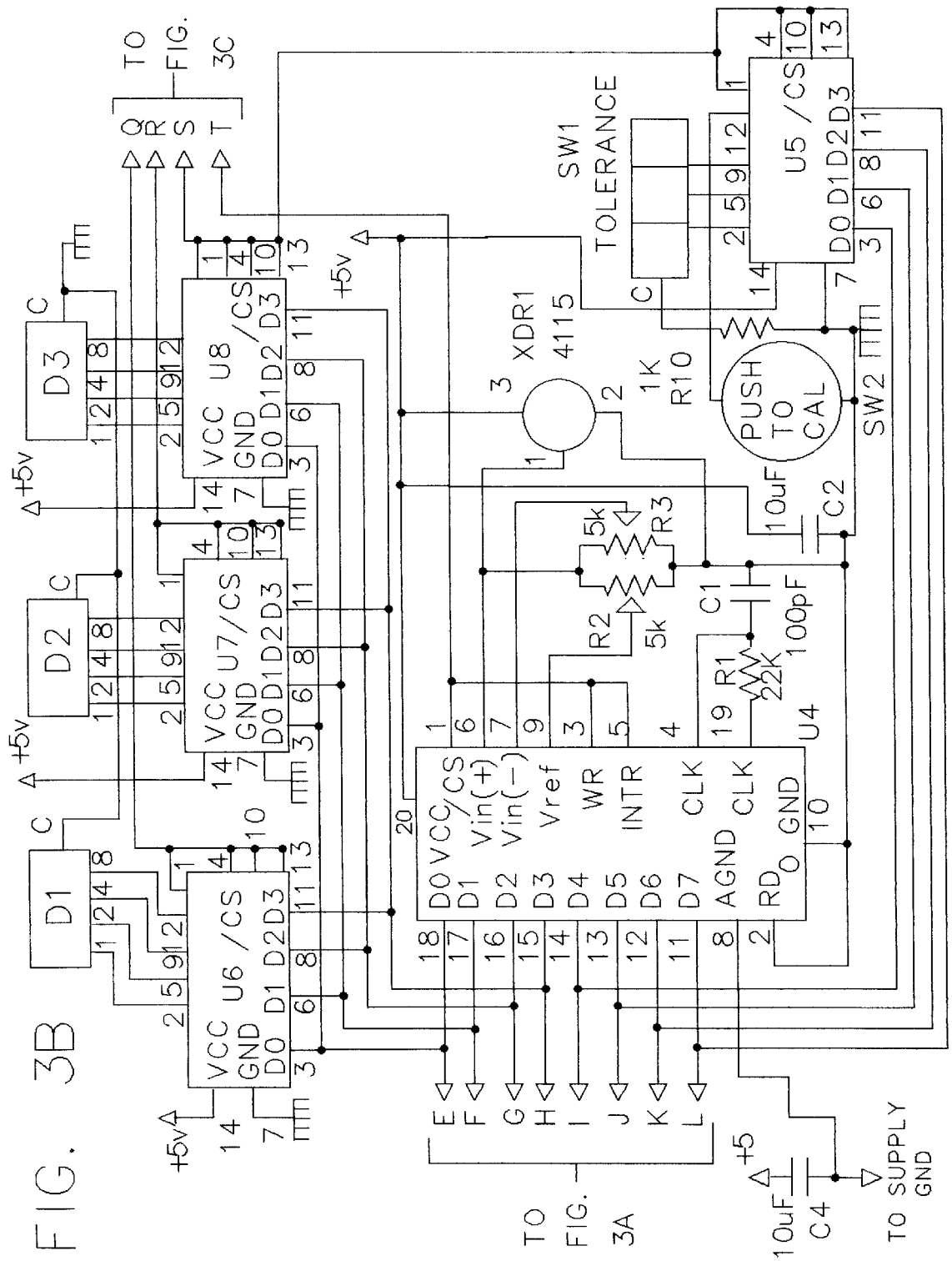
Figure 4C:
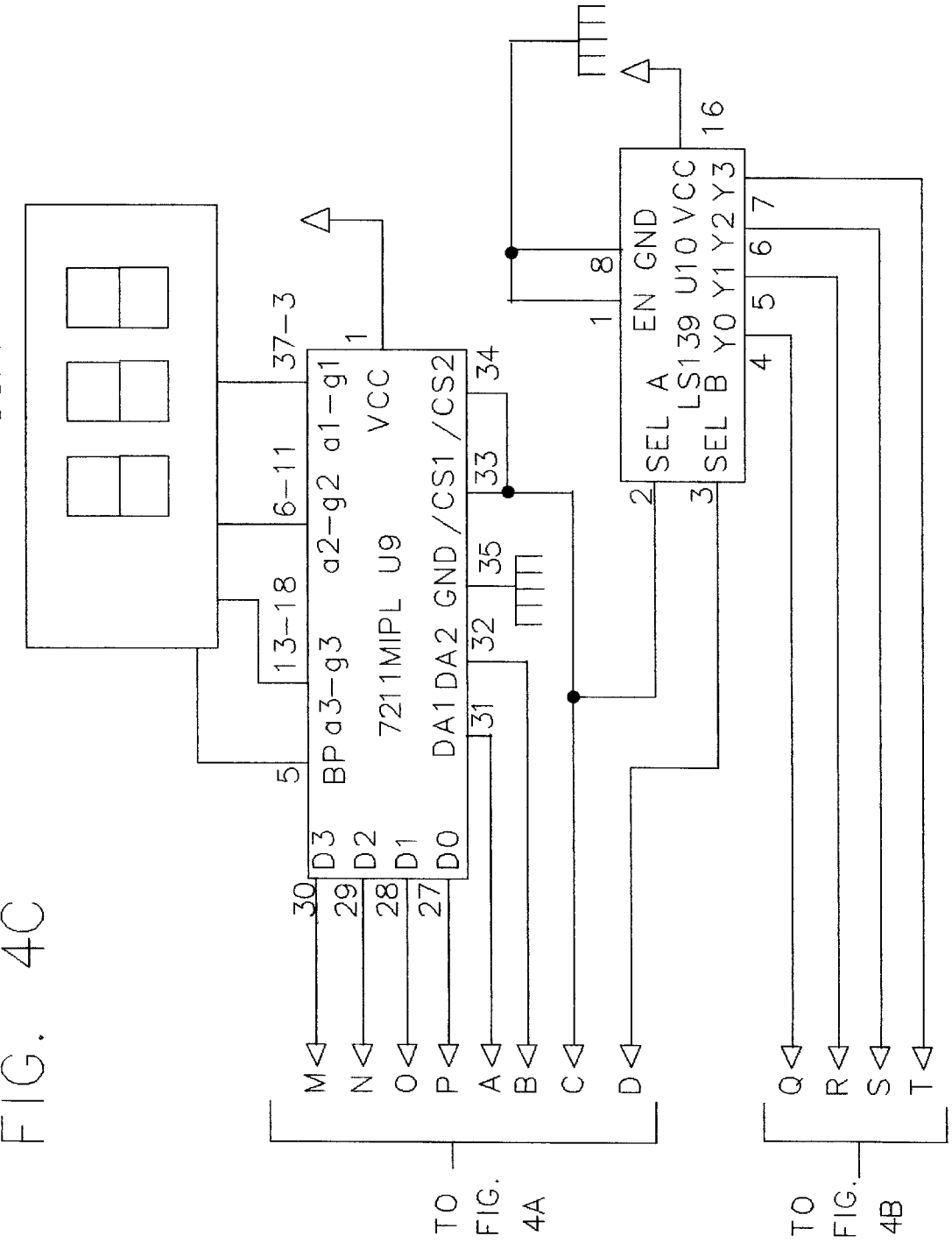

FIGS. 3A–3C illustrates the configuration using an 8051 with internal ROM for program memory, and thus eliminating U2 and U3. Finally, FIGS. 4A–4C illustrates the configuration using an 8048/49/50 controller with internal ROM.

The INTEL 8051 controller of FIGS. 3A–3C contains 128 bytes of internal RAM and 4K of internal ROM. The 8048 comprises 1K of ROM and 64 bytes of RAM. The 8049 and 8050 members of the MCS 48 family comprise 2K and 4K of internal ROM respectively, if additional program memory is necessary. The 8049/50 controllers are pin compatible with the 8048 controller. The 8051 or 8048/49/50 controllers having internal ROM would be preferred in commercial embodiments as these would eliminate the need for external data and program memory decreasing the component count, cost and power consumption as well as freeing up additional I/O ports which would otherwise be needed to interface memory. Furthermore, the MCS 48 family is especially desirable in commercial embodiments due to its lower cost relative to the MCS 51 family. Although the MCS 48 family is of lower capability than the MCS 51 family in terms of speed, instruction set etc., its capability is more than sufficient to meet the demands of the present invention. One exception to the preference for the MCS 48 family is the designs utilizing the GPS receiver for altitude data. In those designs (FIGS. 7A–7C & 13A–13B) the MCS 51 is preferred because of its internal serial interface.

Unless otherwise noted, discussion below of the design of the first preferred embodiments will refer collectively to FIGS. 2A–7C.

As mentioned, the objective of the altitude alerter is to continuously compare a "target" altitude to the aircraft's current altitude and advise the pilot of any excessive deviations. Therefore, a target altitude entry means for inputting the target altitude is required.

In the first preferred embodiments, provision is made for preselecting the target altitude. This target entry means comprises 10-position thumb-wheel BCD switches D1, D2, and D3. It is presently contemplated that target data would be entered in 100s of feet. Thus, use of three digits permits targets of 0(00)–999(00) feet, more than sufficient for the preferred operational range of the system. While many alternatives such as keypads and the like, are possible, the 10-position, BCD encoding thumb-wheel switches have many advantages. For example, as well understood in the art, BCD encoding permits a number from 0–9 to be entered using only 4 data lines.

Figure 2A:
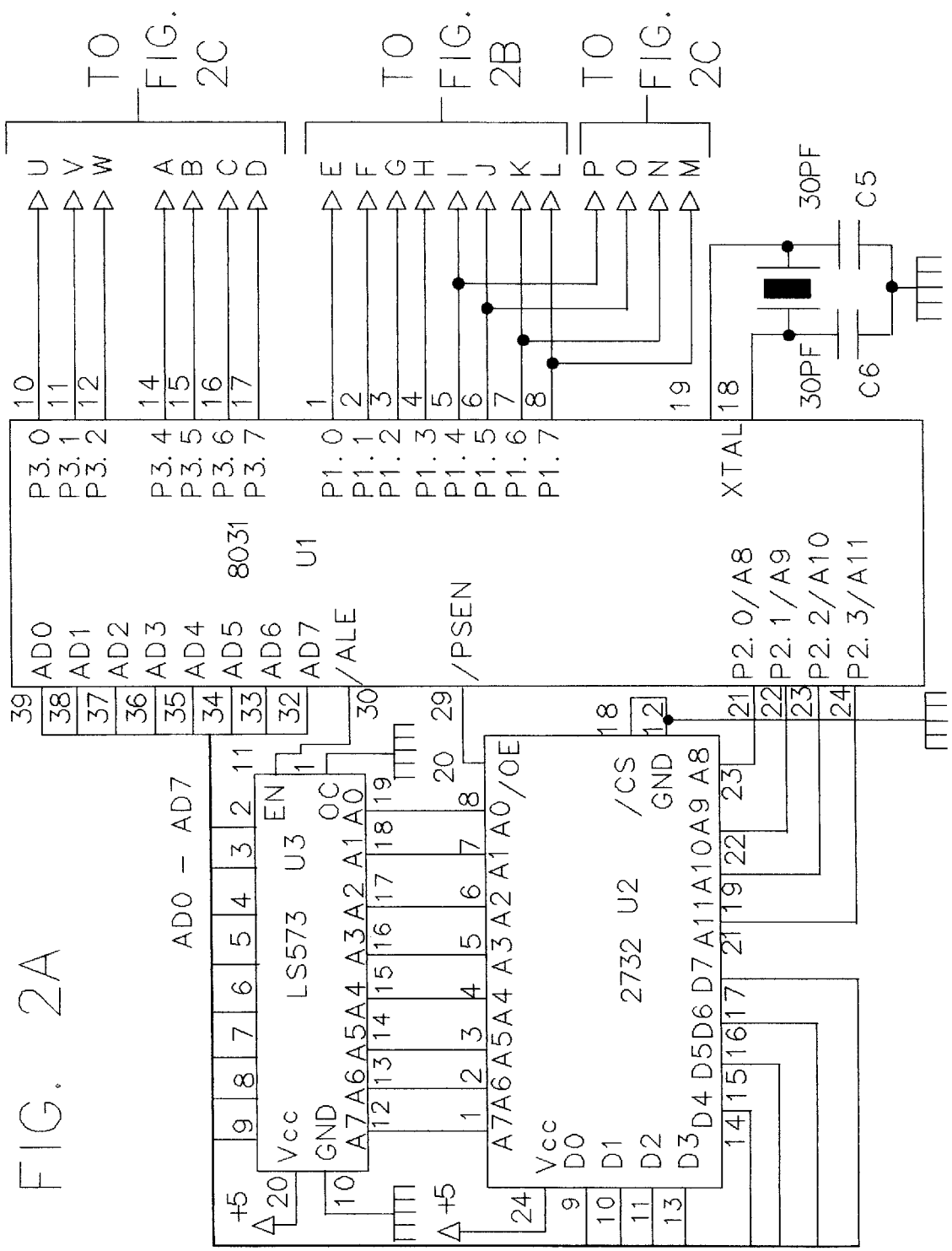
FIGS. 2A–2D are schematic diagrams of a first preferred embodiment of the present invention utilizing external program memory.

Since the design was accomplished to be compatible with both ROM & ROMless controllers, two of the microcontroller's ports (0 and 2) have been reserved for use by the external EPROM (FIG. 2A). The remaining two, 8 bit ports (1 and 3) are for general I/O use. This system architecture requires efficiency in the utilization of these port data lines in order to interface all the desired peripherals. In the present invention, this efficient utilization is achieved by multiplexing the data I/O for Port 1.

Figure 2B:
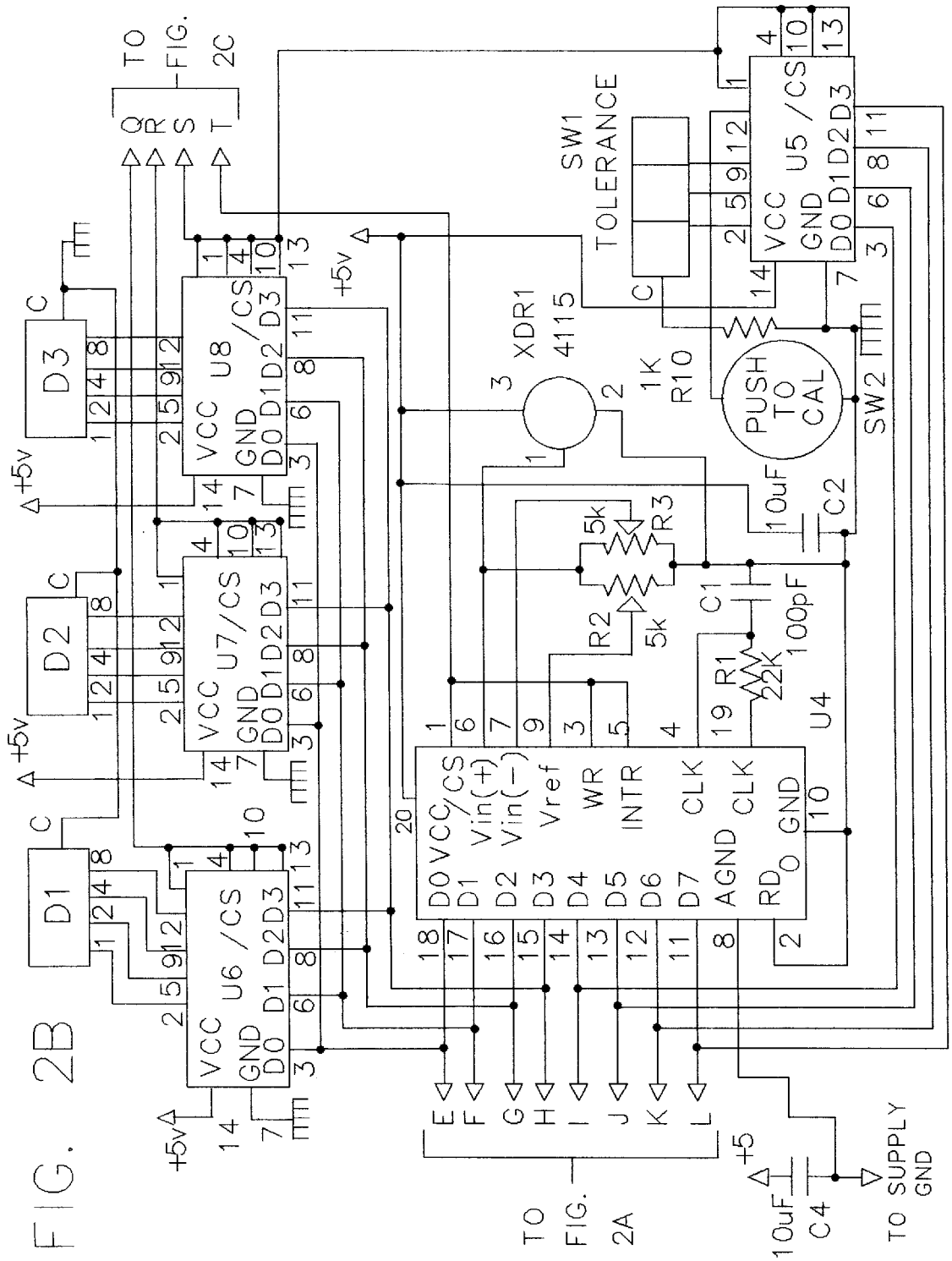
Figure 2C:
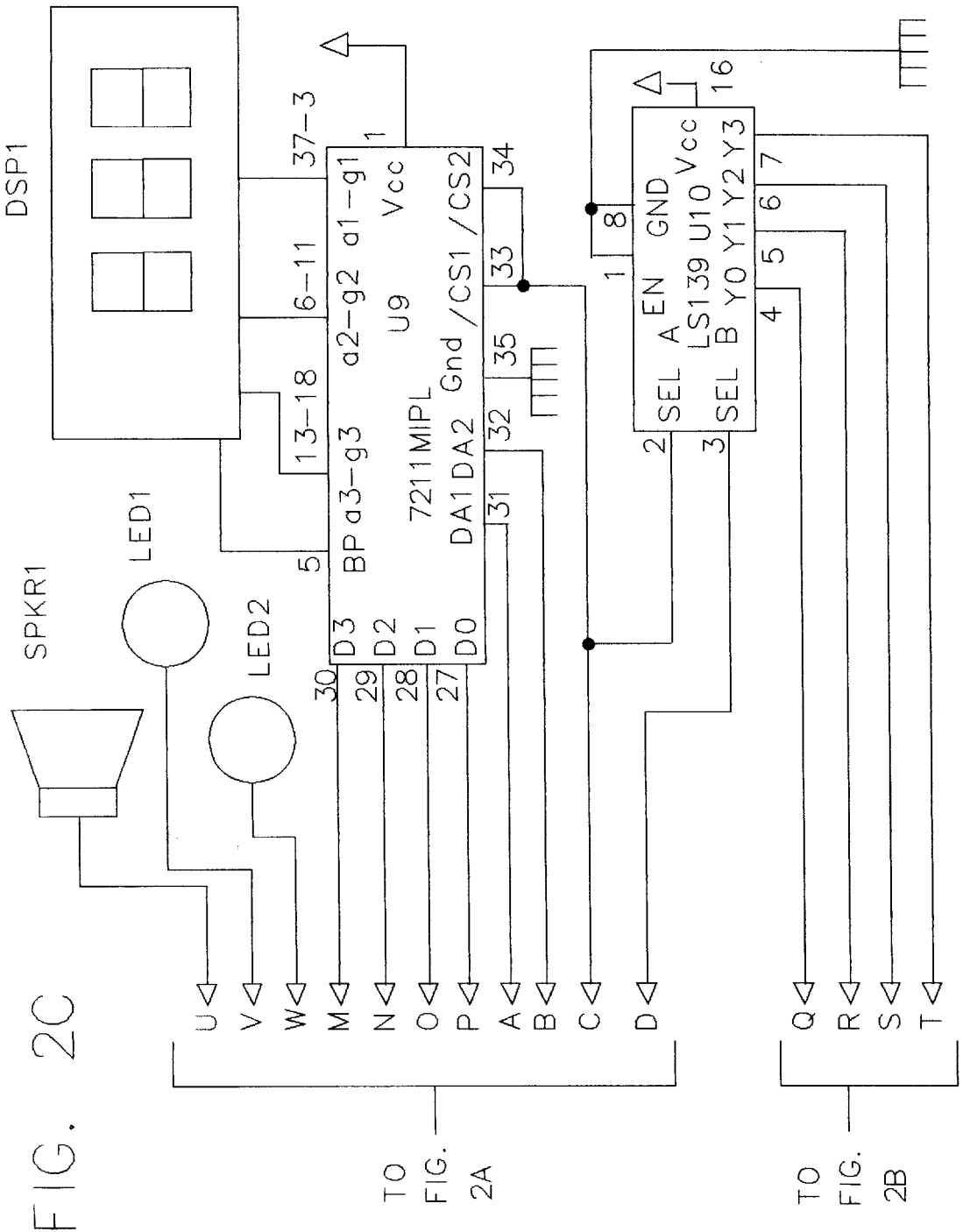
Figure 2D:
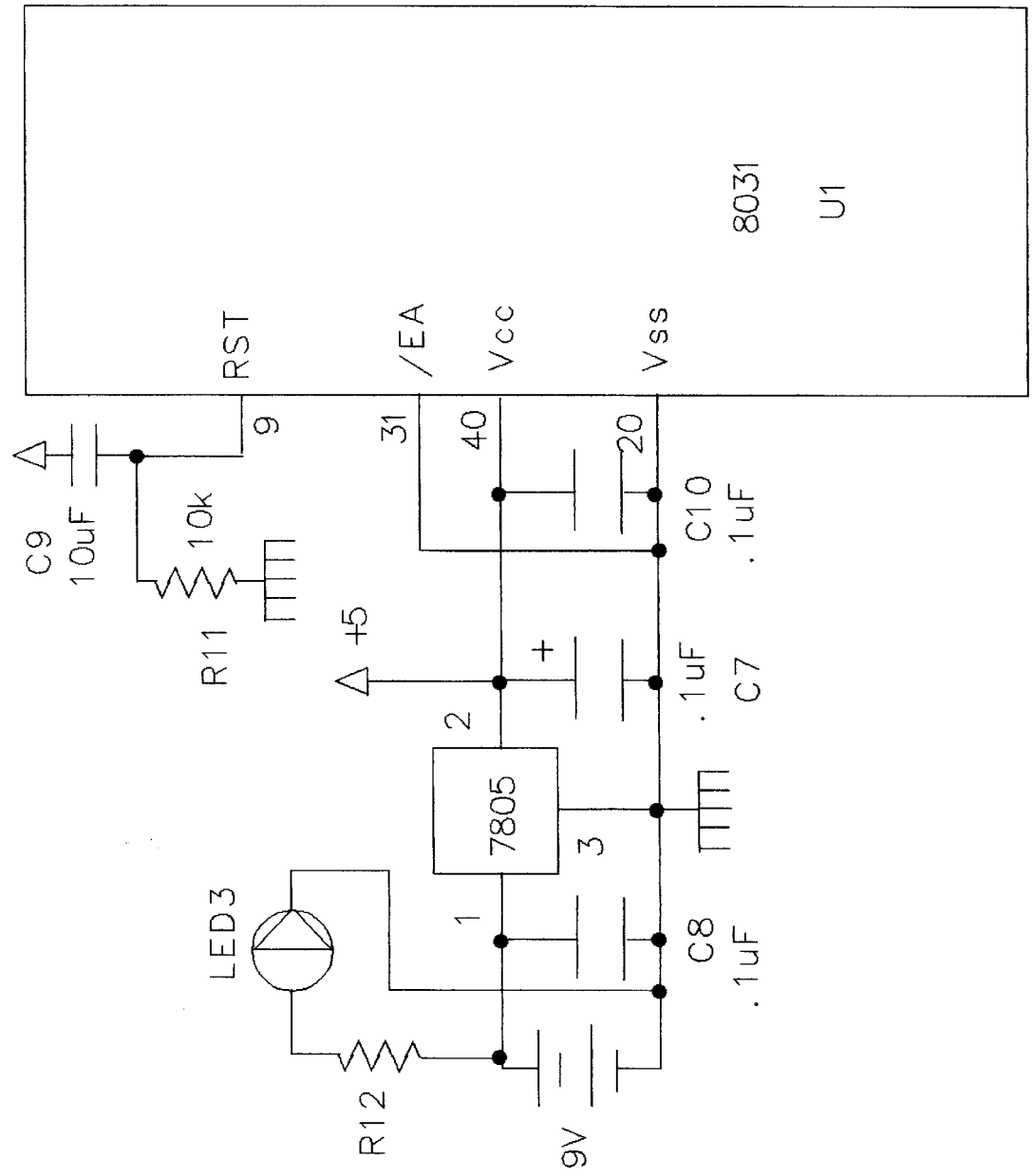

The multiplexing of the target entry is achieved using U10 a 'LS139, 1-of-4 selector, (FIG. 2C) in conjunction with three 'LS125 TRI-STATE® buffers (U6, U7, and U8) (FIG. 2B). The BCD outputs of target entry switches D1, D2, and D3 are connected to the input side of TRI-STATE® buffers U6, U7, and U8 respectively. Microcontroller U1, Port 3, bits 6 and 7 (P3.6 & P3.7) are connected to U10 as the SEL A and SEL B lines respectively, and are used to select which, if any, of the switches' BCD data will be read. The output side of buffers U6, U7, and U8 are connected to bits 0–3 of Port 1 (P1.0 –P1.3) for input of the BCD data. Of course, since the outputs of U6–U8 are TRI-STATED®, their presence on the data lines is transparent, until buffers U6–U8 are enabled.

As mentioned, U10 an 'LS139, is utilized for the multiplexing of the data signals for Port 1 data lines. It will be observed in the schematic of FIGS. 2A, C; 3A, C; 7A, C that P3.6 & P3.7 (P2.6 & P2.7 in FIGS. 4A–6C) of U1 are used as the A and B selector inputs respectively of U10. Thus, when P3.6, P3.7 are 00, Y1 (i.e. D2) is selected. When P3.6, P3.7 are 01, Y2 (D3) is selected, and so on. Y1, Y2, and Y3 of U10 control enablement of buffers U6, U7, and u8 respectively. Thus, to read the status of (i.e. the BCD number represented by) D1, P3.6 and P3.7 are cleared enabling U6, allowing the digit 1 to be read on data lines P1.0–P1.3. To read digits D2 and D3, P3.6, P3.7 would be set to 01 and 10 respectively.

As mentioned, one objective of the present invention is to make it transportable and independent of any aircraft system. Thus, one design (FIGS. 2A–4C, 6A–6C) utilizes a self-contained altitude sensing means. In the preferred embodiments, this comprises a pressure transducer XDR1.

As discussed above, the analog voltage output from the transducer XDR1 is not directly usable by the microcontroller U1. Thus, transducer XDR1 is connected to the microcontroller through analog-to-digital controller, U4. In the preferred embodiment, a Harris ADC0804 converter is used, although many other suitable converters exist. As will be clear to those skilled in the art, the 0804 A/D converter U4 is an 8-bit converter comprising a zero adjust line (Vin(−)) and a span adjust line (Vref/2). These parameters may be controlled by variable resistors R3 and R2 respectively or by fixed resistors depending on whether adjustability is desired. Thus, the range and offset of the A/D may be easily adjusted to accommodate the pressure-voltage range of interest and resolution desired.

The A/D converter U4 to which the pressure transducer XDR1 is connected, also uses the data line of Port 1 for data entry. The entry of data from the A/D converter U4 is also controlled using its chip select line in conjunction with the 'LS139 data selector U10 with its control sequence being P3.6, P3.7=11, corresponding to Y3.

As is well understood in the art, the A/D converter output is a count number proportional to the input voltage. In order to make the count meaningful for display to the pilot, it needs to be correlated to an altitude. As described above, in the designs utilizing an A/D converter, the software comprises a look-up table which correlates the A/D count to the system altitude. Thus, by reading the A/D count on P1.0–P1.7, the raw system altitude may be derived.

An adjustment factor, from the above described system calibration, may then be applied to determine the 'adjusted system altitude'. This 'adjusted system altitude' is then displayed on the LCD. This 'adjusted altitude' is also compared to the target altitude, and the absolute value of the difference therebetween computed. Finally, this difference is compared to the tolerance window value and if outside, an alert is generated.

As mentioned, one distinguishing feature of the first preferred embodiments illustrated in FIGS. 2A–7C is to display the sensed system altitude information to the pilot. This is accomplished using the LCD display DSP1 and is utilized to indicate system altitude in 100s of feet. In the first preferred embodiment, display DSP1 is any commonly available 3 or 4 digit LCD and may be driven using U9, an Intersil ICM7211MIPL LCD driver. This LCD driver U9 is ideally suited for use with microprocessors. It is designed to drive up to 4 digits using a two bit signal (DA1 & DA2) to select the digit to be written to the display. In addition, the circuit has chip selects (CS1 & CS2) used to latch data into the driver and out of the driver to the LCD. The driver utilizes a BCD entry for the data, so only four data lines are needed to enter data into the driver.

In the present invention, display driver U9 is connected to P1.0–P1.3 of U1. Lines P3.4 and P3.5 are connected to DA1 and DA2 respectively and are used to select the digit written to the driver. For example, using INTERSIL's ICM7211 protocol, if digit 1 is to be written to the port, P3.4 and P3.5 would be set to 11. Signal P3.6 is used to control CS1 and CS2 of U9. It will be remembered that P3.6 is also used as one of the selection signals for U10. Thus, when U9 is selected (P3.6=0), U7 (Y1) or U8 (Y2) will also be selected. However, due to the architecture of the system, there is no Port 1 bus conflict since U9 is connected to the high nibble of Port 1 whereas U7/U8 are connected to the low nibble.

Finally, two switches, SW1 and SW2 are provided for selecting the altitude tolerance window and system calibration respectively. SW1 is anticipated to be a multi-position switch with each position corresponding to a different tolerance window value. SW2 is a momentary push-button switch, the depression of which, in the first preferred embodiments, is used to trigger a system calibration. These two switches are connected to Port 1, data lines P1.4–P1.7 using control signal Y2 from U10. Note that although D3 and switches SW1 & SW2 are both enabled by Y1, no buss conflict results because they use different "nibbles" of the Port 1 data lines.

As mentioned, Sw2 is used in the first preferred embodiments, to trigger a system calibration. For system calibration, the procedure would be to dial in the calibration altitude, e.g. from the aircraft altimeter, on thumb-wheel switches D1, D2, and D3 in the same way a target altitude would be entered. Push button SW2 would then be depressed, causing the software to read the switches D1–D3 as a calibration altitude instead of a target altitude. The software will immediately compare this calibration altitude with the altitude sensed by the alerter and determine the difference. The difference would be stored as an adjustment or correction factor and thereafter be used to adjust subsequent sensed altitudes. After computing the calibration, the target altitude would be (re-)entered on D1, D2, and D3, and normal alerting function would resume.

As seen in FIGS. 2A–7C, it is contemplated that the tolerance switch SW1 will comprise a multi-position switch, connected to lines of a microcontroller port, grounding through R10, whichever port line(s) are selected on the switch. Therefore, the software reads the status of the switch, and consequently the tolerance selected, by checking which of these port lines is low. If more than a few tolerance values are possible, it would be advisable to encode or multiplex the selector lines so as to conserve the number of port lines used.

LED2 may be used to indicate a target altitude is being monitored. Additionally, another switch, SW3 (not shown) may be used to resume altitude alert monitoring. An important feature of the invention is that in addition to entry of the target altitude, switches D1–D3 also give a continuous visual indication of the target altitude.

The main function performed by the alerter is of course to alert for any excessive altitude deviations from the selected target altitude. It is anticipated that a speaker SPKR1 and/or indicator light LED1 would be utilized to alert the pilot whenever an excessive deviation is detected. In the designs of FIGS. 2A–2D, 3A–3C & 7A–7C, the speaker SPKR1 is controlled using P3.0 and the LED1 is controlled using P3.2. Additionally, an alert message may be flashed on display DSP1. In the designs of FIGS. 4A–6C (those utilizing the MCS 48) the speaker is controlled by P2.0 and the LED1 using P2.2.

Note that for simplicity LED1, LED2, and SPKR1 have been shown in FIGS. 2A, C, connected directly to the U1 port lines, in practice transistor switches would likely be used to control power to these components in the manner shown in FIG. 3. As is well understood in the art, piezo-electric speaker SPKR1 may be activated by switching on transistor Q2 by driving the appropriate port line low. Similarly, the visual warning may using LED1 may be activated by turning on transistor Q1 by driving the appropriate port line low.

It is envisioned that other improvements or enhancements may be accomplished using this basic circuit. For example, the aircraft's altitude may be continuously time differentiated to determine aircraft vertical speed. This vertical speed could then be compared to a default standard or to a target speed. Switches D1–D3 discussed above could be used to enter this target speed in the same manner as the target altitude discussed above. Another switch could be used to identify the character of the number entered (i.e. altitude or speed.) For example, a 'VS' key could be used to designate entry of vertical speed information. Alerts would then be triggered whenever the actual vertical speed exceeded this value. Finally, it is anticipated that a target set switch SW3 (not shown) and target set LED (e.g. LED2) will be used to set the target altitude and to indicated that a target has been set.

Power may be supplied either by battery, an adapter to the aircraft cigarette lighter, or wired directly into the aircraft's power bus. A 7805 voltage regulator provides a regulated 5v supply to the board. While not shown, a power switch would also be desirable. Test have shown that the design of FIGS. 2A–2C requires approximately 350 mA current. The designs of FIGS. 3A–7C would be considerably less due to the ellimination of U2 and U3.

While one design comprises self-contained altitude sensing means, alternative designs read the altitude information from the external data port on a GPS receiver (FIG. 7B) and which read the altitude "grey code" output from a blind encoder (FIGS. 5B & 6A) either eliminating the need for the pressure transducer and the A/D converter, or as a backup thereto.

Figure 5B:
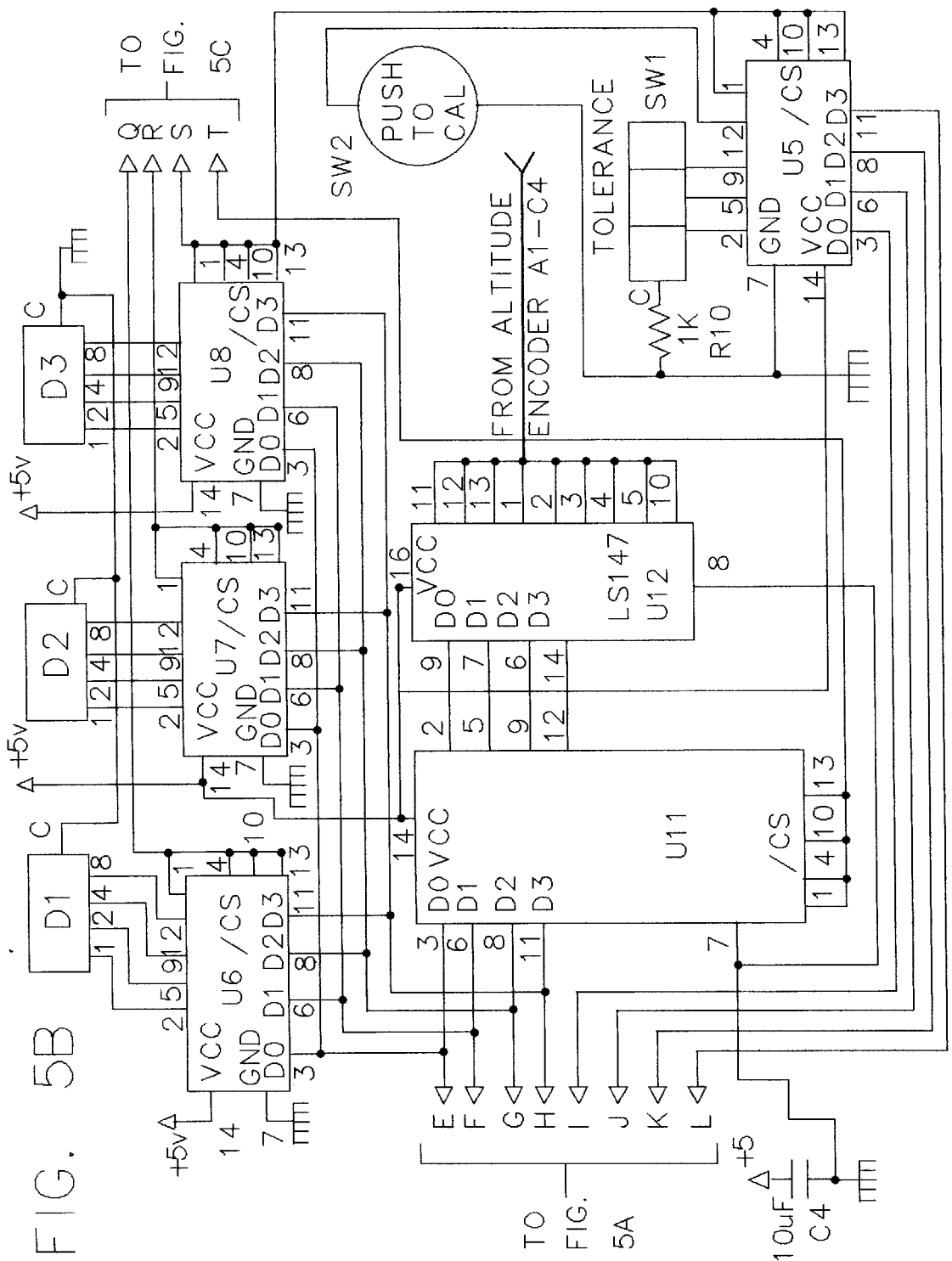
Figure 5C:
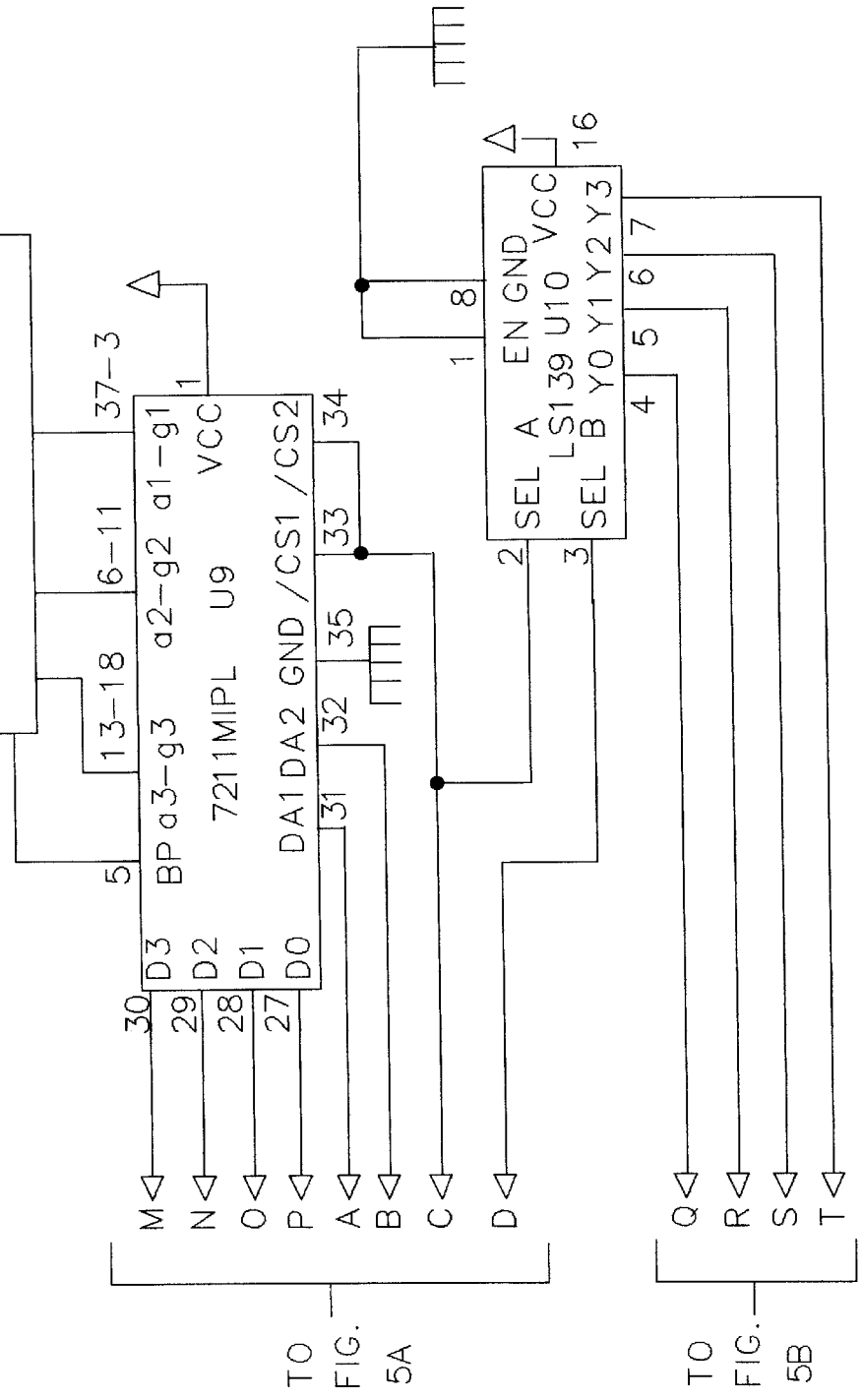
Figure 6A:
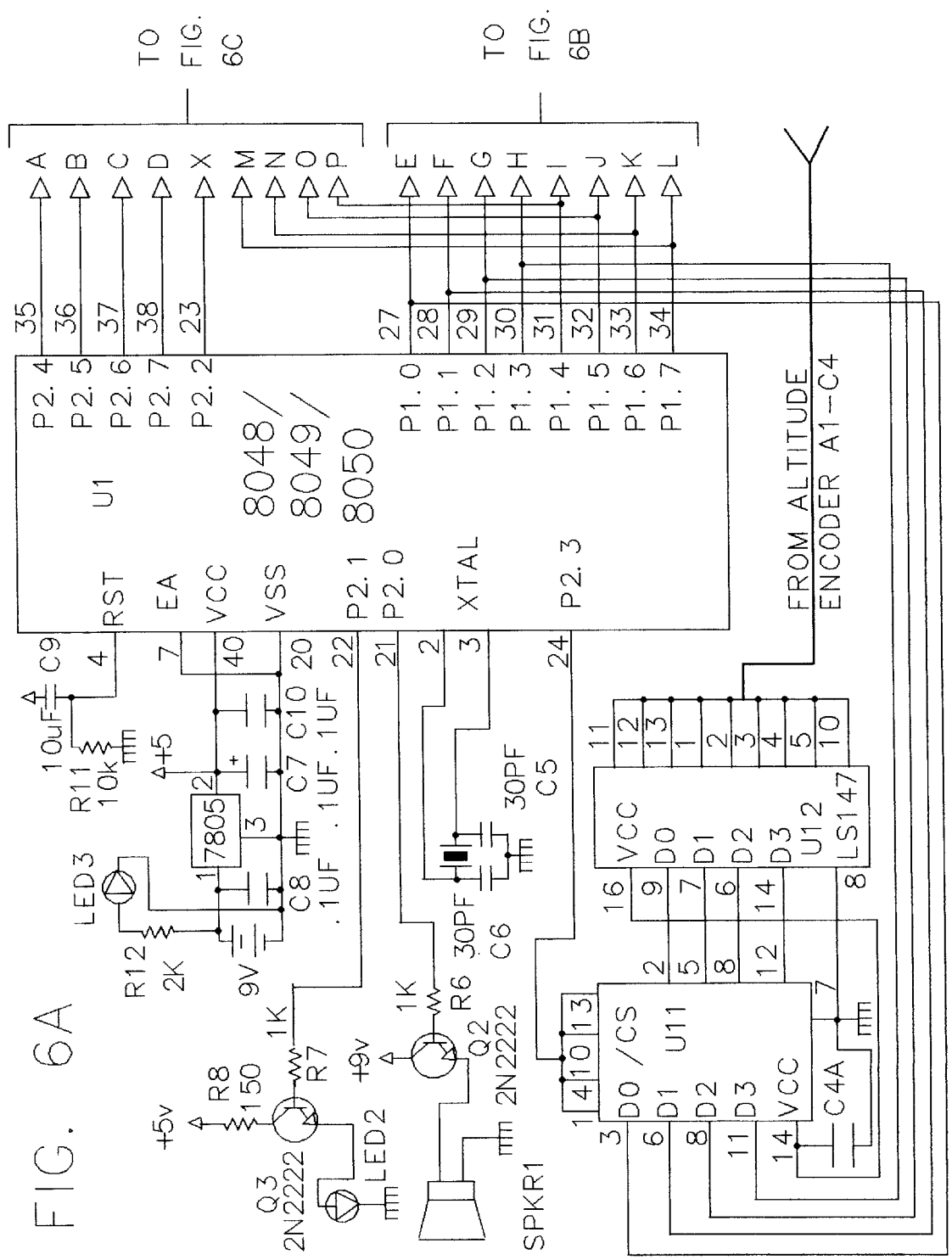
Figure 6B:
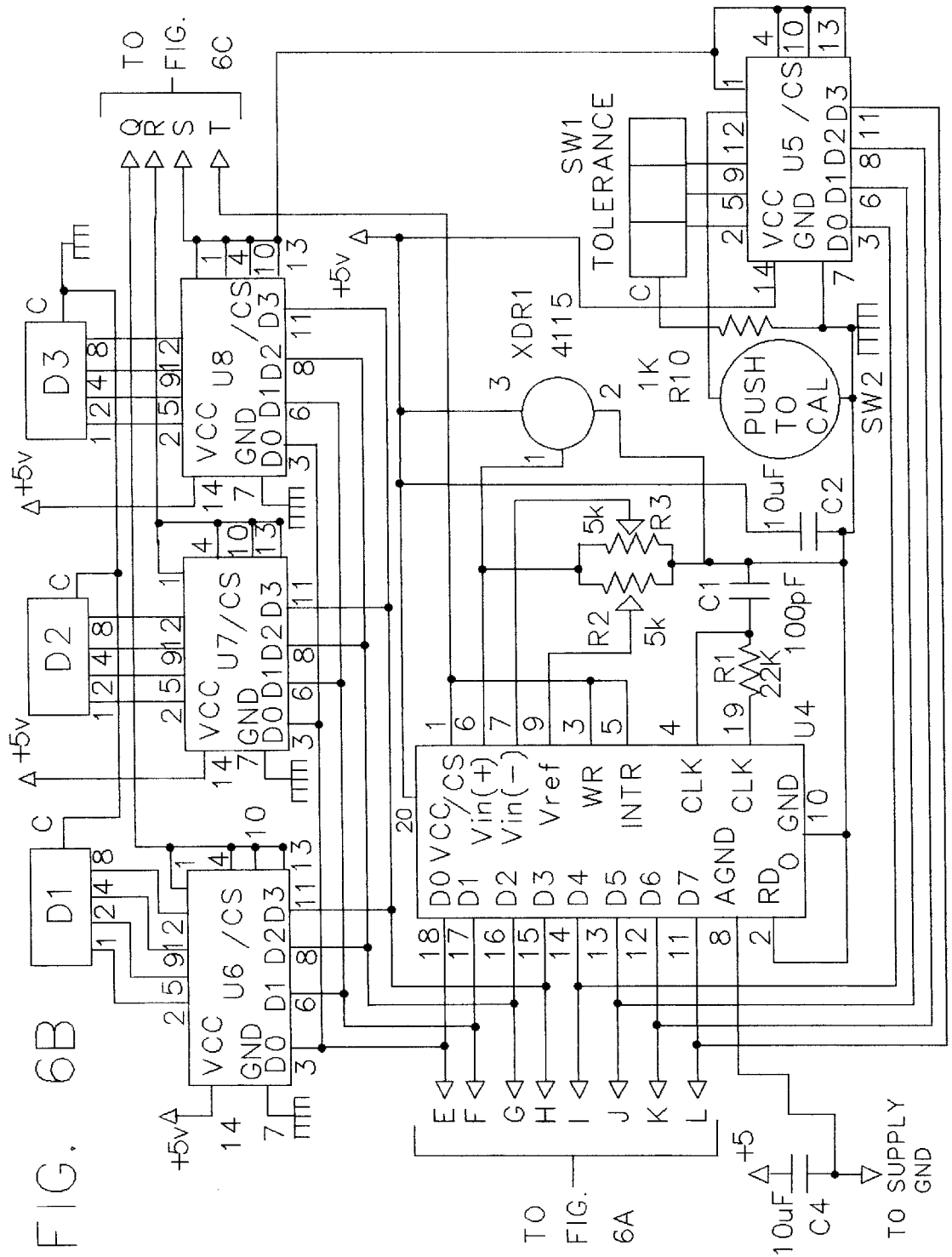

FIGS. 5A–5C and 6A–6C illustrate the use of an alternative design wherein a means is provide for backup source of altitude information (FIGS. 6A–6C) or as a substitute source of altitude information (FIGS. 5A–5C). In either design, a '147 priority encoder U12 is connected to the data lines from the altitude encoder. As will be understood by those in the art, the altitude encoders output a parallel multi-bit binary signal, referred to as the SSR transmission code, representing the altitude. According to this code, for altitudes between –1,000 and 30,000 feet (MSL), nine bits of data is sufficient. U12 is a priority encoder which outputs a 4-bit BCD number indicative of the nine bit input. The BCD output does not correspond to the input number in a one-to-one fashion. However, it is a simple matter to employ a look-up table to make this correlation, if necessary. The output of U12 is fed to U11 which is a '125 TRI-STATE® buffer which is in turn connected to Port 1 of microcontroller U1, specifically P1.0–P1.3. In FIGS. 5A–5C where the A/D is not used, enablement of U11 is controlled by Y3 of U10. In FIGS. 6A–6C where both the A/D and the Altitude encoder as used as alternate altitude sources, placement of the altitude encoder data through buffer U11 is controlled by P2.3 of U1. Since the data from the encoder is already in feet, there is no need for the look-up table correlating A/D count and altitude. Other functions operate as discussed above.

Figure 7A:
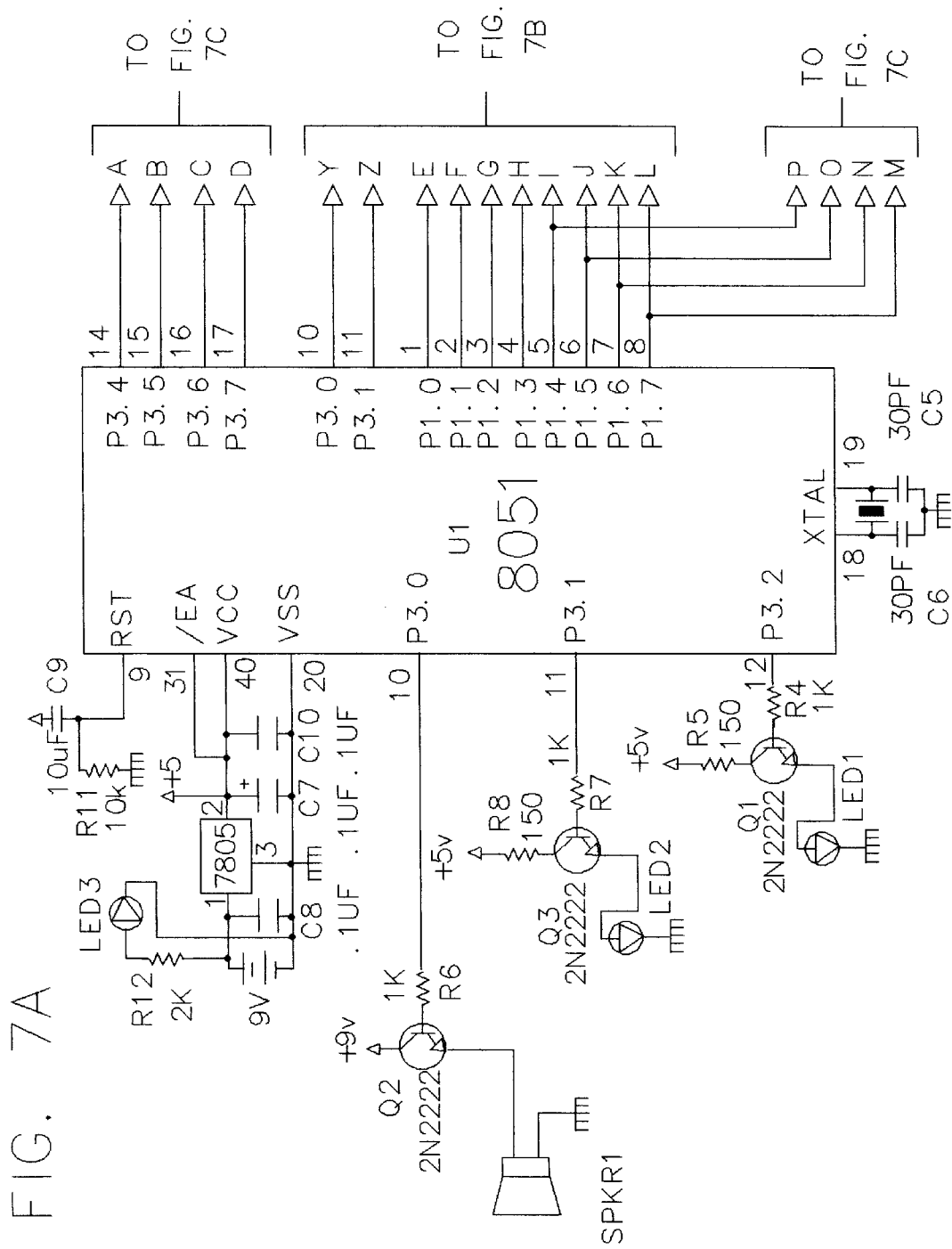
FIGS. 7A–7C are schematic diagrams of another alternative design for the first preferred embodiment utilizing an 8051 controller and adapted to read the altitude information from a Global Positioning System receiver using its external RS232 data port.
Figure 7B:
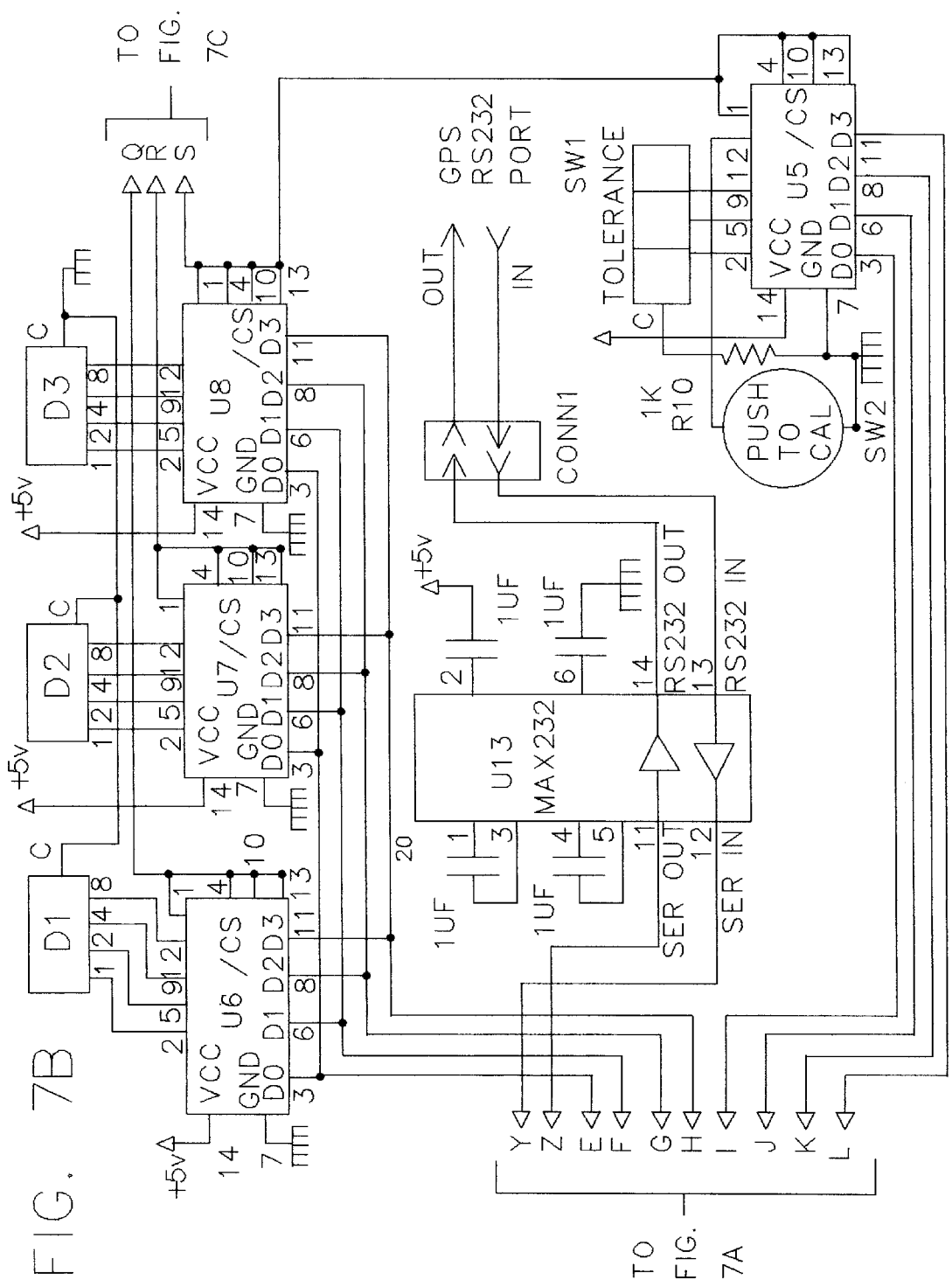
Figure 7C:
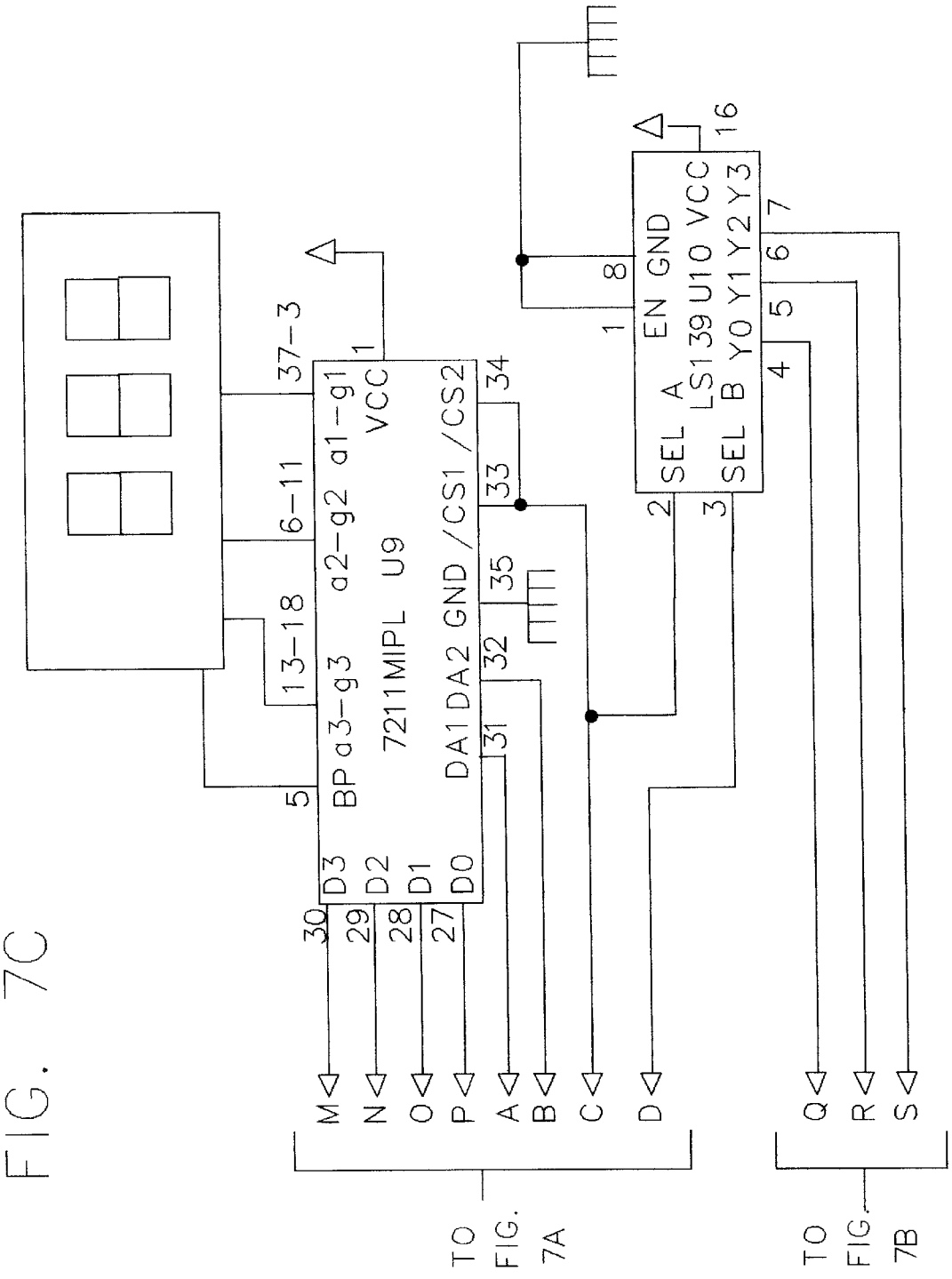
Figure 8A:
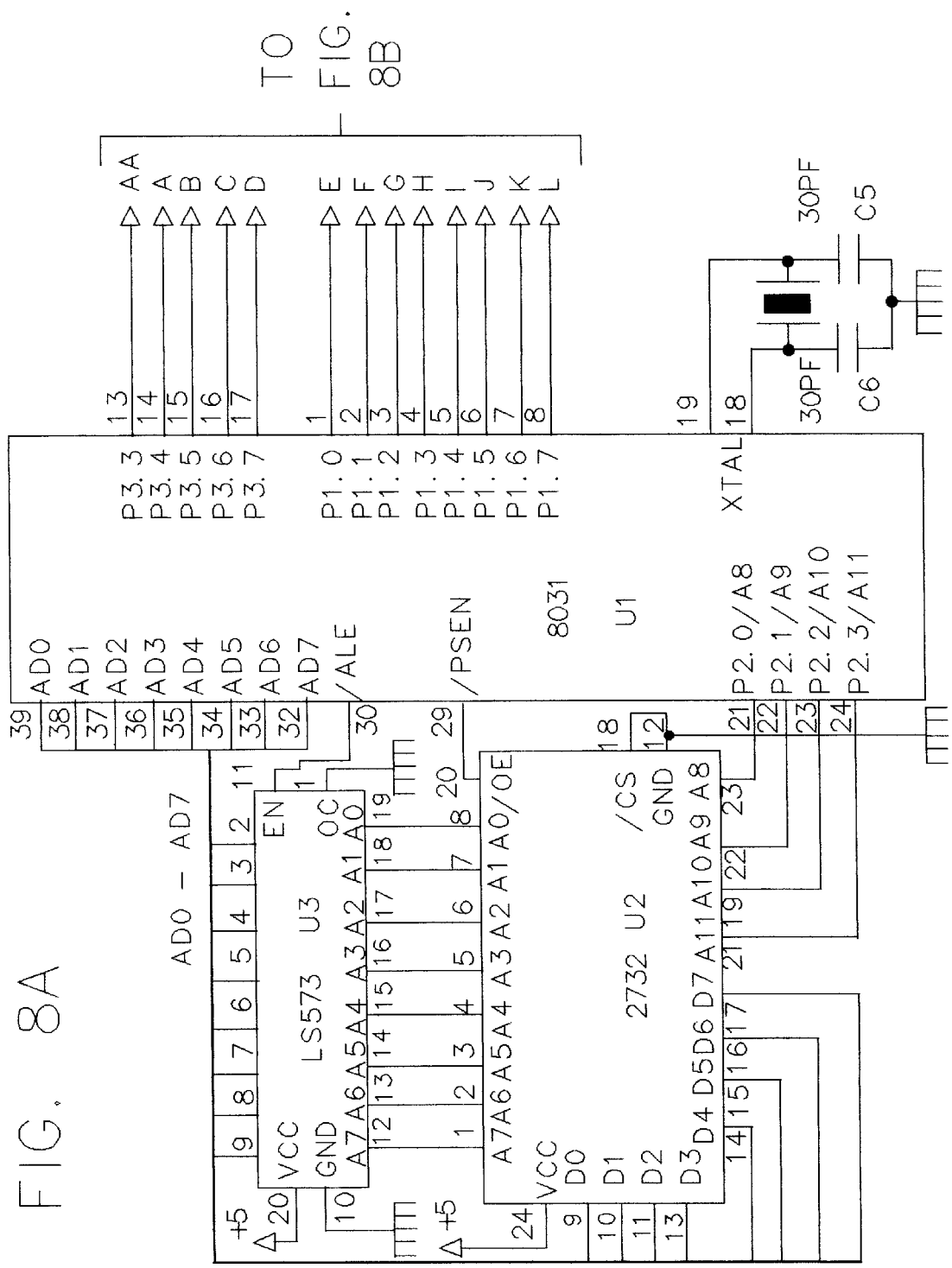
Figure 8C:
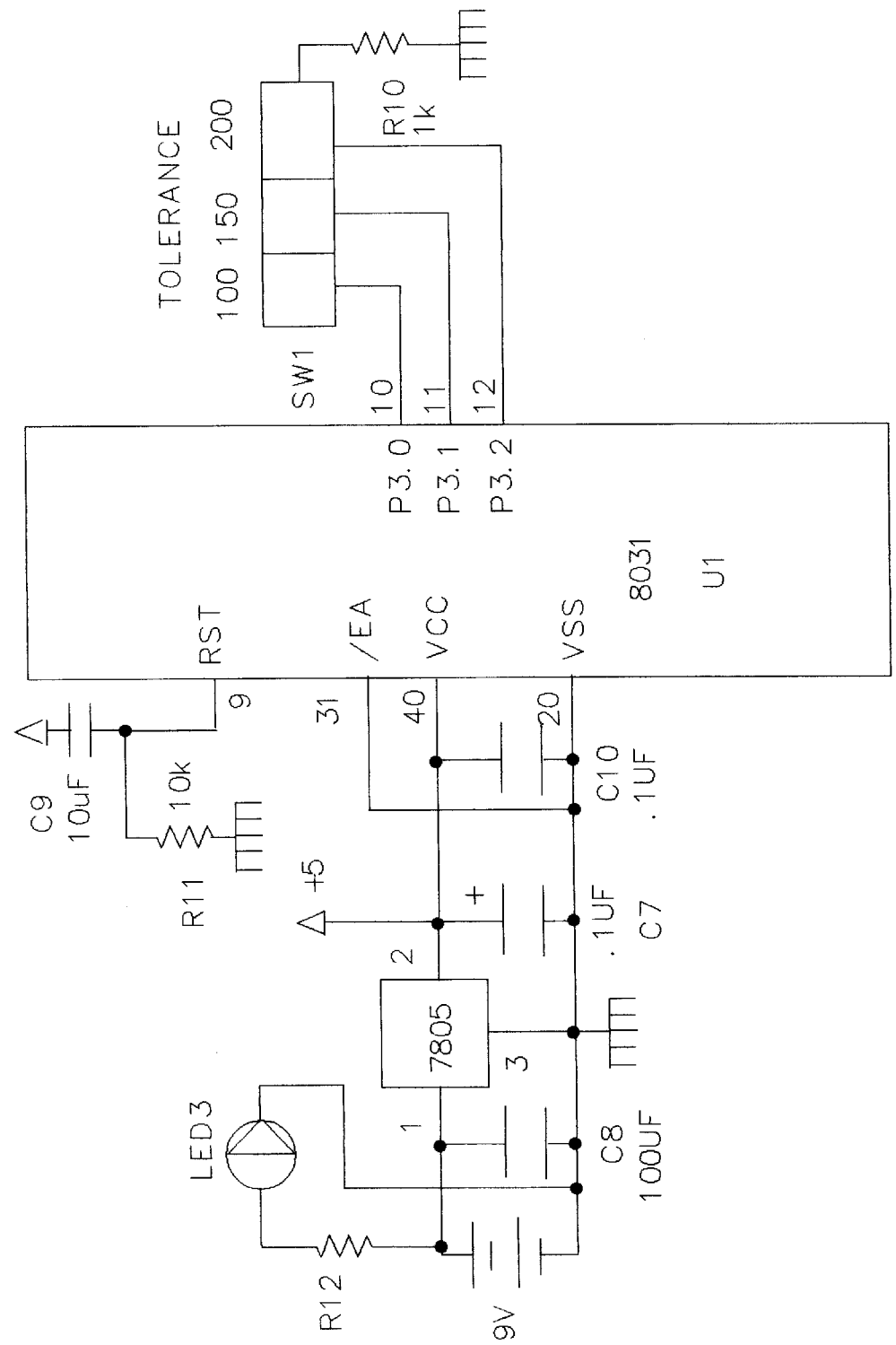

Finally, FIGS. 7A–7C illustrates another design of the first preferred embodiment wherein the source of the aircraft altitude information is a Global Positioning System (GPS) receiver. As mentioned, many commercially available GPS receivers contain an external data port allowing communication with external peripherals. This communication is carried on using RS232 and NMEA standard protocols. Information which is available from such a port is various positional information including altitude. FIGS. 7A–7C indicates one method of interfacing with a GPS receiver port and acquiring this altitude information.

U13 is a level translation circuit which would be connected to the external GPS RS232 data port through a connector such as CONN1. One example of such a circuit is the MAX232 manufactured by MAXIM. The output of U13 is input to the serial port (P3.0) of the microcontroller U1. Port P3.1 is the serial output of U1 and is also connected to U13. In this design, where serial data is used, the INTEL MCS 51 family controllers are preferred. As is well known in the art, the MCS 51 series controllers comprise a built in serial port facilitating serial communication. In this design, the altitude information from the GPS is already in units of feet. Therefore, the software look-up correlation between A/D count and altitude, as discussed above, need not be accomplished. All other alerting functions would operate as discussed above.

2B. Second Preferred Embodiment

Many of the features of the first preferred embodiment are also contained in the second preferred embodiment. However, the second preferred embodiment is a simpler system not utilizing a display or altitude preselect. Rather, this embodiment, the target altitude is identified by activating a target entry means, such as a push-button, upon the aircraft's reaching the altitude. The altitude alerter then monitors and compares the aircraft's sensed altitude with respect to this target and identifies and alerts to any excessive excursions therefrom.

As seen in FIGS. 8A–13B, microcontroller U1 is used to control the system. As with the first preferred embodiment discussed above, the microcontroller would preferably be from the INTEL MCS 51 or MCS 48 families. Furthermore, as in the first preferred embodiments, it is suggested that the CMOS version of the controller be used in order to conserve power. In those designs illustrated in FIGS. 8A–10B, and 12A–12C, an A/D convertor U4 is again used to interface the analog voltage from the transducer XDR1 to the controller U4. In the designs of FIGS. 11A–11B and 13A–13B, the aircraft altitude is acquired from an external source namely, a blind encoder and GPS receiver respectively.

As in the first preferred embodiment, in those designs utilizing a pressure transducer, a Harris ADC 0804 A/D convertor and MOTOROLA MPX 4115 pressure transducer are preferred. As above, the 'offset' and 'vref' inputs would be used to adjust the span for maximum resolution. The range of this second preferred embodiment is expected to be similar to the first preferred embodiment. Thus, similar values are used for these parameters.

As seen, A/D U4 is connected to Port 1 of the controller. Since altitude is not displayed in this embodiment, altitude data need not be converted to feet. Rather, it may be utilized in raw A/D count format. For example, setting a target altitude can result in a target A/D count. Likewise, comparison of the present altitude to the target altitude can be accomplished by comparing counts. Finally, the tolerance window may be specified in counts. For example, as discussed above, using the preferred 'offset' and 'range', each count of the A/D corresponds to approximately 50 feet. Therefore, a 150 tolerance window would correspond to a +/–3 count window in which the altitude could vary from the target before triggering an alert.

A tolerance switch SW1 is again used to provide the pilot with a means for adjusting the tolerance window. The common line of the switch is grounded through resistor R10 and the switch positions are connected to Port 3, lines P3.0–P3.2. Since these lines are normally kept at a high level, grounding one of them, through SW1, is used to identify the switch position, and consequently the desired tolerance.

It will be observed that two LEDs are connected to Port 3 lines. Specifically, LED1 is connected to P3.4, and LED2 is connected to P3.3. LED1 is used to visually alert the detection of an out-of-tolerance altitude excursion. LED2 is used to indicate that a target altitude has been selected. The LEDS are driven by transistors Q1 and Q3 functioning as on/off switches. Resistors R5 and R8 limit the current through the LEDs. Audio indication of an altitude deviation is provided by speaker SPKR1 which is connected to P3.5 through transistor Q2 also acting as an on/off switch. As will be well understood by those in the art, driving the I/O lines of Port 3 low will cause transistors Q1–Q3 to turn on, connecting the voltage at the collector to the LED or speaker.

Push-button SW2 momentary connects P3.6 to ground through R9. Thus, by continuously monitoring the status of P3.6, the setting of a target altitude will be detected. In the designs utilizing the pressure transducer and A/D converter, upon depression of SW2, A/D U4 is read and the count number is stored as the target 'altitude'. Thereafter, the A/D count representing the system altitude is compared to this target count and any deviations outside the tolerance window count trigger an alert. In the designs of FIGS. 11 and 13 where altitude information is obtained from the encoder and GPS receiver respectively, the target and system altitude data is already in units of feet.

As was the case with the first preferred embodiments, alternate designs of the second preferred embodiment may read the altitude information from the external data port on a GPS receiver (FIGS. 13A–13B) and which read the altitude "grey code" output from a blind encoder (FIGS. 11A–11B & 13A–13B) either eliminating the need for the pressure transducer and the A/D converter, or as a backup thereto.

FIGS. 11A–11B and 12A–12C illustrate the use of an alternative design wherein a means is provided for acquiring altitude from the encoder. The interfacing of the encoder is identical to that described above in connection with FIGS. 5A–5C & 6A–6C above.

Figure 13A:
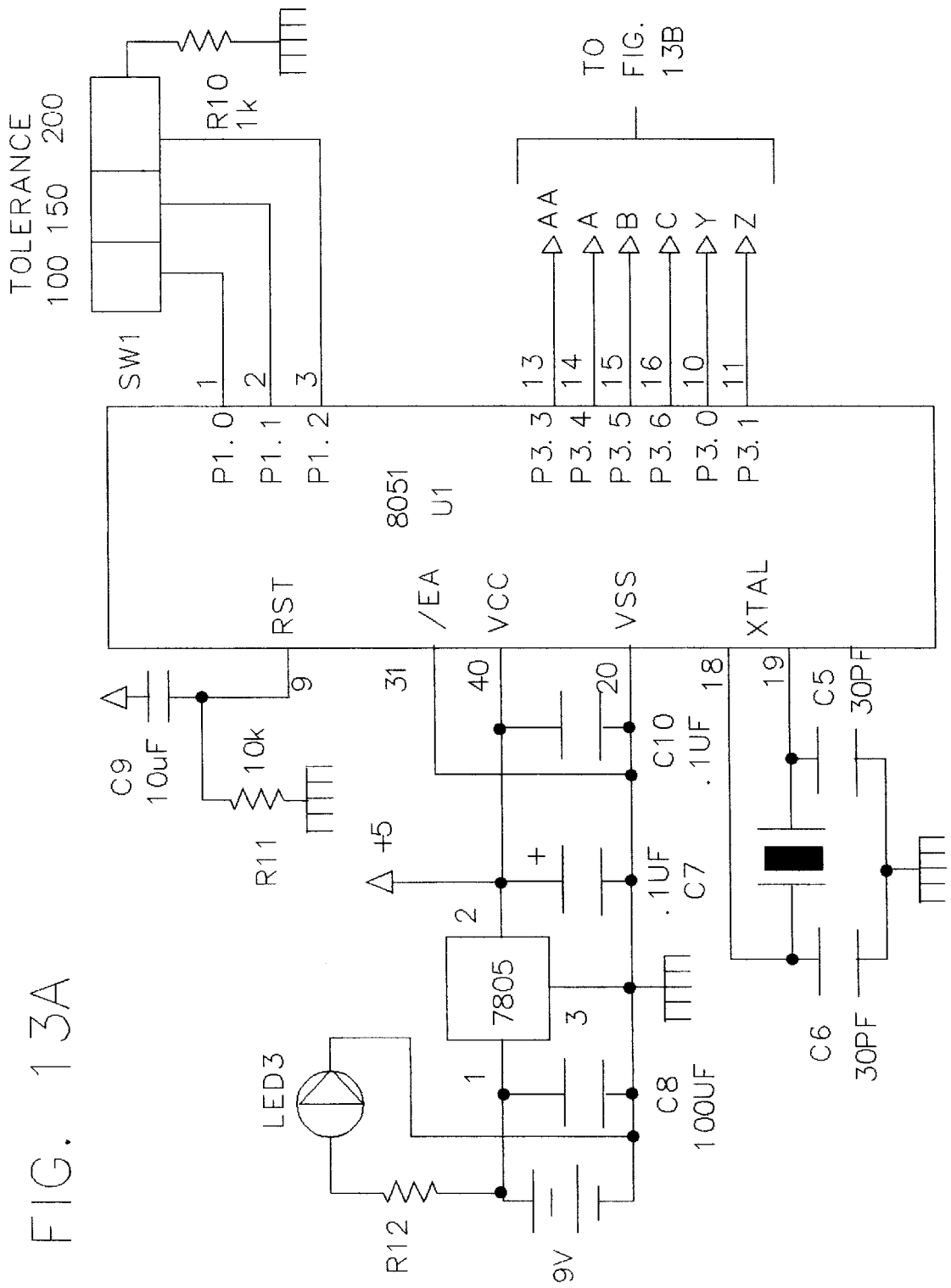
FIGS. 13A–13B are schematic diagrams of another alternative design for the second preferred embodiment utilizing an 8051 controller and adapted to read the altitude information from a Global Positioning System receiver using its external RS232 data port.
Figure 13B:
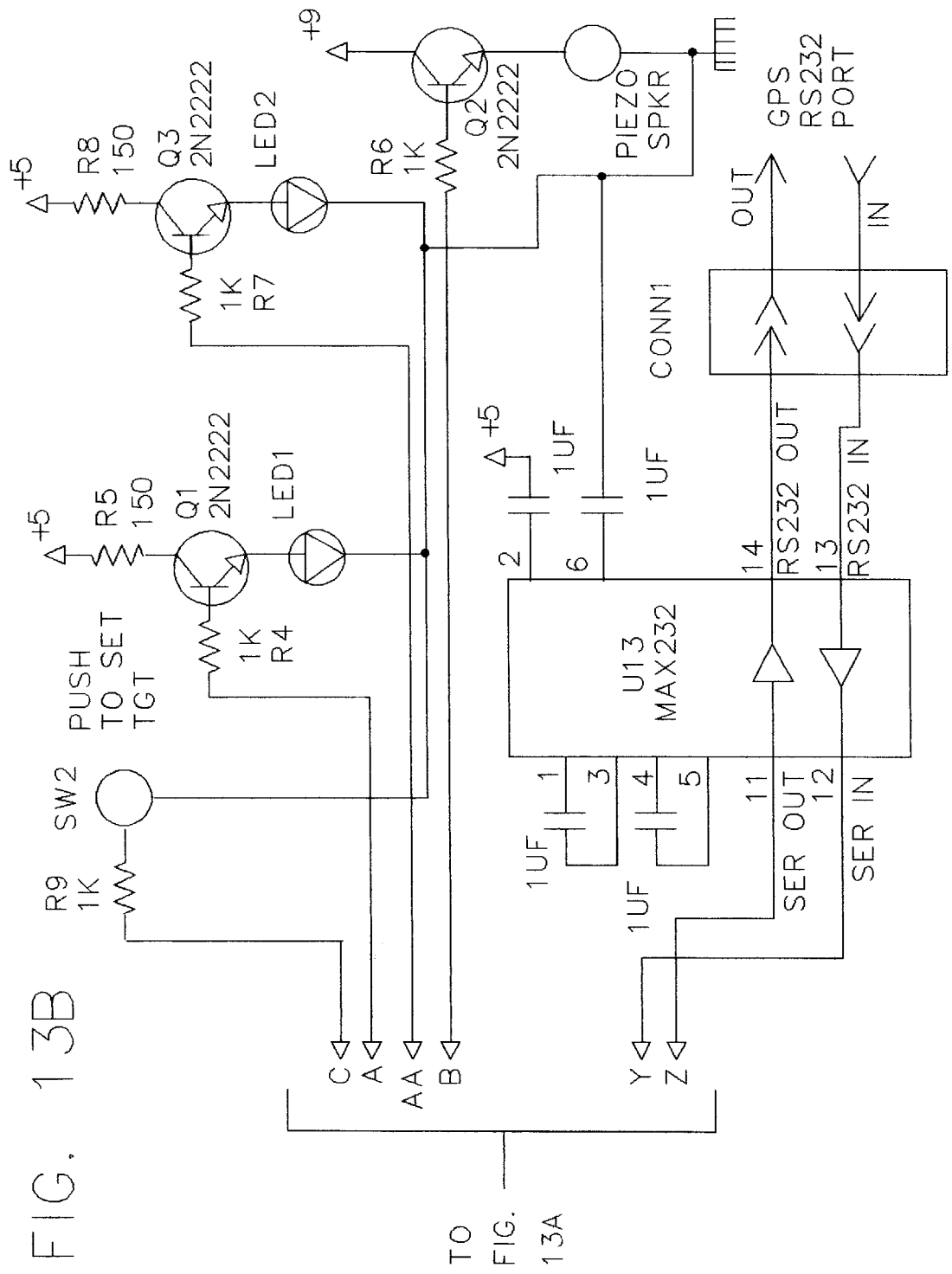

Finally, FIGS. 13a–13B illustrates another design of the second preferred embodiment wherein the source of the aircraft altitude information is a Global Positioning System (GPS) receiver. As mentioned, many commercially available GPS receivers contain an external data port allowing communication with external peripherals. This communication is carried on using RS232 and NMEA standard protocols. Information which is available from such a port comprises various positional information including altitude. The interfacing of the GPS is accomplished in the manner described above in connection with FIGS. 7A–7C.

It is envisioned that power may be supplied by connection to the aircraft power supply or by using batteries. The current required to run the designs of FIGS. 9A–13B is approximately 160 mA. Tests have indicated that the second preferred embodiment can run for several hours on a 9v transistor battery, especially when the internal ROM and low power CMOS controllers are used.

2c. Software

As mentioned, software will control implementation of most functions such as comparison of present and target altitude, computation and display of altitude deviation information, implementation of target and calibration data, computation and display of excessive vertical speed information, etc.

FIGS. 14A & B is a flow chart illustrating the major functions performed in software for the first preferred embodiment. The first function 200 performed is to read the status of the calibration switch SW2. If the switch has been depressed, a system calibration is performed.

2C1. System Calibration (200)

As mentioned above, the purpose of the system calibration is to ascertain the system error in computing aircraft altitude. Sources of system error include pressure variations, computational errors, sensor error, supply voltage fluctuation, etc. A system calibration may be performed to correct these errors. A system calibration is performed by entering elevation at a known point when on the ground or entering the known aircraft altitude (e.g. from the altimeter) in 100s of feet on thumb-wheel switches D1–D3. The software, upon detection of the depressing of the calibration switch SW2, reads and stores the value of D1–D3, representing the calibration altitude. In the first preferred embodiment, the software is coded to read the calibration data immediately following the activation of SW2, therefore, the calibration data must be set on D1–D3 prior to activating SW2.

After reading the calibration data on D1–D3, the software then gets the system altitude. As discussed above, depending on the design implemented, this is done either by reading the A/D (U4), encoder, or GPS receiver. This is accomplished as described above. The software compares the value of the system altitude and the calibration value and computes the adjustment factor as the difference therebetween. This adjustment factor is applied to subsequent altitude calculations. After completion of the system calibration, the target altitude would be (re-)entered on D1–D3.

2C2. Read Tolerance Value (214)

The next function performed is to read the tolerance switch SW1. As mentioned, it is contemplated that the pilot will have the capability to adjust the tolerance window in which altitude deviations from the target altitude may be made without triggering an alert. As seen in FIGS. 2A–13B, it is contemplated that the tolerance switch SW1 will comprise a multi-position switch, connected to lines of a microcontroller port, grounding whichever port line(s) are selected on the switch. Therefore, the software reads the status of the switch, and consequently the tolerance selected, by checking which of these port lines is low. If more than a few tolerance values are possible, it would be advisable to encode or multiplex the selector lines so as to conserve the number of port lines used.

2C3. Read Target Altitude Value (215)

After reading and storing the tolerance value, the software reads the target altitude value by reading D1–D3. This data will be interpreted as target altitude data if SW2 is not activated. Since this data is normally read each time through the program, any change in the target altitude is almost instantly recognized. To facilitate comparison between the target and system altitudes, the target data is converted to decimal value and then stored.

2C4. Read System Altitude (216)

The software then determines system altitude. In the designs utilizing a pressure transducer, the aircraft altitude is acquired by reading the A/D convertor U4. In the designs utilizing a blind encoder, the aircraft altitude is acquired by enabling buffer U11, reading the encoder. Finally, in those designs utilizing a GPS receiver (FIGS. 7A–7C, 13A–13B), the altitude data may be acquired by reading the serial port P3.0. As is well known those in the art, MCS51 controllers comprise registers under software control which may be used to specify communications protocol.

As also mentioned, the raw data from the A/D consists of a count from 0–255. This count is converted into a meaningful altitude value by using a look-up table. As discussed above, the look-up table is generated based on pre-specified offset voltage and span adjustment on convertor U4 and the correlation between transducer voltage; A/D count; pressure; and altitude as illustrated on FIGS. 18A–18B.

2C5. Correlate Count to Altitude/Look-up Table (218)

The look-up table (218) is illustrated in dotted lines to indicate its employment in those designs utilizing the pressure transducer and A/D. The look-up table associates A/D count to aircraft altitude. However, it is not simply a case of dividing the altitude range into 256 segments and using that value as an incremental altitude, since the relationship (dP/dA) between pressure and altitude is not linear (FIGS. 17 & 18A–18B). Rather, the altitude must be computed for each incremental pressure. It has been found that sufficiently accurate results may be achieved approximating the relationship as linear between two relatively close points, e.g. dA=2,000 feet, especially in the higher altitudes, where the non-linearity diminishes.

As mentioned, the look-up table simply correlates the A/D count to altitude. Obviously, such a correlation is valid only at a given altitude range. If the offset and or span of the A/D convertor are adjusted, the look-up table must be updated accordingly.

Once the system altitude is acquired from the look-up table, encoder or GPS the calibration adjustment factor, if any, is applied (220). The 'adjusted system altitude' is then displayed on the LCD (222). As was described above, the data is latched into controller U9, which then drives LCD1. This display allows the pilot to see what altitude the alerter is using for comparison to the target altitude (the target altitude is displayed on the thumb-wheel switches). If the pilot notices a discrepancy between the displayed system altitude and the altimeter, the system calibration described above would be performed.

As mentioned above, if the source of the altitude information is either the altitude encoder or the GPS receiver, there is no need for the look-up table since the data is already in units of feet MSL.

2C6. Compare System and Target Altitudes (224)

Finally, the software performs the comparison between the 'adjusted system altitude' and the target altitude by computing the absolute difference between the two values and comparing this difference to the tolerance window. If the difference exceeds the tolerance, an alert is generated (228). In the implementation of the software, it is preferred that upon the detection of an alert condition, the software enter a loop whereupon the existence of the alert condition is verified for several consecutive passes. This procedure should minimize the effect of transients triggering false alerts. The delay introduced by requiring this looping is minimal, even at slower clock speed, the loop may be executed many times in a few milliseconds.

One consideration which will be recognized by those in the art, in executing a loop which continuously samples the A/D, with a controller as fast as the MCS 48/51 series it is quite easy to sample the A/D at a rate faster than its conversion time would allow. Thus, the software must take into account this conversion time, which in the case of the ADC0804 is approximately 100 µS.

2C7. Trigger Alert (228)

In the preferred embodiments, alerts take two forms, namely audio and visual. With respect to the audio warning, a piezoelectric speaker SPKR1 may be activated by switching on transistor Q2 by driving port line P3.0 low (FIGS. 3A–3C). Similarly, the visual warning may using LED1 may be activated by turning on transistor Q1 by driving port line P3.1 low (FIGS. 3A–3C). Additionally, a message may be displayed on the LCD in the same manner used to display the system altitude. Those skilled in the art will recognize there are many other means available for effecting a warning.

After sounding a warning, the program returns to the beginning. Alternatively, if no warnings are required, the warning flags are cleared (230) and the program returns to the beginning.

Thus, the target and system altitudes are monitored continuously each loop through the program, providing a nearly instantaneous recognition of changes in target and system altitudes.

2C7. Second Preferred Embodiment

Figure 15:
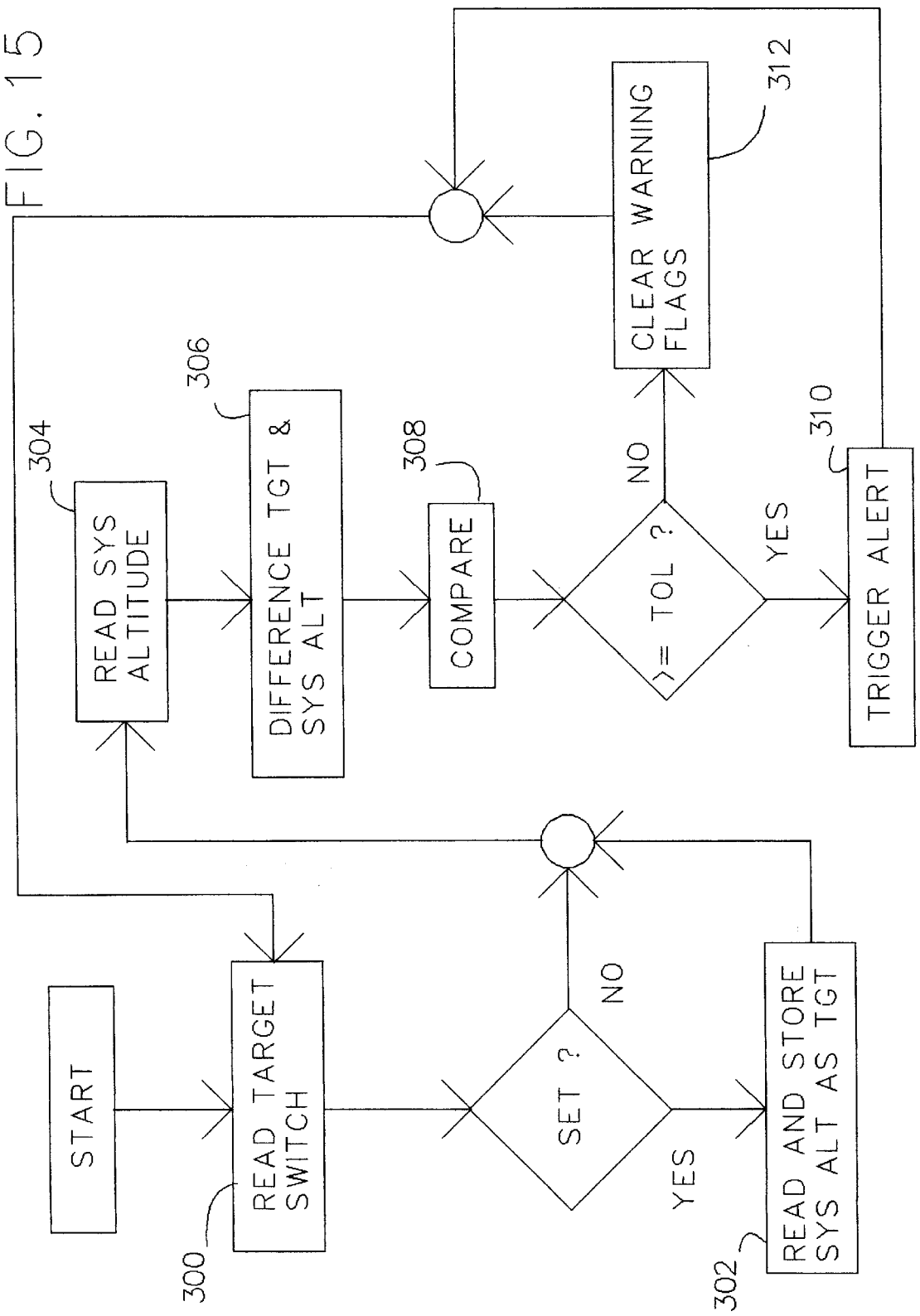
FIG. 15 is a flow chart showing the major functions performed in software in the second preferred embodiment.

The software utilized in the second preferred embodiment has several of the functions described above in the first preferred embodiment. However, in this simpler model the calibration and display functions provided in the first embodiment are not accomplished. Thus, the software is less complicated. The simpler software flow chart of the second preferred embodiment is illustrated in FIG. 15.

Since the second preferred embodiment does not comprise a system calibration function, its first task is to read the tolerance switch SW1. This is performed in the same manner as discussed above except that the switch is connected to port P3.0–P3.1, in this embodiment.

Figure 9A:
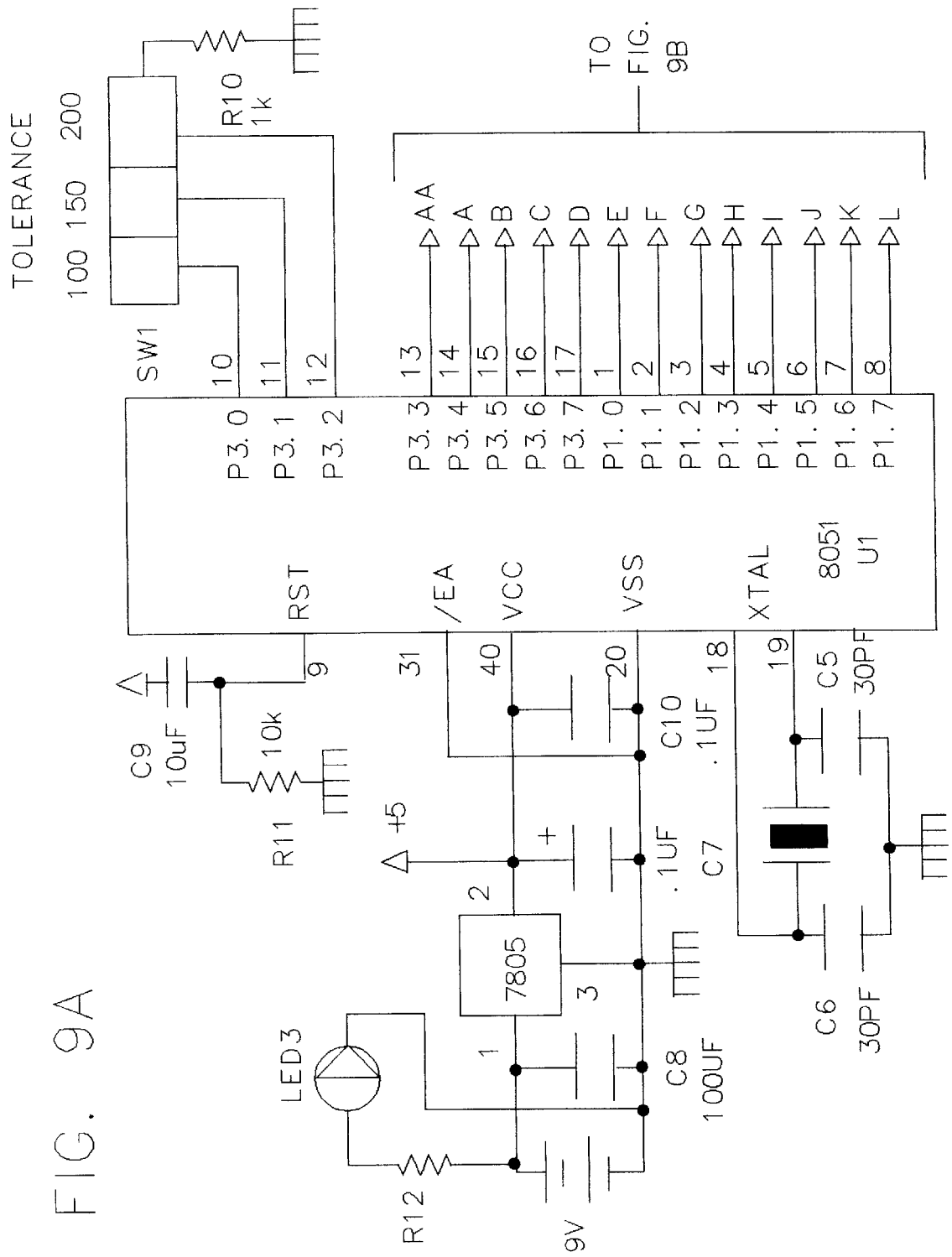
FIGS. 9A–9B are schematic diagrams of an alternative design for the second preferred embodiment of the present invention utilizing an 8051 microcontroller.
Figure 9B:
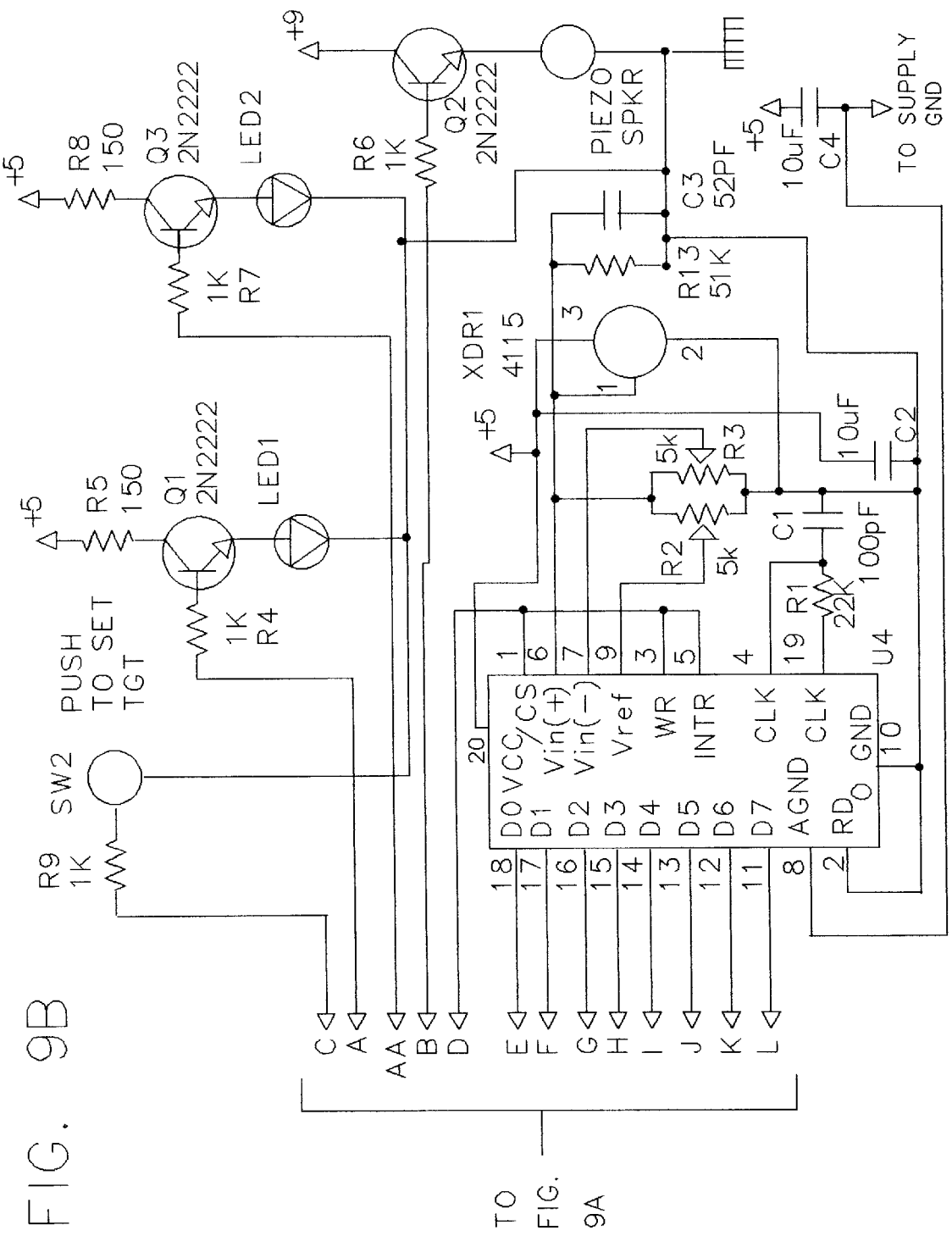
Figure 10A:
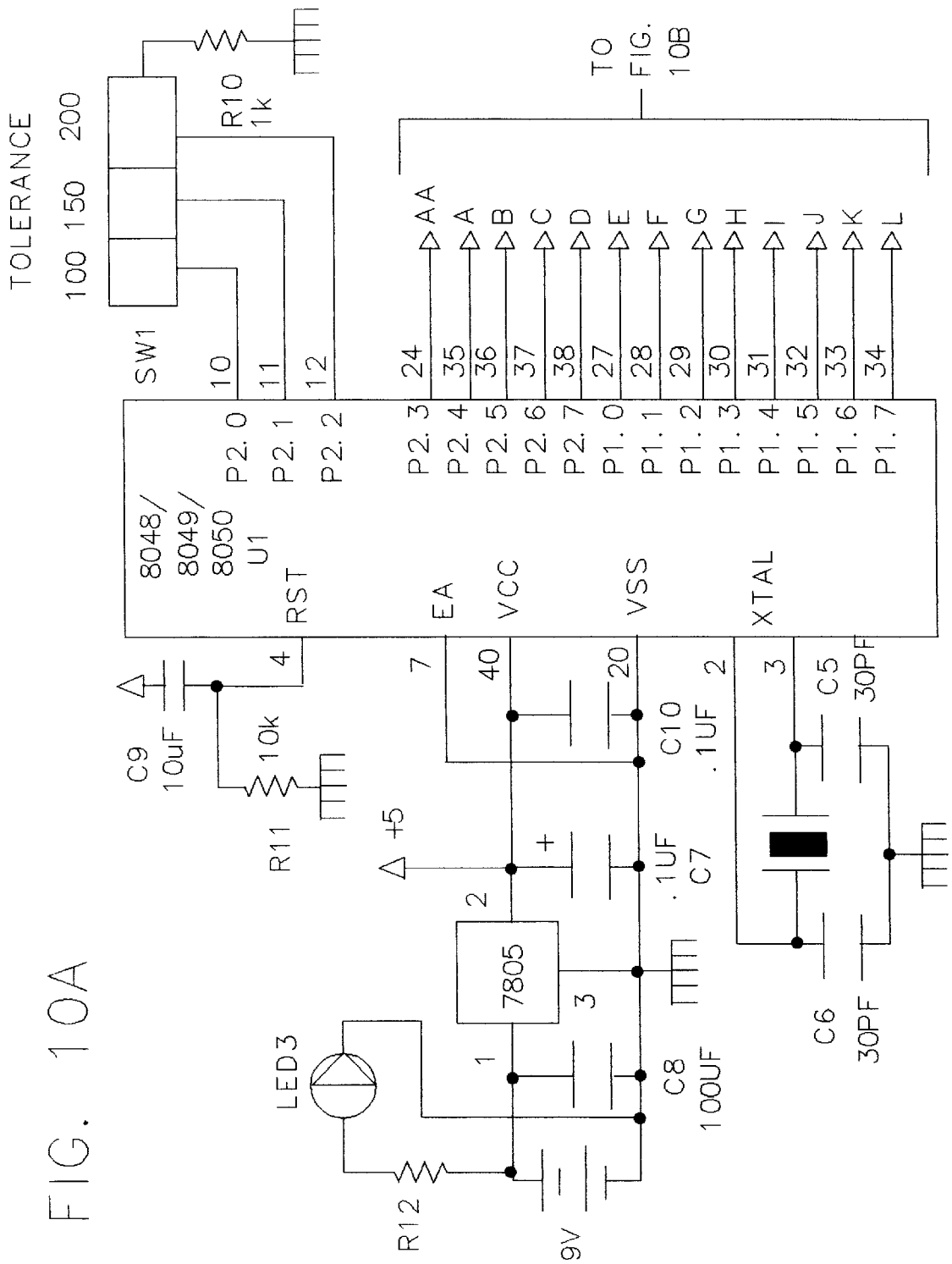
FIGS. 10A–10B are schematic diagrams of an alternative design for the second preferred embodiment of the present invention utilizing an INTEL 8048/49/50 microcontroller.
Figure 10B:
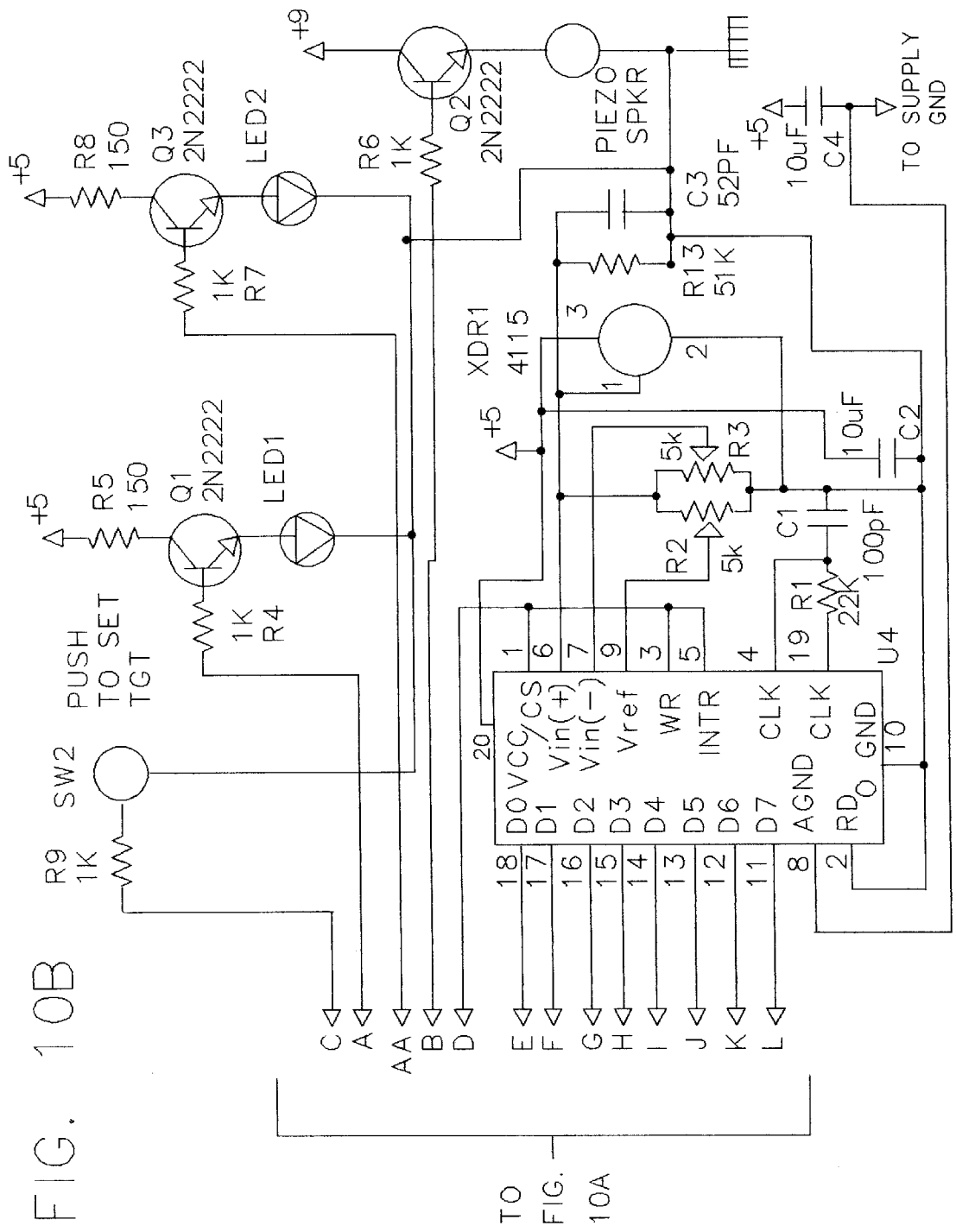
Figure 11A:
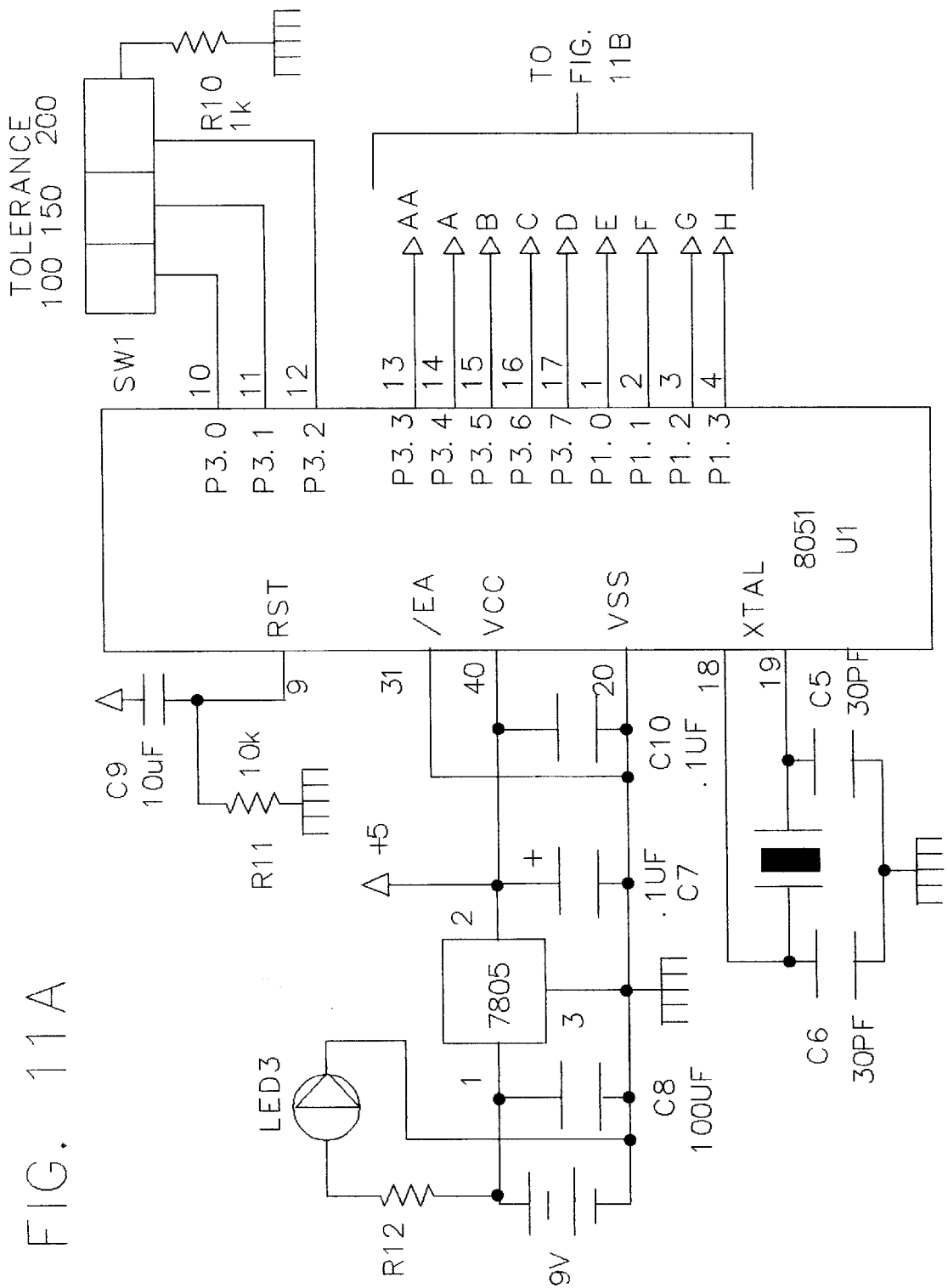
FIGS. 11A–11B are schematic diagrams of another alternative design for the second preferred embodiment utilizing an 8051 controller and adapted to read the "grey code" from an altitude encoder.
Figure 11B:
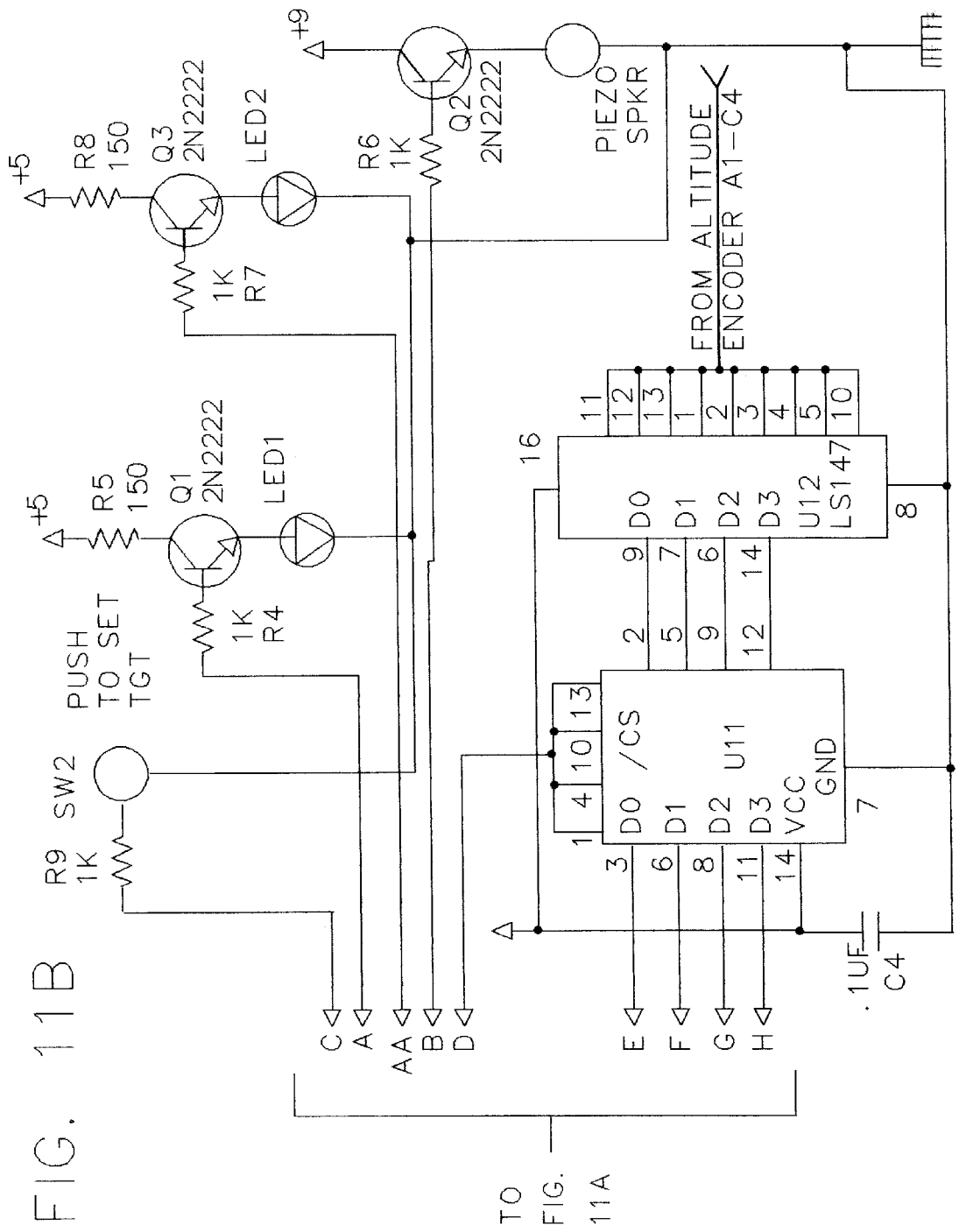
Figure 12A:
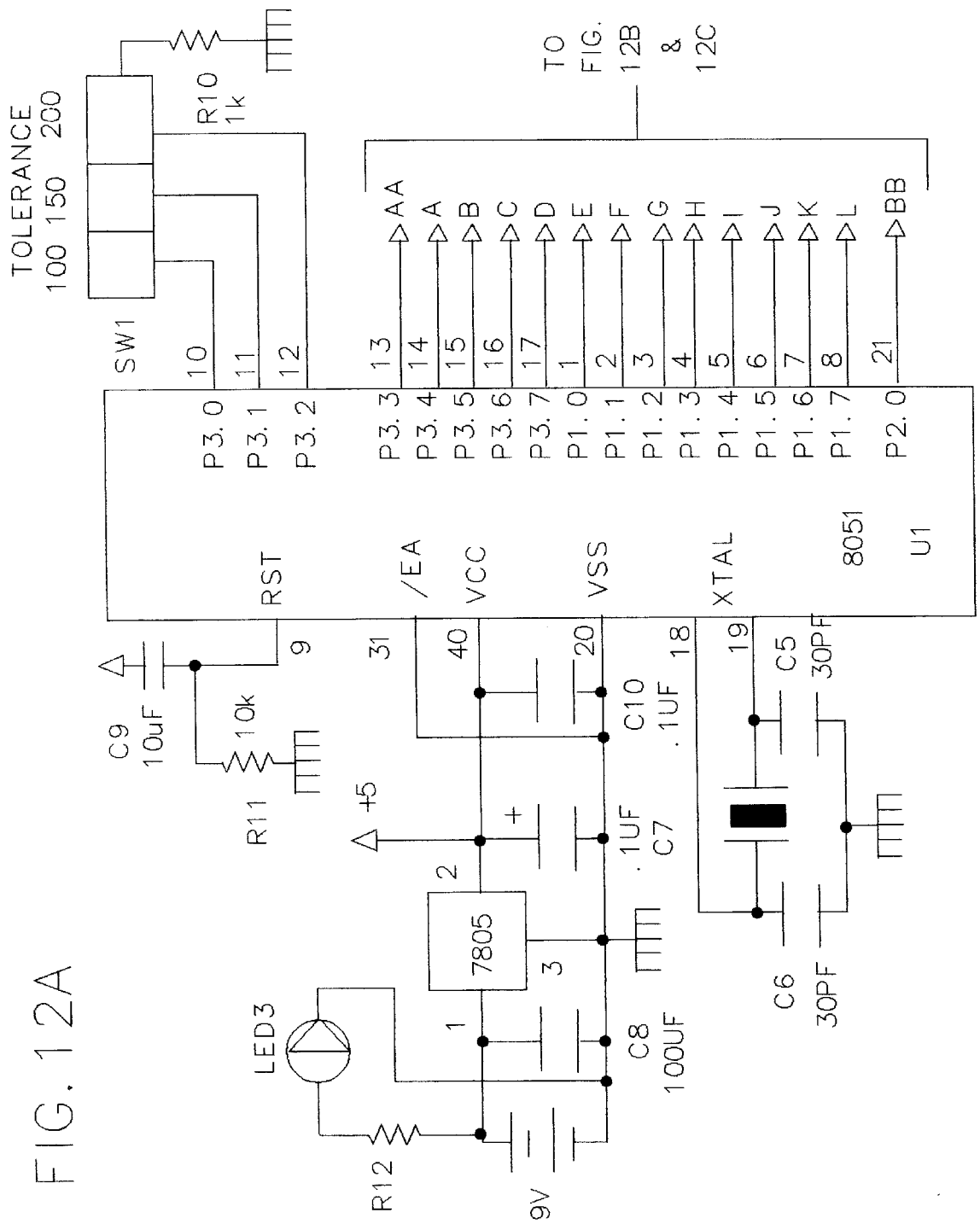
FIGS. 12A–12C are schematic diagrams of another alternative design for the second preferred embodiment utilizing an 8051 controller having a self contained altitude sensing means and adapted to read the "grey code" from an altitude encoder as a back-up.
Figure 12B:
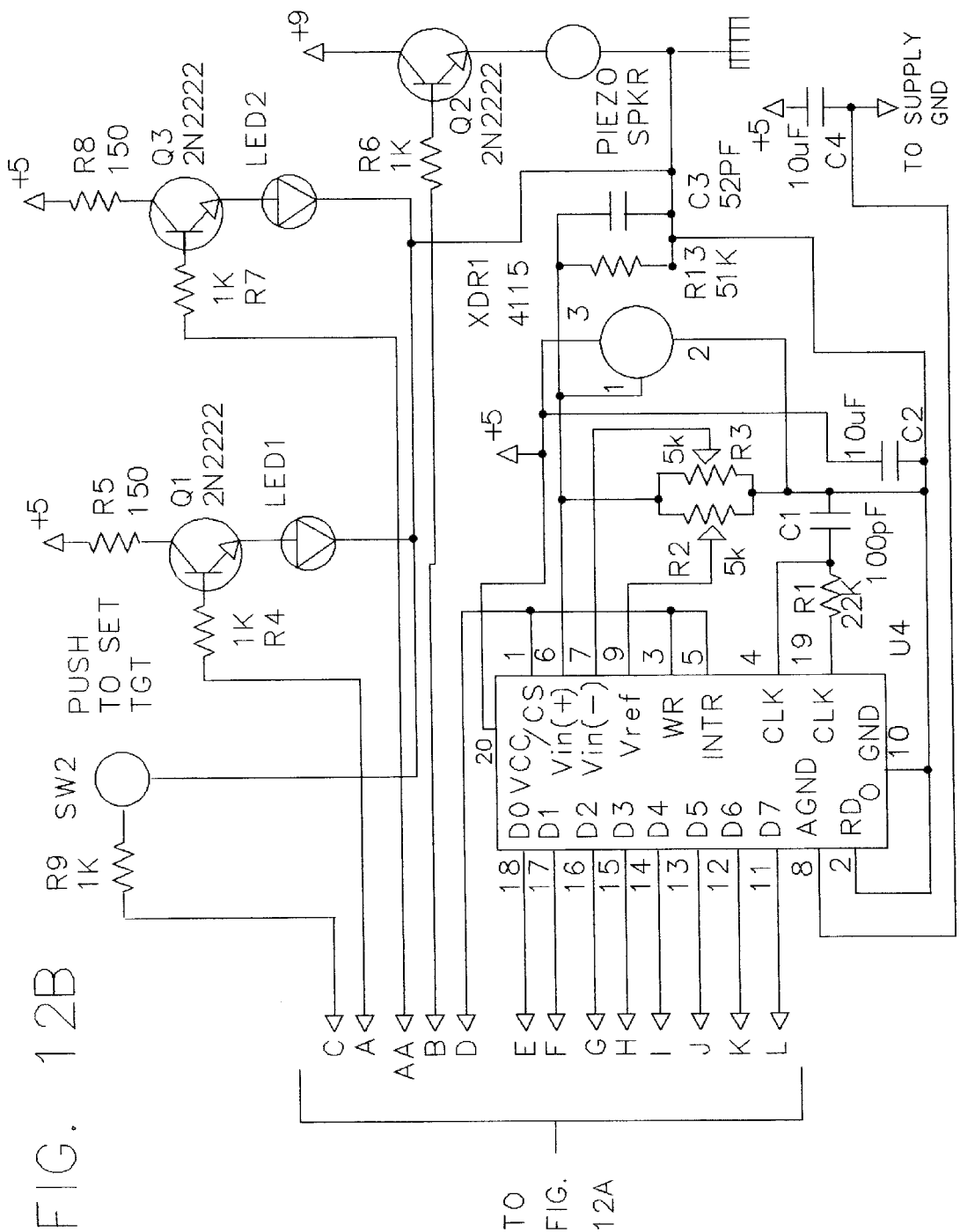
Figure 12C:
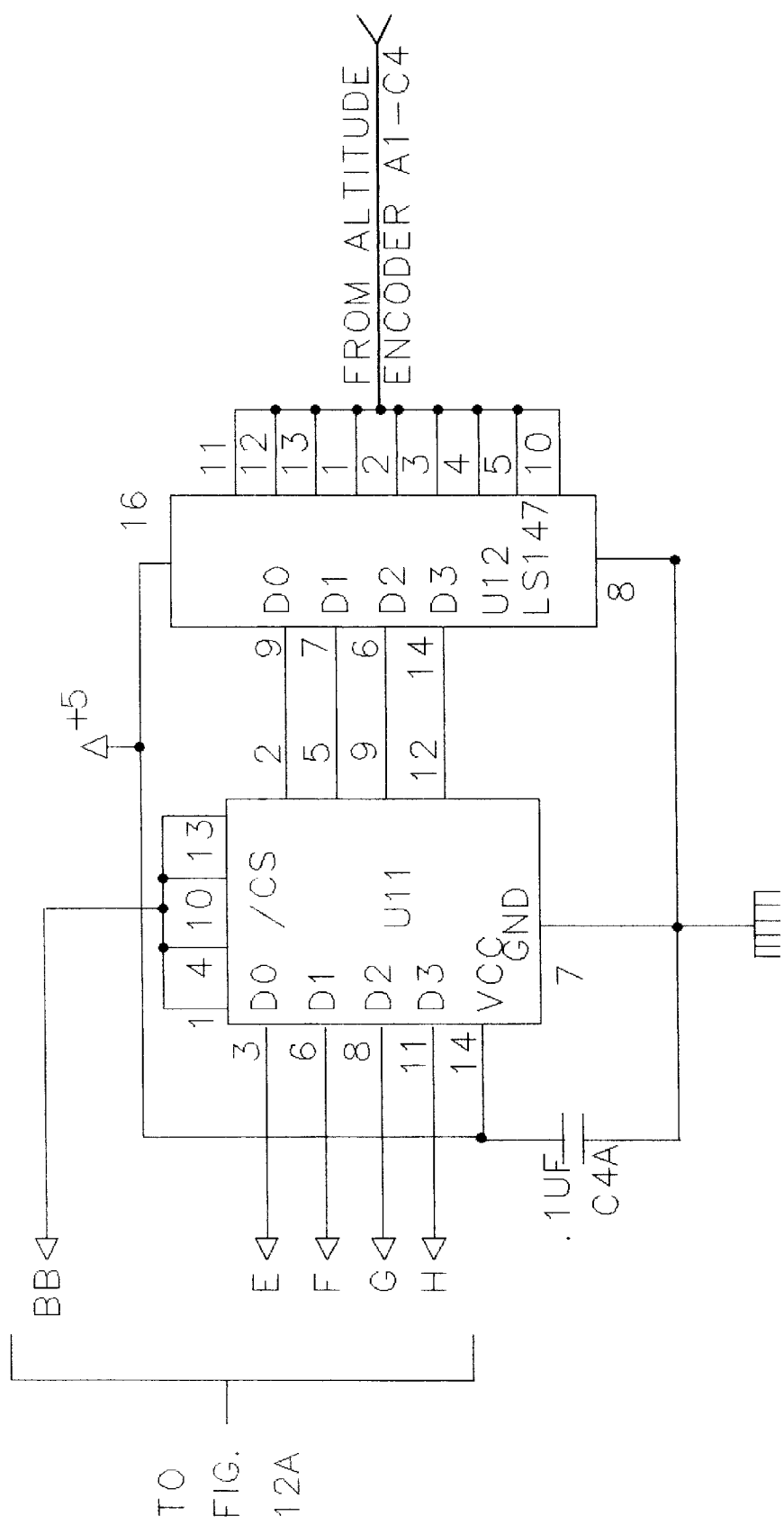

After reading and storing the tolerance value, the software loops waiting for the TARGET SET switch SW2 to be depressed. LED2 may be used to indicate a target has been set, by driving P3.3 low, turning on Q3 (FIG. 9B).

As discussed in detail above, in the second preferred embodiment, the pilot selects the target altitude as the present aircraft altitude once stabilized at that altitude. Therefore, upon the depressing of SW2, the software reads the target altitude. Depending on the source of the altitude information, this may be reading the A/D converter U4.

In those designs utilizing a blind encoder, the target altitude is acquired by enabling buffer U11, and reading the encoder. Finally, in those designs utilizing a GPS receiver, the target altitude data may be acquired by reading the serial port P3.0.

In this second preferred embodiment, no display is accomplished, thus the raw altitude data from the A/D need not be converted to feet. Rather, depending on the precision required, it may be sufficient to utilize the A/D count directly for comparison. In that case, the software would assign an equivalent count number to a foot tolerance from SW1. For example, using the offset and span discussed above, each A/D count equates to approximately 50. Therefore, a tolerance of 150 feet would equate to approximately 3 counts.

Of course, in those designs using the external data sources such as a blind encoder or GPS receiver, the system and target data is already in feet above mean sea level (MSL) format.

If conversion from the A/D count to an absolute foot value is desired, such a conversion may be accomplished using a look-up table in the manner set forth above.

After reading and storing the target altitude value, the software then determines system altitude. Again, depending of the design, this involves either reading the A/D. encoder, or GPS receiver output.

Finally, the software performs the comparison between the system altitude and the target altitude by computing the difference between the count (counts or feet) values and comparing this difference to the selected tolerance. If the difference exceeds the selected tolerance, an alert is sounded. As with the software discussed above in connection with the first preferred embodiment, it is preferable that upon the detection of an alert condition, the software check for the existence of an alert for several passes to minimize the potential of triggering an alert due to some transient condition.

In the second preferred embodiment, these alerts also take two forms, namely audio and visual. With respect to the audio warning, a piezoelectric speaker may be activated by switching on transistor Q2 by driving the appropriate port line low. Similarly, the visual warning may be activated by turning on transistor Q1 by driving the appropriate port line low. Those skilled in the art will recognize there are many other means available for effecting a warning.

After sounding a warning, or if no warning is required, the program clears the warning flags and returns to the beginning. Thus, the target and system altitudes are monitored continuously providing a nearly instantaneous recognition of changes in target and system altitudes.

Clearly the order of some of these steps is not important. For example, it is not required that the check for system calibration occur before the reading of thee tolerance switch. Additionally, while the description of the software for the second preferred embodiment does not effect a conversion from A/D count to absolute feet, such a conversion is provided for by the techniques described in connection with the first preferred embodiment.

It is apparent that numerous other modifications and variations of the present invention are possible in view of the above teachings.

Therefore, it is to be understood that the above description is in no way intended to limit the scope of protection of the claims and it is representative of only one of several possible embodiments of the present invention.

There has thus been shown and described an invention which accomplishes at least all the stated objectives.

I claim:

1. An apparatus for automatically and independently determining aircraft altitude and alerting the pilot to deviations from a target altitude exceeding a specified tolerance value, the alerter comprising:
   a self-contained altitude sensing means for sensing the present altitude of the aircraft;
   target entry means for entering the target altitude to which said present aircraft altitude is compared, said target entry means comprising a push-button electrically connected to said computation means such that upon depressing of said pushbutton, said target altitude is equated to said present aircraft altitude;
   computation means for receiving and processing said present aircraft altitude information from said self-contained altitude sensing means and for receiving and processing said target altitude from said target entry means, said computation means being operative to compare said present altitude to said target altitude and to compute the difference therebetween, said computation means also operative to compute the absolute value of said difference and compare said absolute difference between said target and present altitudes to the tolerance value; and
   means for indicating an altitude alerting condition upon the detection of a condition wherein said absolute difference is larger than said tolerance value, said indicating means being connected to said computation means and operative to indicate the occurrence of said altitude alerting condition.

2. An apparatus for automatically and independently determining aircraft altitude and alerting the pilot to deviations from a target altitude exceeding a specified tolerance value, the alerter comprising:
   a self-contained altitude sensing means for sensing the present altitude of the aircraft;
   target entry means for entering the target altitude to which said present aircraft altitude is compared;
   computation means for receiving and processing said present aircraft altitude information from said self-contained altitude sensing means and for receiving and processing said target altitude from said target entry means, said computation means being operative to compare said present altitude to said target altitude and to compute the difference therebetween, said computation means also operative to compute the absolute value of said difference and compare said absolute difference between said target and present altitudes to the tolerance value; and
   means for indicating an altitude alerting condition upon the detection of a condition wherein said absolute difference is larger than said tolerance value, said indicating means being connected to said computation means and operative to indicate the occurrence of said altitude alerting condition; and
   means for effecting a system calibration whereupon entry of a reference altitude on said target entry and activation of said system calibration means, said computation means is operative to compare said reference altitude to said sensed aircraft altitude and to compute the difference therebetween, said difference defining an altitude adjustment value which may be applied to later sensed aircraft altitudes.

3. A method of automatically and independently determining and displaying aircraft altitude and alerting the pilot to deviations from a target altitude exceeding a specified tolerance value, comprising the steps of:
   providing an altitude alerting apparatus having:
      a self-contained altitude sensing means for sensing the present altitude of the aircraft;
      target entry means for entering the target altitude to which said present aircraft altitude is compared,and wherein said target entry means is a push-button;
      computation means for receiving and processing present aircraft altitude information from said self-contained altitude sensing means and for receiving and processing said target altitude from said target entry means, said computation means being operative to compare said present altitude to said target altitude and to compute the absolute difference therebetween, said computation means also operative to compute the absolute value of said difference and compare said absolute difference between said target and present altitudes to said tolerance value; and
      indicating means for indicating an altitude alerting condition upon the occurrence of said absolute difference exceeding said tolerance;
   entering a target altitude by depressing said push-button upon reaching said target altitude;
   sensing said aircraft altitude;
   differencing said sensed aircraft altitude and said target altitude;
   computing an altitude deviation defined as the absolute difference between said sensed aircraft altitude and said target altitude;
   comparing said altitude deviation to said tolerance value; and
   indicating an altitude alerting condition upon the detection of an altitude deviation in excess of said tolerance value.

4. A method of automatically and independently determining and displaying aircraft altitude and alerting the pilot to deviations from a target altitude exceeding a specified tolerance value, comprising the steps of:

providing an altitude alerting apparatus having:

a self-contained altitude sensing means for sensing the present altitude of the aircraft;

target entry means for entering the target altitude to which said present aircraft altitude is compared;

computation means for receiving and processing present aircraft altitude information from said self-contained altitude sensing means and for receiving and processing said target altitude from said target entry means, said computation means being operative to compare said present altitude to said target altitude and to compute the absolute difference therebetween, said computation means also operative to compute the absolute value of said difference and compare said absolute difference between said target and present altitudes to said tolerance value; and indicating means for indicating an altitude alerting condition upon the occurrence of said absolute difference exceeding said tolerance;

entering a target altitude;

sensing said aircraft altitude;

differencing said sensed aircraft altitude and said target altitude;

computing an altitude deviation defined as the absolute difference between said sensed aircraft altitude and said target altitude;

comparing said altitude deviation to said tolerance value; and indicating an altitude alerting condition upon the detection of an altitude deviation in excess of said tolerance value;

providing a display means for display of said sensed aircraft altitude; and displaying said sensed aircraft altitude;

providing an altimeter;

providing a means for effecting a system calibration;

comparing said displayed sensed aircraft altitude to the aircraft altitude on the aircraft altimeter;

initiating a system calibration upon the detection of a difference in said displayed sensed aircraft altitude and said altitude on said altimeter, the system calibration comprising the steps of;

inputting a calibration altitude on said target entry means, said calibration altitude being the altitude displayed on said altimeter; and activating said system calibration means.

* * * * *